(12) United States Patent
Wagers et al.

(10) Patent No.: US 12,486,519 B2
(45) Date of Patent: Dec. 2, 2025

(54) IN SITU GENE EDITING

(71) Applicants: President and Fellows of Harvard College, Cambridge, MA (US); Dana-Farber Cancer Institute, Inc., Boston, MA (US)

(72) Inventors: Amy J. Wagers, Cambridge, MA (US); Jill Goldstein, Cambridge, MA (US); Leo Wang, La Canada Flintridge, CA (US); Ya-Chieh Hsu, Cambridge, MA (US); Meryem Gonzalez Celeiro, Somerville, MA (US)

(73) Assignees: President and Fellows of Harvard College, Cambridge, MA (US); Dana-Farber Cancer Institute, Inc., Boston, MA (US)

( * ) Notice: Subject to any disclaimer, the term of this patent is extended or adjusted under 35 U.S.C. 154(b) by 1099 days.

(21) Appl. No.: 17/269,527

(22) PCT Filed: Aug. 19, 2019

(86) PCT No.: PCT/US2019/047113
§ 371 (c)(1),
(2) Date: Feb. 18, 2021

(87) PCT Pub. No.: WO2020/041217
PCT Pub. Date: Feb. 27, 2020

(65) Prior Publication Data
US 2021/0180087 A1 Jun. 17, 2021

Related U.S. Application Data

(60) Provisional application No. 62/719,628, filed on Aug. 18, 2018.

(51) Int. Cl.
| | | |
|---|---|---|
| C12N 15/86 | (2006.01) | |
| A61K 9/00 | (2006.01) | |
| A61K 48/00 | (2006.01) | |
| C12N 7/00 | (2006.01) | |
| C12N 9/22 | (2006.01) | |
| C12N 15/11 | (2006.01) | |
| C12N 15/90 | (2006.01) | |

(52) U.S. Cl.
CPC ............ *C12N 15/86* (2013.01); *A61K 9/0019* (2013.01); *C12N 7/00* (2013.01); *C12N 9/22* (2013.01); *C12N 15/11* (2013.01); *C12N 15/907* (2013.01); *A61K 48/00* (2013.01); *C12N 2310/20* (2017.05); *C12N 2750/14143* (2013.01); *C12N 2750/14171* (2013.01); *C12N 2800/80* (2013.01)

(58) Field of Classification Search
CPC .............................. C12N 15/86; A61K 9/0019
See application file for complete search history.

(56) References Cited

U.S. PATENT DOCUMENTS

| | | |
|---|---|---|
| 9,890,396 B2 | 2/2018 | Chatterjee et al. |
| 10,370,680 B2 | 8/2019 | Holmes et al. |
| 11,136,597 B2 | 10/2021 | Saltzman et al. |
| 2013/0315880 A1 | 11/2013 | Frank |
| 2014/0341852 A1 | 11/2014 | Srivastava et al. |
| 2015/0110762 A1 | 4/2015 | Holmes et al. |
| 2017/0152528 A1 | 6/2017 | Zhang |
| 2017/0362635 A1 | 12/2017 | Chamberlain et al. |
| 2020/0340012 A1 | 10/2020 | Mali et al. |

FOREIGN PATENT DOCUMENTS

| | | |
|---|---|---|
| JP | 2017-525696 A | 9/2017 |
| WO | 2004/037977 A2 | 5/2004 |
| WO | 2013/040644 A1 | 3/2013 |
| WO | 2013/126794 A1 | 8/2013 |
| WO | WO-2014/194132 A1 | 12/2014 |
| WO | WO-2014/197748 A2 | 12/2014 |
| WO | 2016/014794 | 1/2016 |
| WO | WO-2016/025469 A1 | 2/2016 |
| WO | 2016/044416 | 3/2016 |
| WO | 2016/086197 | 6/2016 |
| WO | 2016/089866 | 6/2016 |
| WO | 2016/094880 | 6/2016 |
| WO | WO-2016/089866 A1 | 6/2016 |
| WO | 2016/108926 | 7/2016 |
| WO | 2016/182959 | 11/2016 |
| WO | 2016/183298 | 11/2016 |
| WO | WO-2018/013932 A1 | 1/2018 |

(Continued)

OTHER PUBLICATIONS

Long C, McAnally Jr, Shelton JM, Mireault AA, Bassel-Duby R, Olson EN. Prevention of muscular dystrophy in mice by CRISPR/Cas9-mediated editing of germline DNA. Science. Sep. 5, 2014;345(6201):1184-1188. doi: 10.1126/science.1254445. Epub Aug. 14, 2014. PMID: 25123483; PMCID: PMC4398027. (Year: 2014).*
Nelson CE, Hakim CH, Ousterout DG, Thakore PI, Moreb EA, Castellanos Rivera RM, Madhavan S, Pan X, Ran FA, Yan WX, Asokan A, Zhang F, Duan D, Gersbach CA. In vivo genome editing improves muscle function in a mouse model of Duchenne muscular dystrophy. Science. Jan. 22, 2016;351(6271):403-7. (Year: 2016).*
Yang Y, Wang L, Bell P, McMenamin D, He Z, White J, Yu H, Xu C, Morizono H, Musunuru K, Batshaw ML, Wilson JM. A dual AAV system enables the Cas9-mediated correction of a metabolic liver disease in newborn mice. Nat Biotechnol. Mar. 2016;34(3):334-8. (Year: 2016).*

(Continued)

*Primary Examiner* — Fereydoun G Sajjadi
*Assistant Examiner* — Qinhua Gu
(74) *Attorney, Agent, or Firm* — Morse, Barnes-Brown & Pendleton, P.C.; Lisa M. Warren, Esq.; Daniel L. Branson, Esq.

(57) ABSTRACT

Disclosed are methods of in situ genomic modification of cells (e.g., stem cells, tissue stem cells, muscle stem cells, Sca-1$^+$ mesenchymal progenitor cells in skeletal muscle, CD140a$^+$ dermal mesenchymal cells) using sequence-targeting nucleases delivered via a virus (e.g., an AAV).

4 Claims, 37 Drawing Sheets
Specification includes a Sequence Listing.

(56) References Cited

FOREIGN PATENT DOCUMENTS

| WO | WO-2018/058064 A1 | 3/2018 |
|---|---|---|
| WO | WO-2018/191440 A1 | 10/2018 |
| WO | WO-2019/213626 A1 | 11/2019 |

OTHER PUBLICATIONS

Nishiyama J, Mikuni T, Yasuda R. Virus-Mediated Genome Editing via Homology-Directed Repair in Mitotic and Postmitotic Cells in Mammalian Brain. Neuron. Nov. 15, 2017;96(4):755-768.e5. doi: 10.1016/j.neuron.2017.10.004. Epub Oct. 19, 2017. PMID: 29056297; PMCID: PMC5691606. (Year: 2017).*
Pignataro D, Sucunza D, Vanrell L, Lopez-Franco E, Dopeso-Reyes IG, Vales A, Hommel M, Rico AJ, Lanciego JL, Gonzalez-Aseguinolaza G. Adeno-Associated Viral Vectors Serotype 8 for Cell-Specific Delivery of Therapeutic Genes in the Central Nervous System. Front Neuroanat. Feb. 10, 2017;11:2. (Year: 2017).*
Zhang Z, Zhang Y, Gao F, Han S, Cheah KS, Tse HF, Lian Q. CRISPR/Cas9 Genome-Editing System in Human Stem Cells: Current Status and Future Prospects. Mol Ther Nucleic Acids. Dec. 15, 2017;9:230-241. doi: 10.1016/j.omtn.2017.09.009. Epub Sep. 30, 2017. PMID: 29246302; PMCID: PMC5651489. (Year: 2017).*
Choi, et al., "Local Mesenchymal Stem/Progenitor Cells are a Preferential Target for Initiation of Adult Soft Tissue Sarcomas Associated with p53 and Rb Deficiency," *The American Journal of Pathology*, 177(5):2645-2658, (Dec. 16, 2010).
Holmes, et al., "Concise Review: Stem Cell Antigen-1: Expression, Function, and Enigma," *Stem Cells*, 25(6):1339-1347, (Mar. 22, 2007).
International Search Report from PCT/US2019/030748, dated Aug. 29, 2019.
International Search Report from PCT/US2019/047113, dated Nov. 7, 2019.
Final Office Action for U.S. Appl. No. 16/604,920, dated Mar. 10, 2023.
Inagaki, et al., "Robust Systemic Transduction with AAV9 Vectors in Mice: Efficient Global Cardian Gene Transfer Superior to That of AAV8," Mol. Ther. 14(1):45-53, (Jul. 2006).
Ishizu, et al., "Targeted Genome Replacement via Homology-directed Repair in Non-dividing Cardiomyocytes," Scientific Reports, 7:9363; pp. 1-12 (2017).
Non-Final Office Action for U.S. Appl. No. 16/604,920, dated Nov. 15, 2023.
Dever, et al., "CRISPR/Cas9 b-Globin Gene Targeting in Human Haematopoietic Stem Cells," Nature, 539:384-389, (Nov. 17, 2016).
Li, et al., "In Vivo Genome Editing Restores Hemastasis in a Mouse Model of Hemophilia," Nature, 475:217-221, (Jan. 14, 2012).
Tabebordbar, et al., "In Vivo Gene Editing in Dystrophic Mouse Muscle and Muscle Stem Cells," Science, 351 (6271):407-411, (Jan. 22, 2016).
Wang, et al., "Homology-Driven Genome Editing in Hematopoietic Stem and Progenitor Cells Using ZFN mRNA and AAV Donors," Nature Biotechnology, 33:1256-1263, (2015).
International Search Report from PCT/US2018/027197, dated Aug. 10, 2018.
Christensen, et al., "Flk-2 is a Marker in Hematopoietic Stem Cell Differentiation: a Simple Method to Isolate Long-Term Stem Cells," PNAS, 98:14541-14546, (2001).
Final Office Action from U.S. Appl. No. 16/604,920, dated Oct. 11, 2019.
Non-Final Office Action from U.S. Appl. No. 16/604,920, dated Jun. 27, 2022.
Xu, et al., "CRISPR-Mediated Genome Editing Restores Dystrophin Expression and Function in mdx Mice," *Molecular Therapy*, 24(3):564-569, (2016).
Nelson, et al., "In Vivo Genome Editing Improves Muscle Function in a Mouse Model of Duchenne Muscular Dystrophy," *Science*, 351(6271):403-407, (2015).
Balaji, et al., "Pseudotyped Adeno-Associated Viral Vectors for Gene Transfer in Dermal Fibroblasts: Implications for Wound Healing Applications," J. Surg. Res., 184(1): 691-698, 2013.
Chng, et al., "Specific adeno-associated virus serotypes facilitate efficient gene transfer into human and non-human primate mesenchymal stromal cells," The Journal of Gene Medicine, 9:22-32, 2007.
Kwon, et al., "Targeting Muscle Satellite Cells with Adeno-Associated Viral Vectors," Molecular Therapy, vol. 26;5S1, May 2018.
Final Office Action for U.S. Appl. No. 16/604,920, mailed Apr. 16, 2024.
Non-Final Office Action for U.S. Appl. No. 17/052,798, mailed Apr. 17, 2024.
Chen, et al., "Engineered Viruses as Genome Editing Devices," Molecular Therapy, 24(3), pp. 447-457, 2016.
Hinderer, et al., "Severe Toxicity in Nonhuman Primates and Piglets Following High-Dose Intravenous Administration of an Adeno-Associated Virus Vector Expressing Human SMN," Hum. Gene. Ther., 29(3):285-298, 2018.
Non-Final Office Action for U.S. Appl. No. 16/604,920, dated Jan. 16, 2025.
Non-Final Office Action for U.S. Appl. No. 17/052,798, dated Nov. 12, 2024.
Wang, et al., "Adeno-associated virus serotype 8 efficiently delivers genes to muscle and heart," Nature Biotechnology, 23(3), Mar. 2005.
Zincarelli, et al., "Analysis of AAV serotypes 1-9 mediated gene expression and tropism in mice after systemic injection," Mol. Ther. 16(6):1073-80, 2008.
Kamdar, et al., "Dystrophin-Deficient Cardiomyopathy," Journal of the American College of Cardiology, 67(21), 2016.
Li, et al., "Precise Correction of the Dystrophin Gene in Duchenne Muscular Dystrophy Patient Induced Pluripotent Stem Cells by TALEN and CRISPR-Cas9," Stem Cell Reports, vol. 4, 143-154, 2015.
Non-Final Office Action for U.S. Appl. No. 17/052,798, dated Jul. 31, 2025.

* cited by examiner

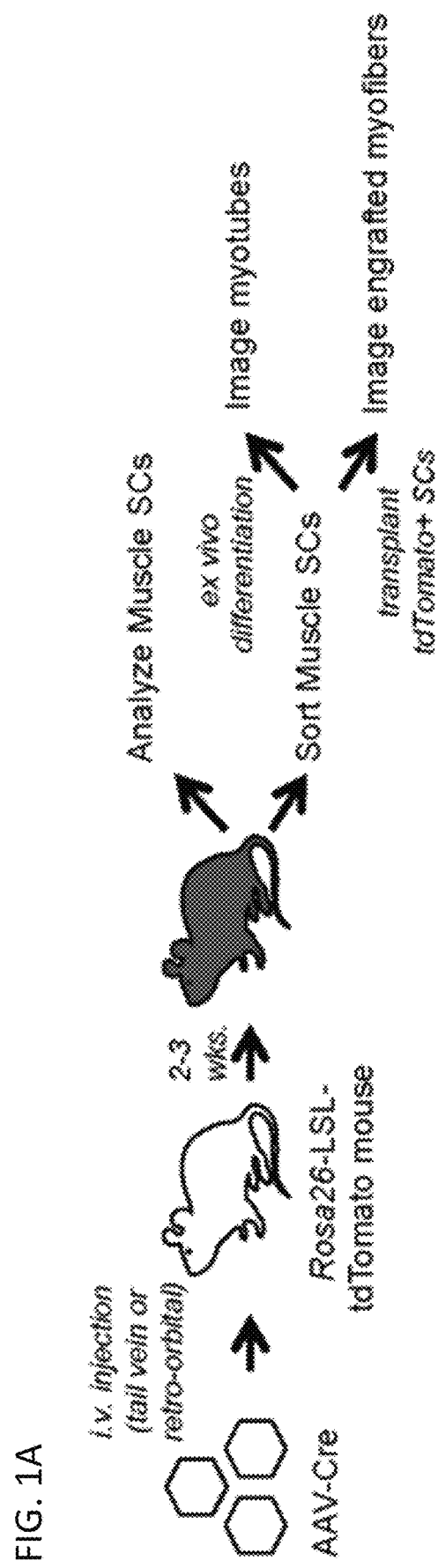

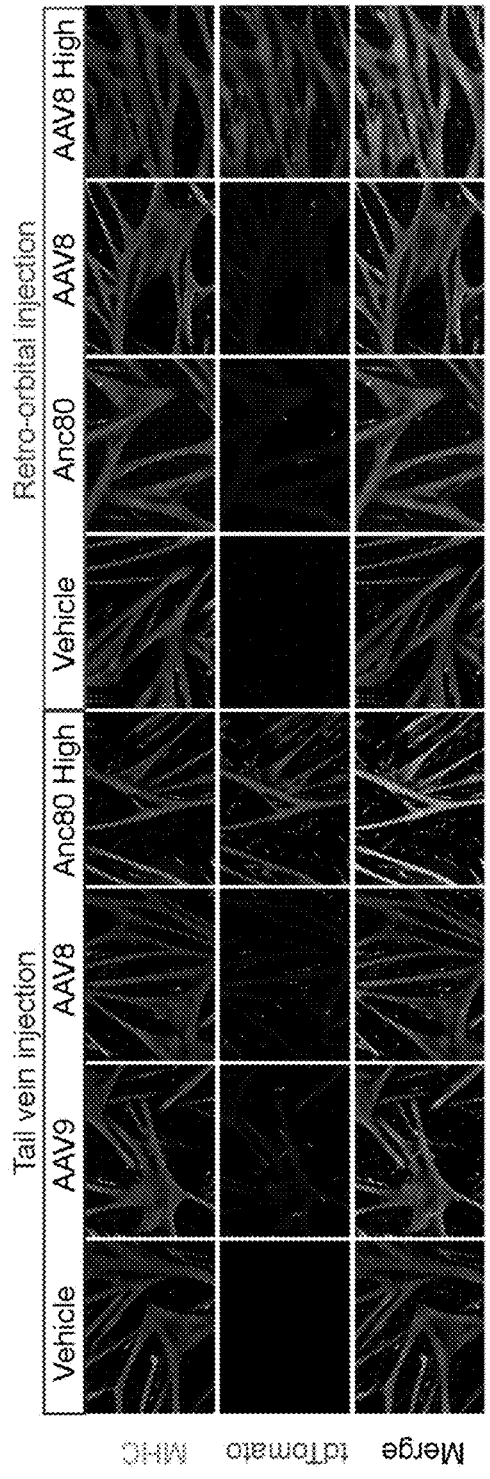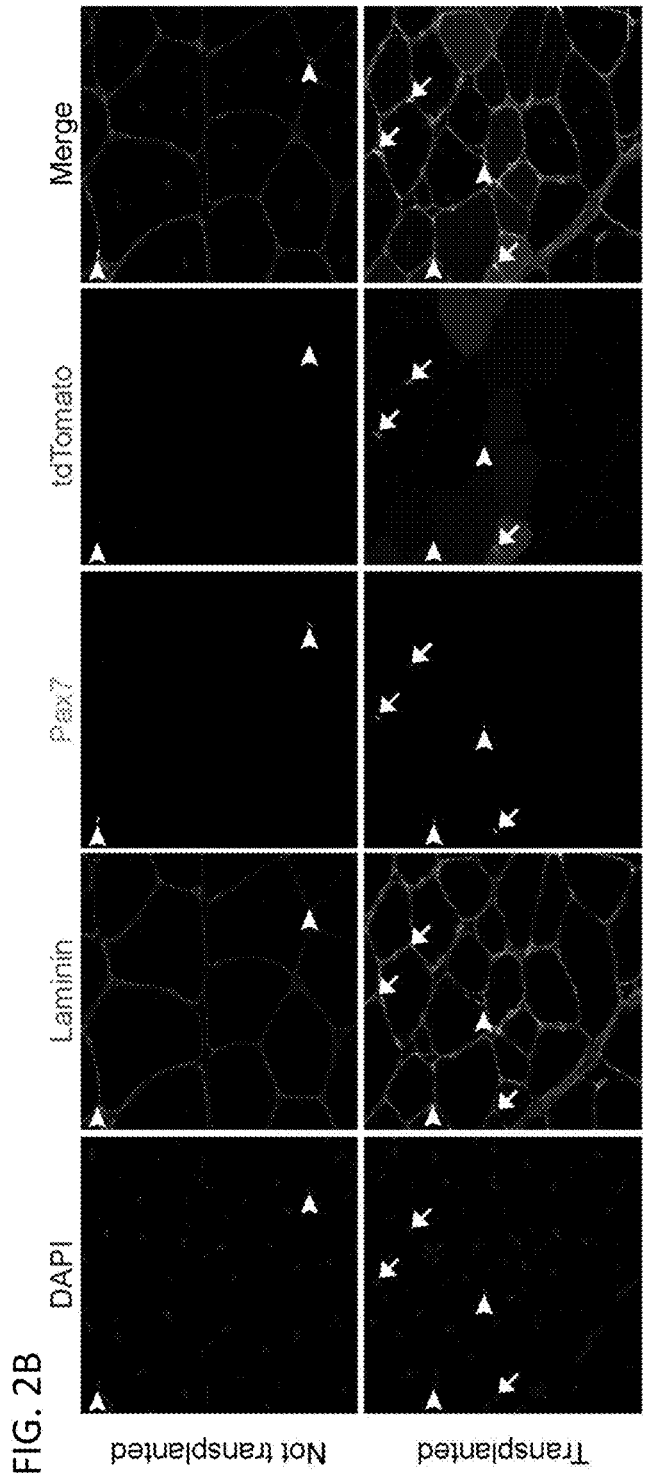
FIG. 2A
FIG. 2B

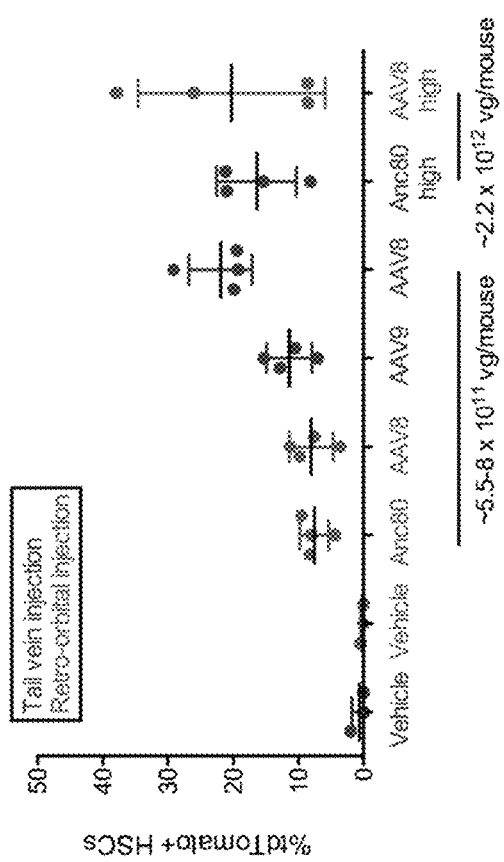
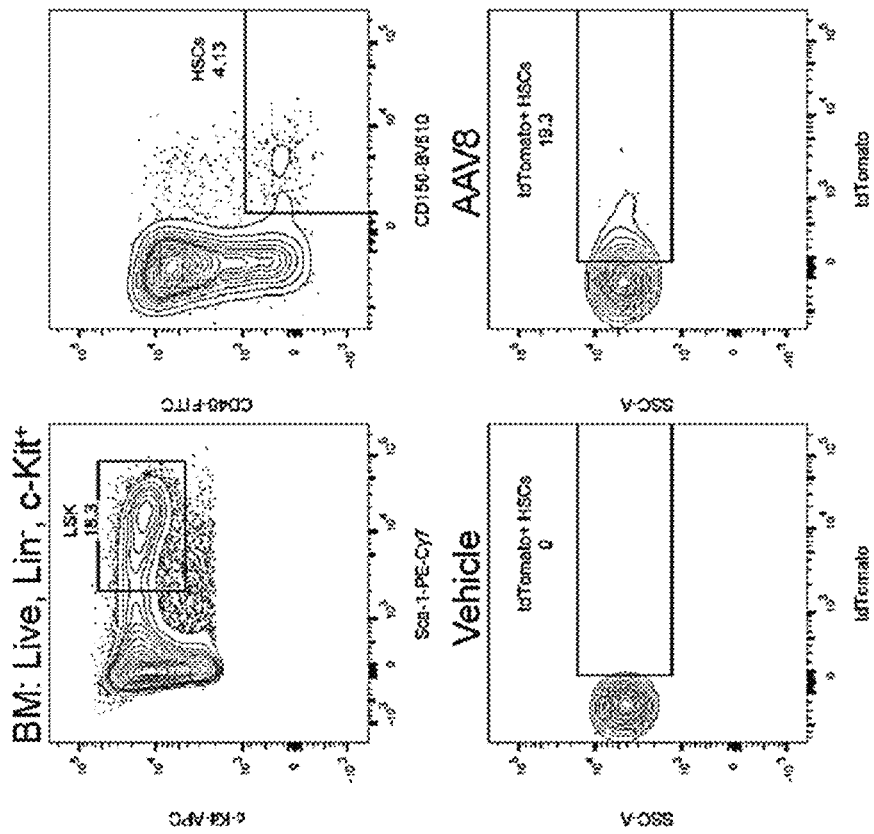
FIG. 3B
FIG. 3C

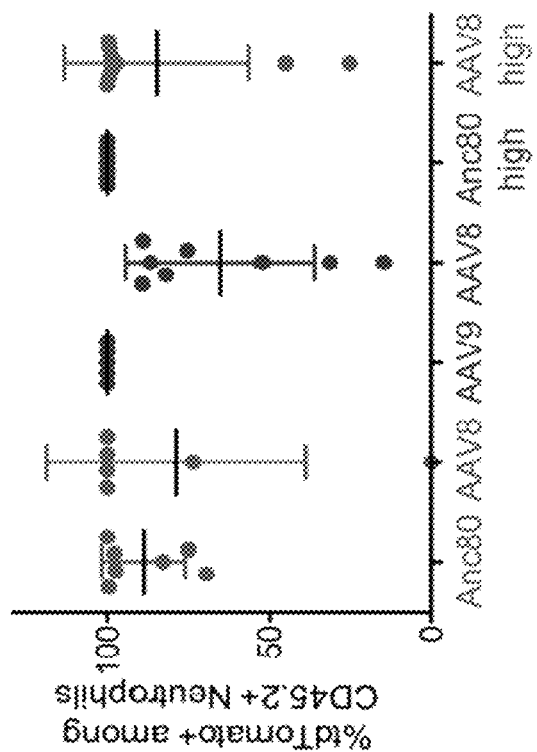
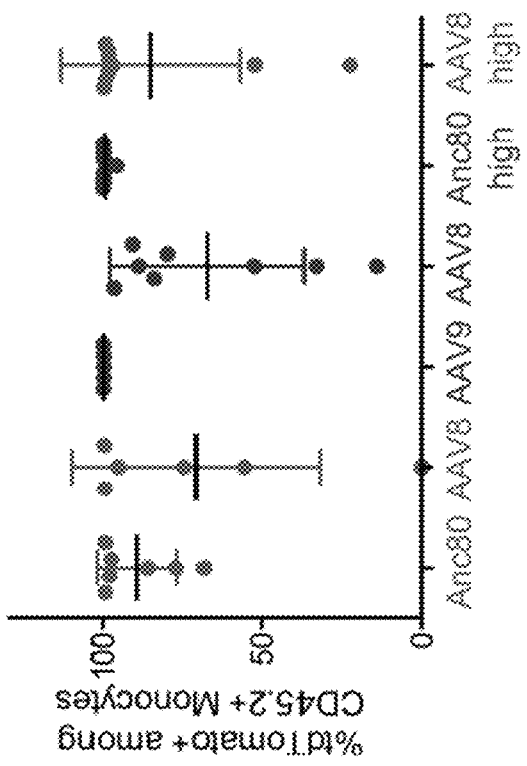
FIG. 4E
FIG. 4F

IN SITU GENE EDITING

RELATED APPLICATIONS

This application is a national stage filing under 35 U.S.C. 371 of International Application No. PCT/US2019/047113, filed Aug. 19, 2019, which claims the benefit of U.S. Provisional Application No. 62/719,628, filed on Aug. 18, 2018. The entire teachings of the above applications are incorporated herein by reference. International Application No. PCT/US2019/047113 was published under PCT Article 21(2) in English.

GOVERNMENT SUPPORT

This invention was made with government support under Grant Nos. AG050395, AG048917, AR070825, and HL135287 awarded by the National Institutes of Health. The government has certain rights in the invention.

SEQUENCE LISTING

The Sequence Listing associated with this application is provided in .txt format in lieu of a paper copy and is hereby incorporated by reference into the specification. The name of the .txt file containing the Sequence Listing is HRVY-140-WO1_ST25.txt. The .txt file is 1,391 bytes, was created on Feb. 2, 2021, and is being submitted electronically via Patent Center.

BACKGROUND OF THE INVENTION

Effective functioning of the body's tissues and organs depends upon the maintenance of proper cell numbers (homeostasis) and replacement of damaged cells after injury (repair), both processes that require the regulated action of tissue stem cells. Many studies, spanning multiple decades, have sought to define key molecular regulators of stem cell function; however, the pace at which investigators have been able to interrogate and define such mediators has been constrained by technological limitations of generating genetically engineered mice and stem cell transplantation models typically used for such studies. In particular, transgenic and gene knockout-based approaches require the generation and breeding of multiple, distinct genetically engineered deletion and/or floxed alleles in order to disrupt genes of interest in a ubiquitous or tissue-specific manner, a challenge that is exacerbated when the combinatorial effects of perturbing several genes are of interest. Likewise, ex vivo genomic manipulation of stem cells requires the isolation and transplantation of these cells, which disturbs key regulatory interactions present in endogenous stem cell niches and can profoundly modify normal stem cell properties (Wagers, 2012). Thus, the field would benefit tremendously from the availability of a programmable, in vivo platform to manipulate gene expression in endogenous stem cells without the need to isolate them or to generate complex, multi-allelic transgenic animals.

Many currently proposed CRISPR/cas9 based genetic modification treatment modalities comprises ex vivo methods wherein the target cell population is removed from the patient prior to modification. However, solid tissues cannot necessarily be removed from patients, limiting the applicability of these methods. Furthermore, removal of tissues such as hematopoetic cells carries significant risks of graft failure and infection, and require expensive GMP facilities for handling the ex vivo cells. Removal of tissues can also disrupt the functioning of the cells in the tissue due to loss of the cells native niche and regulatory interactions. Thus, there remains a need for in situ gene modification methods, especially for cells that cannot easily be removed from a subject's body.

SUMMARY OF THE INVENTION

Disclosed is a powerful new system to genetically alter cells within their physiological niche while preserving their native stem cell properties and regulatory interactions. Specifically, the system allows for manipulation of stem cell genomes in situ, without requiring cell isolation, culture or subsequent transplantation, thereby preserving native regulatory interactions and extant stem cell properties. This system also mitigates challenges and toxicities associated with ex vivo stem cell modification and subsequent transplantation, such as the failure of in vitro conditions to maintain robust stem cell function, the necessary use of ablative conditioning and the unavoidable risk of graft failure (Morgan et al., 2017). Thus, the opportunity to directly transduce endogenous tissue stem cells with DNA modifying enzymes is of direct and specific relevance for currently ongoing academic and commercial efforts aimed at therapeutic gene editing in stem cells, all of which have, to this point, considered it necessary to purify stem cells for ex vivo modification and re-infusion (Morgan et al., 2017).

The AAV-based in vivo system described herein also overcomes critical technological and practical limitations associated with current experimental systems for interrogating stem cell function. In particular, commonly employed transgenic and gene knockout-based models frequently require complex breeding schemes to introduce multiple alleles, necessitating significant investment of both time and resources, and become even more problematic when assessing gene targeting effects in aged animals, in non-standard genetic backgrounds, or in combinatorial fashion. In contrast, AAV-mediated delivery of programmable DNA modifying enzymes, as disclosed herein, can be applied across a range of animal ages and strains and to a variety of individual and multiplexed genetic loci. This technology is therefore likely to have important applications in accelerating the pace at which gene functions and interactions can be interrogated in vivo and in tissue progenitors. Ultimately, this system may be adapted to enable rapid and direct in vivo screening of candidate and unknown gene targets suspected to specifically influence stem cell phenotypes.

Some aspects of the disclosure are directed to a method for modifying the genome of a population of cells in a subject in vivo, comprising contacting the subject with a virus, wherein the virus transduces a nucleic acid sequence encoding a sequence-targeting nuclease into the population of cells; and modifying the genome of the population of cells (e.g., the genome of cells within the population of cells) with the sequence-targeting nuclease, wherein the population of cells are not hematopoietic stem cells or hematopoietic progenitor cells. In some embodiments, the method is selective for the population of cells or is selective to exclude one or more other populations of cells (any population of cells disclosed herein or known in the art may be excluded). In some embodiments, the virus is adeno-associated virus (AAV). In some embodiments, the AAV is AAV serotype 1, 2, 6, 8, 9, 10, or Anc80L65. In some embodiments, the virus is administered locally or systemically. In some embodiments, the virus is administered intravenously. In some embodiments, the virus is locally injected (e.g., into the tissue comprising the population of cells (i.e., the target population of cells).

In some embodiments, the sequence-targeting nuclease is a Zinc-Finger Nuclease (ZFN), a Transcription activator-like effector nuclease (TALEN), a Cre recombinase, or an RNA-guided nuclease (e.g., Cas9 nuclease). In some embodiments, the sequence-targeting nuclease is a Cas9 nuclease. In some embodiments, the virus further transduces a nucleic acid sequence encoding one or more gRNAs in the population of cells.

In some embodiments, the method further comprises contacting the subject with a second virus which transduces a nucleic acid sequence encoding one or more gRNAs in the population of cells. In some embodiments, the second virus is an AAV. In some embodiments, the AAV is AAV serotype 1, 2, 6, 8, 9 10, or Anc80L65.

In some embodiments, the population of cells is stem cells or progenitor cells. In some embodiments, the population of cells is tissue stem cells (e.g., solid tissue stem cells). In some embodiments, the population of cells is functional muscle stem cells. In some embodiments, the population of cells is Sca-1$^+$ mesenchymal progenitor cells in skeletal muscle. In some embodiments, the population of cells is dermal mesenchymal cells (CD140a$^+$) in skin tissue. In some embodiments of the invention, the population of cells is progenitor cells (e.g., hematopoietic progenitor cell population, common myeloid progenitor population, granulocyte monocyte progenitor population, megakaryocyte erythroid progenitor population, lineage committed erythroid precursor population).

In some embodiments, the modification comprises the introduction or correction of a mutation. In some embodiments, the modification comprises correction of a mutation via homology-directed repair.

In some embodiments, the subject is human or a mouse.

In some embodiments, at least 10%, 15%, 20%, 25%, 30%, 35%, 40%, 45%, 50%, 55%, 60%, or more of the population of cells is transduced by the virus (e.g., the first virus or second virus, or both the first virus and second virus). In some embodiments, at least 40% of the population of cells is transduced by the virus (e.g., the first virus or second virus, or both the first virus and second virus).

Some aspects of the disclosure are directed towards a method for modifying the genome of a population of muscle stem cells in a subject in vivo, comprising contacting the subject with a virus, wherein the virus transduces a nucleic acid sequence encoding a sequence-targeting nuclease into the population of muscle stem cells; and modifying the genome of the population of muscle stem cells with the sequence-targeting nuclease, wherein the virus is administered to the subject via intravenous injection, and wherein the modified muscle stem cells retain myogenic capacity. In some embodiments, the virus further transduces a nucleic acid sequence encoding one or more gRNAs in the population of cells.

In some embodiments, the virus is AAV8 or Anc80L65. In some embodiments, at least 10%, 15%, 20%, 25%, 30%, 35%, 40%, 45%, 50%, 55%, 60%, 65%, 70%, 75% or more of the population of muscle stem cells is transduced by the virus. In some embodiments, at least 50% of the population of muscle stem cells is transduced by the virus.

In some embodiments, the sequence-targeting nuclease is a Zinc-Finger Nuclease (ZFN), a Transcription activator-like effector nuclease (TALEN), a Cre recombinase, or an RNA-guided nuclease (e.g., Cas9 nuclease). In some embodiments, the sequence-targeting nuclease is an saCas9 nuclease.

In some embodiments, the method further comprises contacting the subject with a second virus which transduces a nucleic acid sequence encoding one or more gRNAs in the population of cells.

In some embodiments, the modification comprises the introduction or correction of a mutation. In some embodiments, the modification comprises correction of a mutation via homology-directed repair.

In some embodiments, the subject is human. In some embodiments, the subject is a mouse.

Some aspects of the disclosure are directed towards a method for modifying the genome of a population of mesenchymal progenitor cells in a subject in vivo, comprising contacting the subject with a virus, wherein the virus transduces a nucleic acid sequence encoding a sequence-targeting nuclease into the population of mesenchymal progenitor cells; and modifying the genome of the population of mesenchymal progenitor cells with the sequence-targeting nuclease. In some embodiments, the virus further transduces a nucleic acid sequence encoding one or more gRNAs in the population of cells.

In some embodiments, the mesenchymal progenitor cells are Sca-1$^+$. In some embodiments, the mesenchymal progenitor cells are located in skeletal muscle. In some embodiments, the mesenchymal progenitor cells are located in skeletal muscle and are Sca-1$^+$.

In some embodiments, the virus is AAV8, AAV9 or Anc80L65. In some embodiments, at least 11% of the population of mesenchymal progenitor cells is transduced by the virus. In some embodiments, at least 5%, 10%, 15%, 20%, 25%, 30%, 35%, 40%, 45%, 50%, or more of the population of mesenchymal progenitor cells is transduced by the virus. In some embodiments, at least 20% of the population of mesenchymal progenitor cells is transduced by the virus.

In some embodiments, the sequence-targeting nuclease is a Zinc-Finger Nuclease (ZFN), a Transcription activator-like effector nuclease (TALEN), a Cre recombinase, or an RNA-guided nuclease (e.g., Cas9 nuclease). In some embodiments, the sequence-targeting nuclease is an saCas9 nuclease.

In some embodiments, the method further comprises contacting the subject with a second virus which transduces a nucleic acid sequence encoding one or more gRNAs in the population of cells. In some embodiments, the modification comprises the introduction or correction of a mutation. In some embodiments, the modification comprises correction of a mutation via homology-directed repair.

In some embodiments, the virus is administered to the subject via local injection or intravenous injection. In some embodiments, the subject is human. In some embodiments, the subject is a mouse.

Some aspects of the disclosure are directed towards a method for modifying the genome of a population of dermal mesenchymal cells in a subject in vivo, comprising contacting the subject with a virus, wherein the virus transduces a nucleic acid sequence encoding a sequence-targeting nuclease into the population of dermal mesenchymal cells; and modifying the genome of the population of dermal mesenchymal cells with the sequence-targeting nuclease. In some embodiments, the virus further transduces a nucleic acid sequence encoding one or more gRNAs in the population of cells.

In some embodiments, the virus is AAV8. In some embodiments, the sequence-targeting nuclease is a Zinc-Finger Nuclease (ZFN), a Transcription activator-like effector nuclease (TALEN), a Cre recombinase, or an RNA-guided nuclease (e.g., Cas9 nuclease). In some embodiments, the sequence-targeting nuclease is an saCas9 nuclease.

In some embodiments, the method further comprises contacting the subject with a second virus which transduces a nucleic acid sequence encoding one or more gRNAs in the population of cells. In some embodiments, the modification comprises the introduction or correction of a mutation. In some embodiments, the modification comprises correction of a mutation via homology-directed repair. In some embodiments, the subject is human. In some embodiments, the subject is a mouse.

BRIEF DESCRIPTION OF THE DRAWINGS

FIGS. 1A-1C show systemic AAV-Cre administration transduces muscle satellite cells. (FIG. 1A) Experimental design. AAVs encoding Cre recombinase were injected into mdx; Ai9 mice, which carry a Rosa26-LSL-tdTomato reporter. i.v.: intravenous. LSL: lox-stop-lox. (FIG. 1B) Representative flow cytometric analysis of skeletal muscle satellite cells isolated from mdx;Ai9 mice injected intravenously with AAV-Cre packaged in various serotypes at low (~5.5-8×10$^{11}$ vg) or high (~2.2×10$^{12}$ vg) dose. MuSCs: muscle satellite cells. (FIG. 1C) Quantification of the frequency of AAV-transduced and Cre-recombined tdTomato$^+$ muscle satellite cells. Data points from individual mice are overlaid with mean±SD. N=4 mice injected with each AAV serotype per group, N=3 vehicle-injected mice per group. vg: viral genomes. Anc80L65 abbreviated Anc80.

FIGS. 2A-2C show AAV-transduced muscle satellite cells retain differentiation and engraftment potential. (FIG. 2A) Representative immunofluorescence images of myosin heavy chain (MHC)-stained myotubes differentiated from muscle satellite cells isolated from mice injected with different AAV serotypes at low or high doses. Green, MHC. Red, tdTomato. Blue, Hoechst. Scale bar, 100 μm. Anc80L65 abbreviated Anc80. (FIG. 2B) Representative immunofluorescence images analyzing satellite cell engraftment in TA muscles from mdx mice that were either not transplanted (top row, control) or transplanted with 50,000 FACS-purified tdTomato$^+$ muscle satellite cells from high dose AAV-Cre-injected Ai9 mice (bottom row). TA muscles from 2 transplanted legs and 2 non-transplanted contralateral legs were analyzed 3 weeks post transplantation. White arrowheads denote Pax7$^+$ tdTomato$^-$ muscle satellite cells. White arrows denote Pax7$^+$ tdTomato$^+$ muscle satellite cells. TdTomato$^+$ myofibers are also apparent. Blue, DAPI. White, laminin Green, Pax7. Red, tdTomato. Scale bar, 20 μm. (FIG. 2C) Representative images analyzing muscle fiber engraftment in TA muscles from mdx mice 3 weeks after injection of vehicle only (top row, control) or of muscle satellite cells harvested from mdx;Ai9 mice injected previously with high dose AAV8-Cre (bottom row). Red, tdTomato. Green, wheat germ agglutinin (WGA). Blue, DAPI. Scale bar, 100 μm.

FIGS. 3A-3J show systemic injection of AAV-Cre transduces functional hematopoietic stem cells. (FIG. 3A) Experimental design. AAVs encoding Cre recombinase were injected into mdx; Ai9 mice, carrying the Rosa26-LSL-tdTomato reporter. i.v.: intravenous. LSL: lox-stop-lox. (FIG. 3B) HSC gating strategy (Lin$^-$Sca-1$^+$c-Kit$^+$CD48$^-$CD150$^+$) from bone marrow (BM) and representative flow cytometric analysis of tdTomato expression within HSCs. (FIG. 3C) Frequency of HSCs expressing tdTomato. Data points from individual mice are overlaid with mean±SD. N=4 mice injected with each AAV serotype per group, N=3 vehicle-injected mice per group. (FIG. 3D) Percent donor chimerism among live peripheral blood cells of primary recipients at monthly intervals post transplantation. Data are mean±SD. N=8 primary recipients per group. (FIG. 3E) Frequency of primary recipients with tdTomato$^+$ multilineage engraftment within the indicated peripheral blood lineages at 16 weeks post-transplant. For each lineage, tdTomato$^+$ engraftment was scored based on satisfaction of two criteria: >1% CD45.2$^+$ cells and >1% tdTomato$^+$ among CD45.2$^+$ cells. (FIGS. 3F-I) Frequency of tdTomato$^+$ cells among live CD45.2$^+$ peripheral blood (FIG. 3F) T cells, (FIG. 3G) B cells, (FIG. 3H) Monocytes and (FIG. 3I) Neutrophils in primary recipients at 16 weeks post transplantation. For each lineage, only recipients exhibiting >1% CD45.2$^+$ cells within that lineage are shown. Individual data points are shown overlaid with mean±SD. N=6-8 primary recipients per group. (FIG. 3J) Percentage of tdTomato$^+$ HSCs among CD45.2+ HSCs in primary recipients at 6 months post transplantation Individual data points are shown overlaid with mean±SD. N=6-8 primary recipients per group. vg: viral genomes. Anc80L65 abbreviated Anc80.

FIGS. 4A-4G show AAV-transduced hematopoietic stem cells exhibit long-term reconstitution potential following secondary transplantation. (FIG. 4A) Percent donor chimerism among live peripheral blood cells in secondary recipients at monthly intervals post-transplantation. Data are mean±SD. N=6-9 secondary recipients per group. (FIG. 4B) Frequency of secondary recipients with tdTomato$^+$ multilineage engraftment within indicated peripheral blood lineages at 16 weeks post-transplant. tdTomato$^+$ engraftment was determined using same criteria as in FIG. 3E. (FIGS. 4C-4F) Frequency of tdTomato$^+$ cells among live CD45.2$^+$ peripheral blood (FIG. 4C) T cells, (FIG. 4D) B cells, (FIG. 4E) Monocytes and (FIG. 4F) Neutrophils in secondary recipients at 16 weeks post transplantation. For each lineage, only recipients exhibiting >1% CD45.2$^+$ cells within that lineage are shown. Individual data points are shown overlaid with mean±SD. N=6-9 mice per group. (FIG. 4G) Percentage of tdTomato$^+$ HSCs among CD45.2$^+$ HSCs in secondary recipients at 4-5 months post transplantation. Individual data points are shown overlaid with mean±SD. N=6-9 secondary recipients per group. vg: viral genomes. Anc80L65 abbreviated Anc80.

(FIG. 5A) Representative immunofluorescence images of tibialis anterior (TA) muscles collected from uninjected Ai9$^{fl/fl}$ mice (top) or from age-matched Ai9$^{fl/fl}$ mice 2 weeks after injection with high dose AAV8-Cre (bottom). N=4 injected mice analyzed. Scale bar, 20 μm. (FIG. 5B) Quantification of the frequency of tdTomato$^+$ Pax7$^+$ satellite cells within TA muscles of uninjected or high dose AAV8-Cre injected Ai9$^{fl/fl}$ mice. N=1 uninjected mouse analyzed; N=3 high dose AAV8-Cre-injected mice analyzed; 60-80 Pax7$^+$ sublaminar cells were quantified among ten distinct 0.181 mm$^2$ fields per TA muscle. Individual data points are overlaid with mean±SD. (FIG. 5C) Left: FACS gating strategy for Lin$^+$ (CD45$^+$/Mac-1$^+$/Ter119$^+$) hematopoietic cells and Sca-1$^+$ mesenchymal progenitors among myofiber-associated cells. Right: Gating strategy for β1-integrin$^+$/CXCR4$^+$ MuSCs (muscle satellite cells) from the Lin$^-$Sca-1$^-$ parent gate using established cell surface markers (Cerletti et al., 2008; Maesner et al., 2016; Sherwood et al., 2004). (FIG. 5D) Real-time PCR analysis of Pax7, Myf5, Myod1 and Myog expression in FACS-purified tdTomato$^+$ and tdTomato$^-$ satellite cells from mice injected with AAV8-Cre. Gapdh was used as a housekeeping gene. For each gene, transcript levels were normalized to the tdTomato$^-$ group. p-value calculated by paired t-test. (FIG. 5E, FIG. 5F) Quantification of AAV-transduced and Cre-recombined tdTomato$^+$ Lin$^+$ hematopoietic cells (FIG. 5E) and Sca-1$^+$ mesenchymal progenitors (FIG. 5F). Individual data points overlaid with mean±SD. N=4 AAV-injected mice per group, N=3 vehicle-injected mice per group. (FIG. 5G) Representative fluorescence images of adipocytes differentiated ex vivo from Sca-1$^+$ mesenchymal progenitors isolated from mice injected with vehicle only (left column) or high dose AAV8-Cre (right column) Green, BODIPY (lipid stain). Red, tdTomato. Blue, Hoechst. Scale bar, 100 µm.

(FIG. 6A) FACS gating strategy for Lin$^+$ (CD45$^+$/Mac-1$^+$/Ter119$^+$) hematopoietic cells, Sca-1$^+$ mesenchymal progenitors, and Sca-1$^-$Lin$^-$Pax7-ZsGreen$^+$ MuSCs (muscle satellite cells). Myofiber-associated cells were harvested from TA muscles of Pax7-ZsGreen$^{+/-}$; mdx;Ai9$^{fl/+}$ mice injected with $6\times10^{11}$ viral genomes (vg) of AAV-Cre. (FIG. 6B-FIG. 6D) Quantification of AAV-transduced and Cre-recombined tdTomato$^+$ Lin$^+$ hematopoietic cells (FIG. 6B), Sca-1$^+$ mesenchymal progenitors (FIG. 6C), and Sca-1$^-$Lin$^-$ Pax7-ZsGreen$^+$ muscle satellite cells (FIG. 6D). Individual data points overlaid with mean±SD. N=2-3 mice each group.

(FIG. 7A) FACS gating strategy for erythroid precursor cells: EryA (Ter119$^+$CD71$^+$FSC$^{high}$); EryB (Ter119$^+$CD71$^+$ FSC$^{low}$); and EryC (Ter119$^+$CD71$^-$ FSC$^{low}$). (FIG. 7B) FACS gating strategy for myeloid progenitor cells: Common Myeloid Progenitors (CMPs: Lin$^-$Sca-1$^-$c-Kit$^+$CD34$^+$FcγR$^{low}$); Granulocyte Monocyte Progenitors (GMPs: Lin$^-$Sca-1$^-$c-Kit$^+$CD34$^+$FcγR$^-$); and Megakaryocyte Erythroid Progenitors (MEPs: Lin$^-$Sca-1$^-$c-Kit$^+$CD34$^-$FcγR$^-$). (FIG. 7C-FIG. 7E) Frequency of (FIG. 7C) EryA, (FIG. 7D) EryB, and (FIG. 7E) EryC cells expressing tdTomato. Individual data points are overlaid with mean±SD. N=4 AAV-injected mice per group, N=3 vehicle-injected mice per group. (FIG. 7F-FIG. 7H) Frequency of (FIG. 7F) CMPs, (FIG. 7G) GMPs and (FIG. 7H) MEPs expressing tdTomato. Individual data points are overlaid with mean±SD. N=4 AAV-injected mice per group, N=3 vehicle-injected mice per group. Scale bar, 100 µm. Anc80L65 abbreviated Anc80. vg: viral genomes.

(FIG. 8A) Representative flow cytometric analysis of tdTomato expression within HSCs 6 weeks after intrafemoral administration of AAV-Cre. (FIG. 8B) Frequency of Lin$^-$Sca-1$^+$c-Kit$^+$CD48$^-$CD150$^+$ HSCs expressing tdTomato within injected legs (blue) or contralateral legs (red). Individual data points are overlaid with mean±SD. N=3-4 mice per group. circles: mice injected with $2\times10^{12}$ vg dose. triangles: mice injected with $4\times10^{12}$ vg dose. The presence of tdTomato$^+$ HSCs in the contralateral leg reflects systemic dissemination of locally administered virus. (FIG. 8C) Percent donor chimerism among live peripheral blood cells in primary recipients at 16 weeks post transplantation. Individual data points are overlaid with mean±SD. N=4-6 mice per group. (FIG. 8D) Frequency of primary recipients containing >1% CD45.2$^+$ cells and >1% tdTomato$^+$ among CD45.2$^+$ peripheral blood cells at 16 weeks post transplantation within indicated lineages. (FIG. 8E) Frequency of tdTomato$^+$ cells among live CD45.2$^+$ peripheral blood cells at 16 weeks post transplantation. Individual data points are overlaid with mean±SD. N=4-6 mice per group. (FIG. 8F) Percentage of tdTomato$^+$ HSCs among donor-derived HSCs at 8 months post transplantation. Individual data points are overlaid with mean±SD. N=2-5 mice per group. vg: viral genomes.

(FIG. 9A) Flow cytometry gating strategy to identify hematopoietic cells (CD45$^+$), dermal fibroblasts (CD45$^-$ CD140a$^+$) and four subsets of dermal fibroblasts based on CD24 and Sca-1 expression within the skin dermis. Cells were previously gated as live (DAPI$^-$) singlets. (FIG. 9B) Representative flow cytometric analysis of tdTomato fluorescence in CD45$^+$ cells from uninjected and high dose AAV8-Cre injected mice. (FIG. 9C) Representative immunofluorescence images of skin sections from uninjected and high dose AAV8-Cre injected mice. Green, CD140a. Red, tdTomato. Blue, DAPI. Scale bar, 50 µm. (FIG. 9D-FIG. 9G) Representative flow cytometric analysis of tdTomato fluorescence in (FIG. 9D) CD24$^+$ Sca-1$^-$ cells, (FIG. 9E) CD24$^+$ Sca-1$^+$ cells, (FIG. 9F) CD24$^-$ Sca-1$^-$ cells, and (FIG. 9G) CD24$^-$ Sca-1$^+$ cells. (FIG. 9H) Percentage of tdTomato$^+$ cells among each of the indicated skin cell populations from injected mice at 2 weeks post injection. Individual data points are overlaid with mean±SD. N=3 AAV-Cre injected mice.

(FIG. 10A) Representative Hematoxylin and Eosin (H&E) images of liver sections from vehicle-injected or AAV8-Cre injected mdx; Ai9 animals. Injections performed intravenously. (FIG. 10B) Liver histopathology scoring from a subset of AAV8-Cre injected and vehicle-injected mdx; Ai9 mice, along with an uninjected C57BL/6J WT (wildtype) control. Tissues contained some microabscesses, which are common in normal mice, and small necrotic foci, which occur occasionally in normal mice. Scale bar, 200 µm. vg: viral genomes.

FIGS. 11A-11F show in vivo editing of Dnmt3a with AAV-saCas9-gDnmt3a. FIG. 11A shows the percent of sequence reads that contain indels in amplified Dnmt3 sequence containing the Dnmta3 gRNA targeting site. FIG. 11B shows the percent of sequence reads in amplified Dnmt3 sequence containing the Dnmta3 gRNA targeting site that correspond to wild-type sequence. FIG. 11C shows a histogram of indels around the Dnmta3 gRNA targeting site in bone marrow cells. FIG. 11D shows a histogram of indels around the Dnmta3 gRNA targeting site in HSCs. FIG. 11E shows a histogram of indels around the Dnmta3 gRNA targeting site in MPPs. FIG. 11E shows a histogram of indels around the Dnmta3 gRNA targeting site in liver cells.

DETAILED DESCRIPTION OF THE INVENTION

Figure 1B:
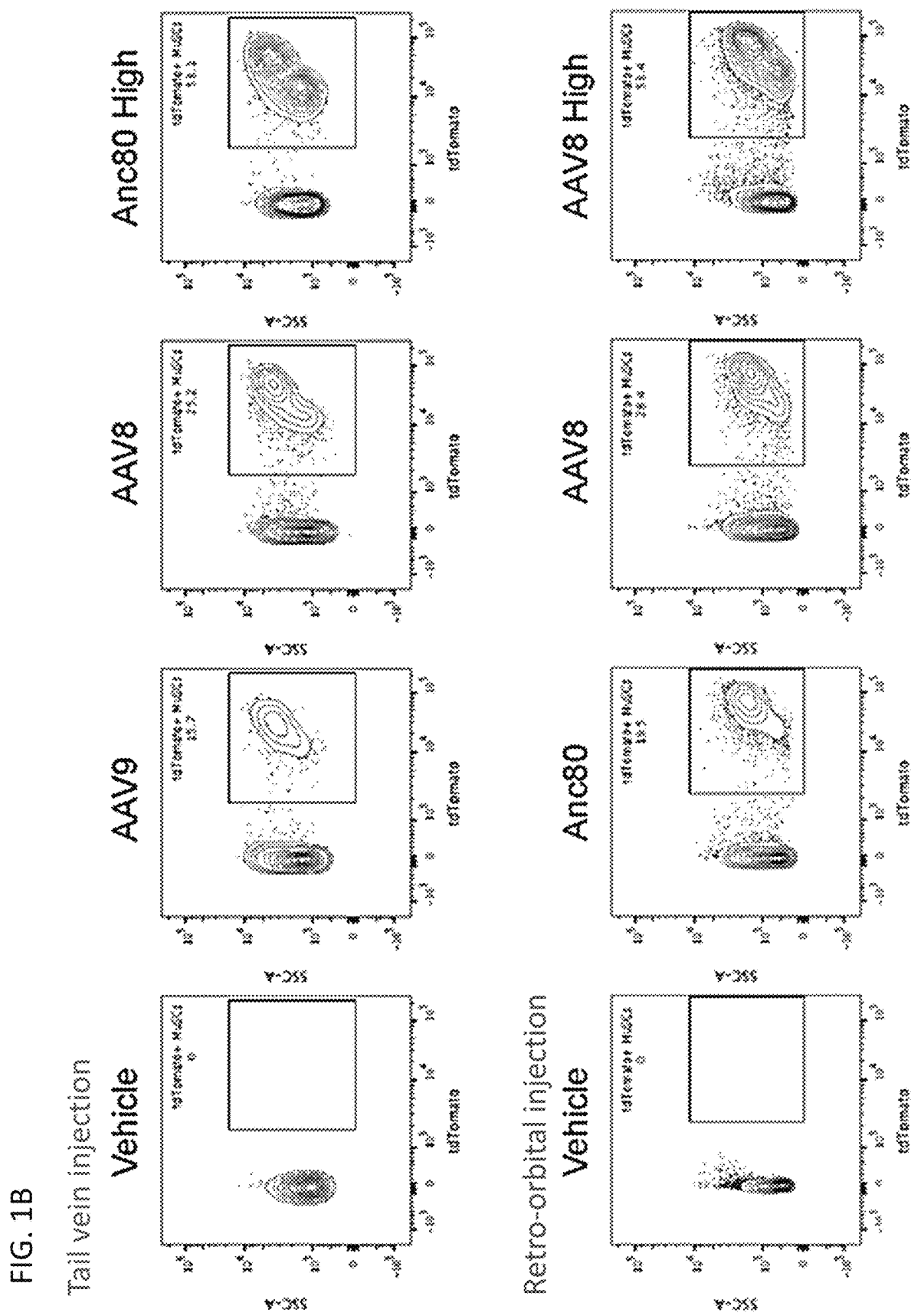

Disclosed are strategies (i.e., methods) for modification of DNA sequences within cells (e.g., tissue stem cells) in vivo (i.e., in situ). This strategy utilizes viral (e.g., AAV-mediated) delivery of sequence targeting nucleases into cells in situ. AAVs can be injected directly into the tissue to be modified or delivered systemically. Proof-of-concept with this system has been demonstrated in a number of different cell types using AAV-mediated delivery of Cre recombinase into a fluorescent reporter mouse (the Ai9 reporter, which exhibits red fluorescence upon excision of sequences flanked by loxP Cre-recognition sites). Editing of up to 65% of stem and progenitor cells in vivo and confirmed functionality of modified cells has been shown. Further, it is shown herein that an AAV transducing saCAS9 and a gRNA injected into a subject can specifically modify liver, bone marrow, HSCs, and MPPs.

In some aspects, the invention is directed towards a method for modifying the genome of a population of cells (e.g., targeted population of cells) in situ in a subject (e.g., human, mouse), comprising contacting the subject with a virus (e.g., adeno-associated virus (AAV)), wherein the virus transduces a nucleic acid sequence encoding a sequence targeting nuclease into the population of cells; and modifying the genome of the population of cells with the sequence targeting nuclease. In some embodiments, the cell population is a stem cell population, a tissue stem cell population, a muscle stem cell population (e.g., functional muscle stem cell population), a mesenchymal progenitor cell population, a Sca-1$^+$ mesenchymal progenitor cell population, a mesenchymal progenitor cell in skeletal muscle population, a dermal mesenchymal cell population, or a CD140a+ dermal mesenchymal cell population. In some embodiments, the population of cells is not a hematopoietic stem cell or a hematopoietic progenitor cell population. In some embodiments, the cell population is a progeny cell of a stem cell population, a tissue stem cell population, a muscle stem cell population (e.g., functional muscle stem cell population), a mesenchymal progenitor cell population, a Sca-1$^+$ mesenchymal progenitor cell population, a mesenchymal progenitor cell in skeletal muscle population, a dermal mesenchymal cell population, a multipotent progenitor population, or a CD140a$^+$ dermal mesenchymal cell population. In some embodiments, the population of cells is a progenitor cell population (e.g., hematopoietic progenitor cell population, Common Myeloid Progenitor population, Granulocyte Monocyte Progenitor population, Megakaryocyte Erythroid Progenitor population, Lineage committed Erythroid Precursor population). In some embodiments, the population of cells is a liver tissue cell population. In some embodiments, the population of cells is a bone marrow cell population.

In some embodiments, at least about 0.1%, 0.5%, 1%, 2%, 3%, 5%, 10%, 15%, 20%, 25%, 30%, 35%, 40%, 45%, 50%, 55%, 60%, 65%, 70%, 75%, 80%, 90% or more of the cells or a subset (e.g., cells having a particular cell surface marker or set of markers) thereof are modified. In some embodiments, at least about 0.1%, 0.5%, 1%, 2%, 3%, 5%, 10%, 15%, 20%, 25%, 30%, 35%, 40%, 45%, 50%, 55%, 60%, 65%, 70%, 75%, 80%, 90% or more of the genome of the cells or a subset thereof are modified via homologous recombination (e.g., a genomic sequence is replaced or inserted). In some embodiments, at least about 0.1%, 0.5%, 1%, 2%, 3%, 5%, 10%, 15%, 20%, 25%, 30%, 35%, 40%, 45%, 50%, 55%, 60%, 65%, 70%, 75%, 80%, 90% or more of the genome of the cells or a subset thereof are modified via non-homologous end-joining (NHEJ) (e.g., a genomic sequence is deleted). In some embodiments, the modification comprises a modification of at least one allele. In some embodiments, the modification comprises modification of both alleles.

In some embodiments, at least about 1.1-fold, 1.2-fold, 1.3-fold, 1.4-fold, 1.5-fold, 1.6-fold, 1.7-fold, 1.8-fold, 1.9-fold, 2-fold, 2.5-fold, 3-fold, 3.5-fold, 4-fold, 5-fold, 10-fold, 20-fold, 50-fold, 100-fold, or more of the population of cells are modified as compared to a non-targeted population of cells (e.g., a different population of cells also contacted with the virus, such as another cell type in the tissue comprising the targeted population of cells).

As used herein, a "subject" means a human or animal (e.g., a primate). Usually the animal is a vertebrate such as a primate, rodent, domestic animal or game animal. Primates include chimpanzees, cynomologous monkeys, spider monkeys, and macaques, e.g., Rhesus. Rodents include mice, rats, woodchucks, ferrets, rabbits and hamsters. Domestic and game animals include cows, horses, pigs, deer, bison, buffalo, feline species, e.g., domestic cat, canine species, e.g., dog, fox, wolf, avian species, e.g., chicken, emu, ostrich, and fish, e.g., trout, catfish and salmon. Patient or subject includes any subset of the foregoing, e.g., all of the above, but excluding one or more groups or species such as humans, primates or rodents. In certain embodiments, the subject is a mammal, e.g., a primate, e.g., a human. The terms, "patient", "individual" and "subject" are used interchangeably herein. Preferably, the subject is a mammal. The mammal can be a human, non-human primate, mouse, rat, dog, cat, horse, or cow, but are not limited to these examples. A subject can be male or female. A "subject" may be any vertebrate organism in various embodiments. A subject may be individual to whom an agent is administered, e.g., for experimental, diagnostic, and/or therapeutic purposes or from whom a sample is obtained or on whom a procedure is performed. In some embodiments, a human subject is between newborn and 6 months old. In some embodiments, a human subject is between 6 and 24 months old. In some embodiments, a human subject is between 2 and 6, 6 and 12, or 12 and 18 years old. In some embodiments a human subject is between 18 and 30, 30 and 50, 50 and 80, or greater than 80 years old. In some embodiments, the subject is at least about 5, 10, 20, 30, 40, 50, 60, 65, 70, 75, 80, 85, or 90 years of age. In some embodiments, the subject is less than about 5, 10, 20, 30, 40, 50, 60, 65, 70, 75, 80, 85, or 90 years of age. In some embodiments, a subject is an adult. For purposes hereof a human at least 18 years of age is considered an adult. In some embodiments, the subject is a juvenile (e.g., less than about 18, 12 or 6 years of age for a human subject). In some embodiments, the subject is not a juvenile (e.g., less than about 18, 12 or 6 years of age for a human subject). In some embodiments a subject is an embryo. In some embodiments a subject is a fetus. In certain embodiments an agent is administered to a pregnant female in order to treat or cause a biological effect on an embryo or fetus in utero.

As used herein, "contacting" a cell with one or more viruses can comprise administration of the virus systemically (e.g., intravenously) or locally (e.g., local injection into skin tissue, muscle tissue, or other targeted tissue or organ) into the subject. Alternatively, other routes of administration may be selected (e.g., oral, inhalation, intranasal, intratracheal, intraarterial, intraocular, intravenous, intramuscular, and other parental routes). The method of contacting is not limited and may be any suitable method available in the art.

As used herein, the term "nucleic acid" or "nucleic acid sequence" refers to any molecule, preferably a polymeric molecule, incorporating units of ribonucleic acid, deoxyribonucleic acid or an analog thereof. The nucleic acid can be either single-stranded or double-stranded. A single-stranded nucleic acid can be one strand nucleic acid of a denatured double stranded DNA. Alternatively, it can be a single-stranded nucleic acid not derived from any double stranded DNA. In one aspect, the template nucleic acid is DNA. In another aspect, the template is RNA. Suitable nucleic acid molecules are DNA, including genomic DNA or cDNA. Other suitable nucleic acid molecules are RNA, including mRNA. The nucleic acid molecule can be naturally occurring, as in genomic DNA, or it may be synthetic, i.e., prepared based upon human action, or may be a combination of the two. The nucleic acid molecule can also have certain modification such as 2'-deoxy, 2'-deoxy-2'fluoro, 2'-0-methyl, 2'-0-methoxyethyl (2'-0-MOE), 2'-0-aminopropyl (2'-0-AP), 2'-0-dimethylaminoethyl (2'-0-DMAOE), 2'-0-dimethylaminopropyl (2'-0-DMAP), 2'-0-dimethylamino-ethyloxyethyl (2'-0-DMAEOE), or 2'-0-N-methylacetamido (2'-0-NMA), cholesterol addition, and phosphorothioate backbone as described in US Patent Application 20070213292; and certain ribonucleoside that are is linked between the 2'-oxygen and the 4'-carbon atoms with a methylene unit as described in U.S. Pat. No. 6,268,490, wherein both patent and patent application are incorporated hereby reference in their entirety.

In some embodiments, virus compositions can be formulated in dosage units to contain an amount of replication-defective virus that is in the range of about $1.0 \times 10^9$ GC to about $1.0 \times 10^{15}$ GC (to treat an average subject of 70 kg in body weight), and preferably $1.0 \times 10^{12}$ GC to $1.0 \times 10^{14}$ GC for a human patient. Preferably, the dose of replication-defective virus in the formulation is $1.0 \times 10^9$ GC, $5.0 \times 10^9$ GC, $1.0 \times 10^{10}$ GC, $5.0 \times 10^{10}$ GC, $1.0 \times 10^{11}$ GC, $5.0 \times 10^{11}$ GC, $1.0 \times 10^{12}$ GC, $5.0 \times 10^{12}$ GC, or $1.0 \times 10^{13}$ GC, $5.0 \times 10^{13}$ GC, $1.0 \times 10^{14}$ GC, $5.0 \times 10^{14}$ GC, or $1.0 \times 10^{15}$ GC. In some embodiments, the dose of replication-defective virus in the formulation is $5.5-8 \times 10^{11}$ or $2.2 \times 10^{12}$ viral genomes (vg).

Suitable viruses for use in the methods disclosed throughout the specification include, e.g., adenoviruses, adeno-associated viruses, retroviruses (e.g., lentiviruses), vaccinia virus and other poxviruses, herpesviruses (e.g., herpes simplex virus), and others. The virus may or may not contain sufficient viral genetic information for production of infectious virus when introduced into host cells, i.e., viral vectors may be replication-competent or replication-defective.

In some embodiments, the virus is adeno-associated virus. Adeno-associated virus (AAV) is a small (20 nm) replication-defective, nonenveloped virus. The AAV genome a single-stranded DNA (ssDNA) about 4.7 kilobase long. The genome comprises inverted terminal repeats (ITRs) at both ends of the DNA strand, and two open reading frames (ORFs): rep and cap. The AAV genome integrates most frequently into a particular site on chromosome 19. Random incorporations into the genome take place with a negligible frequency. The integrative capacity may be eliminated by removing at least part of the rep ORF from the vector resulting in vectors that remain episomal and provide sustained expression at least in non-dividing cells. To use AAV as a gene transfer vector, a nucleic acid comprising a nucleic acid sequence encoding a desired protein or RNA, e.g., encoding a polypeptide or RNA that inhibits ATPIF1, operably linked to a promoter, is inserted between the inverted terminal repeats (ITR) of the AAV genome. Adeno-associated viruses (AAV) and their use as vectors, e.g., for gene therapy, are also discussed in Snyder, RO and Moullier, P., Adeno-Associated Virus Methods and Protocols, Methods in Molecular Biology, Vol. 807. Humana Press, 2011.

In some embodiments, the virus is AAV serotype 1, 2, 6, 8, 9, 10 or Anc80 (i.e., Anc80L65) (disclosed in WO2015054653, incorporated herein by reference). Any AAV serotype, or modified AAV serotype, may be used as appropriate and is not limited.

Another suitable AAV may be, e.g., rh10 [WO 2003/042397]. Still other AAV sources may include, e.g., AAV9 [U.S. Pat. No. 7,906,111; US 2011-0236353-A1], and/or hu37 [see, e.g., U.S. Pat. No. 7,906,111; US 2011-0236353-A1], AAV1, AAV2, AAV3, AAV4, AAVS, AAV6, AAV6.2, AAV7, AAV8, [U.S. Pat. Nos. 7,790,449; 7,282,199] and others. See, e.g., WO 2003/042397; WO 2005/033321, WO 2006/110689; U.S. Pat. Nos. 7,790,449; 7,282,199; U.S. 7,588,772B2 for sequences of these and other suitable AAV, as well as for methods for generating AAV vectors. Still other AAV may be selected, optionally taking into consideration tissue preferences of the selected AAV capsid. A recombinant AAV vector (AAV viral particle) may comprise, packaged within an AAV capsid, a nucleic acid molecule containing a 5' AAV ITR, the expression cassettes described herein and a 3' AAV ITR. As described herein, an expression cassette may contain regulatory elements for an open reading frame(s) within each expression cassette and the nucleic acid molecule may optionally contain additional regulatory elements.

In some embodiments, the AAV serotype has troposim for or preferentially transduces the targeted population of cells. In some embodiments, the AAV serotype has troposim for or preferentially transduces the targeted population of cells about 1.1-fold, 1.2-fold, 1.3-fold, 1.4-fold, 1.5-fold, 1.6-fold, 1.7-fold, 1.8-fold, 1.9-fold, 2-fold, 2.5-fold, 3-fold, 3.5-fold, 4-fold, 5-fold, 10-fold, 20-fold, 50-fold, 100-fold, or more as compared to a non-targeted population of cells (e.g., a different population of cells also contacted with the virus, such as another cell type in the tissue comprising the targeted population of cells). In some embodiments, the AAV serotype substantially or only transduces the targeted population of cells.

The AAV vector may contain a full-length AAV 5' inverted terminal repeat (ITR) and a full-length 3' ITR. A shortened version of the 5' ITR, termed AITR, has been described in which the D-sequence and terminal resolution site (trs) are deleted. The abbreviation "sc" refers to self-complementary. "Self-complementary AAV" refers a construct in which a coding region carried by a recombinant AAV nucleic acid sequence has been designed to form an intra-molecular double-stranded DNA template. Upon infection, rather than waiting for cell mediated synthesis of the second strand, the two complementary halves of scAAV will associate to form one double stranded DNA (dsDNA) unit that is ready for immediate replication and transcription. See, e.g., D M McCarty et al, "Self-complementary recombinant adeno-associated virus (scAAV) vectors promote efficient transduction independently of DNA synthesis", Gene Therapy, (August 2001), Vol 8, Number 16, Pages 1248-1254. Self-complementary AAVs are described in, e.g., U.S. Pat. Nos. 6,596,535; 7,125,717; and 7,456,683, each of which is incorporated herein by reference in its entirety.

Where a pseudotyped AAV is to be produced, the ITRs are selected from a source which differs from the AAV source of the capsid. For example, AAV2 ITRs may be selected for use with an AAV capsid having a particular efficiency for a selected cellular receptor, target tissue or viral target. In one embodiment, the ITR sequences from AAV2, or the deleted version thereof (AITR), are used for convenience and to accelerate regulatory approval. However, ITRs from other AAV sources may be selected. Where the source of the ITRs is from AAV2 and the AAV capsid is from another AAV source, the resulting vector may be termed pseudotyped. However, other sources of AAV ITRs may be utilized.

A single-stranded AAV viral vector may be used. Methods for generating and isolating AAV viral vectors suitable for delivery to a subject are known in the art. See, e.g., U.S. Pat. Nos. 7,790,449; 7,282,199; WO 2003/042397; WO 2005/033321, WO 2006/110689; and U.S. Pat. No. 7,588,772 B2. In one system, a producer cell line is transiently transfected with a construct that encodes the transgene flanked by ITRs and a construct(s) that encodes rep and cap. In a second system, a packaging cell line that stably supplies rep and cap is transfected (transiently or stably) with a construct encoding the transgene flanked by ITRs. In each of these systems, AAV virions are produced in response to infection with helper adenovirus or herpesvirus, requiring the separation of the rAAVs from contaminating virus. More recently, systems have been developed that do not require infection with helper virus to recover the AAV—the required helper functions (i.e., adenovirus E1, E2a, VA, and E4 or herpesvirus UL5, ULB, UL52, and UL29, and herpesvirus polymerase) are also supplied, in trans, by the system. In these newer systems, the helper functions can be supplied by transient transfection of the cells with constructs that encode the required helper functions, or the cells can be engineered to stably contain genes encoding the helper functions, the expression of which can be controlled at the transcriptional or posttranscriptional level. In yet another system, the transgene flanked by ITRs and rep/cap genes are introduced into insect cells by infection with baculovirus-based vectors. For reviews on these production systems, see generally, e.g., Zhang et al, 2009, "Adenovirus-adeno-associated virus hybrid for large-scale recombinant adeno-associated virus production," Human Gene Therapy 20:922-929, the contents of each of which is incorporated herein by reference in its entirety. Methods of making and using these and other AAV production systems are also described in the following U.S. patents, the contents of which is incorporated herein by reference in its entirety: U.S. Pat. Nos. 5,139,941; 5,741, 683; 6,057,152; 6,204,059; 6,268,213; 6,491,907; 6,660, 514; 6,951,753; 7,094,604; 7,172,893; 7,201,898; 7,229, 823; and 7,439,065.

In another embodiment, other viral vectors may be used, including integrating viruses, e.g., herpesvirus or lentivirus, although other viruses may be selected. Suitably, where one of these other vectors is generated, it is produced as a replication-defective viral vector. A "replication-defective virus" or "viral vector" refers to a synthetic or artificial viral particle in which an expression cassette containing a gene of interest is packaged in a viral capsid or envelope, where any viral genomic sequences also packaged within the viral capsid or envelope are replication-deficient; i.e., they cannot generate progeny virions but retain the ability to infect target cells. In one embodiment, the genome of the viral vector does not include genes encoding the enzymes required to replicate (the genome can be engineered to be "gutless"—containing only the transgene of interest flanked by the signals required for amplification and packaging of the artificial genome), but these genes may be supplied during production.

The one or more viruses may contain a promoter capable of directing expression (e.g., expression of a sequence-targeting nuclease, donor template, and/or one or more gRNAs) in mammalian cells, such as a suitable viral promoter, e.g., from a cytomegalovirus (CMV), retrovirus, simian virus (e.g., SV40), papilloma virus, herpes virus or other virus that infects mammalian cells, or a mammalian promoter from, e.g., a gene such as EF1alpha, ubiquitin (e.g., ubiquitin B or C), globin, actin, phosphoglycerate kinase (PGK), etc., or a composite promoter such as a CAG promoter (combination of the CMV early enhancer element and chicken beta-actin promoter). In some embodiments a human promoter may be used. In some embodiments, the promoter is selected from a CMV promoter, U6 promoter, an H1 promoter, a constitutive promoter, and a ubiquitous promoter. In some embodiments, the promoter directs expression in a particular cell type (e.g., a targeted population of cells). For example, a muscle stem cell specific promoter, a mesenchymal progenitor cell specific promoter, or a dermal mesenchymal cell (CD140a+) specific promoter. In some embodiments, the promoter selectively directs expression in any population of cells described herein.

The sequence-targeting nucleases that can be used in the methods disclosed herein are not limited and may be any sequence-targeting nucleases disclosed herein. In some embodiments, the sequence-targeting nuclease is a Zinc-Finger Nuclease (ZFN), a Transcription activator-like effector nuclease (TALEN), an RNA-guided nuclease (e.g., a Cas nuclease (e.g., Cas9 nuclease)), or a functional fragment or functional variant thereof.

There are currently four main types of sequence-targeting nucleases (i.e., targetable nucleases, site specific nucleases) in use: zinc finger nucleases (ZFNs), transcription activator—like effector nucleases (TALENs), and RNA-guided nucleases (RGNs) such as the Cas proteins of the CRISPR/Cas Type II system, and engineered meganucleases. ZFNs and TALENs comprise the nuclease domain of the restriction enzyme FokI (or an engineered variant thereof) fused to a site-specific DNA binding domain (DBD) that is appropriately designed to target the protein to a selected DNA sequence. In the case of ZFNs, the DNA binding domain (DBD) comprises a zinc finger DBD. In the case of TALENs, the site-specific DBD is designed based on the DNA recognition code employed by transcription activator—like effectors (TALEs), a family of site-specific DNA binding proteins found in plant-pathogenic bacteria such as Xanthomonas species.

The Clustered Regularly Interspaced Short Palindromic Repeats (CRISPR) Type II system is a bacterial adaptive immune system that has been modified for use as an RNA-guided endonuclease technology for genome engineering. The bacterial system comprises two endogenous bacterial RNAs called crRNA and tracrRNA and a CRISPR-associated (Cas) nuclease, e.g., Cas9. The tracrRNA has partial complementarity to the crRNA and forms a complex with it. The Cas protein is guided to the target sequence by the crRNA/tracrRNA complex, which forms a RNA/DNA hybrid between the crRNA sequence and the complementary sequence in the target. For use in genome modification, the crRNA and tracrRNA components are often combined into a single chimeric guide RNA (sgRNA or gRNA) in which the targeting specificity of the crRNA and the properties of the tracrRNA are combined into a single transcript that localizes the Cas protein to the target sequence so that the Cas protein can cleave the DNA. The sgRNA often comprises an approximately 20 nucleotide guide sequence complementary or homologous to the desired target sequence followed by about 80 nt of hybrid crRNA/tracrRNA. One of ordinary skill in the art appreciates that the guide RNA need not be perfectly complementary or homologous to the target sequence. For example, in some embodiments it may have one or two mismatches. The genomic sequence which the gRNA hybridizes is typically flanked on one side by a Protospacer Adjacent Motif (PAM) sequence although one of ordinary skill in the art appreciates that certain Cas proteins may have a relaxed requirement for a PAM sequence. The PAM sequence is present in the genomic DNA but not in the sgRNA sequence. The Cas protein will be directed to any DNA sequence with the correct target sequence and PAM sequence. The PAM sequence varies depending on the species of bacteria from which the Cas protein was derived. Specific examples of Cas proteins include Cas1, Cas2, Cas3, Cas4, Cas5, Cas6, Cas7, Cas8, Cas9 and Cas10. In some embodiments, the site specific nuclease comprises a Cas9 protein. For example, Cas9 from Streptococcus pyogenes (Sp), Neisseria meningitides, Staphylococcus aureus, Streptococcus thermophiles, or Treponema denticola may be used. The PAM sequences for these Cas9 proteins are NGG, NNNNGATT, NNAGAA, NAAAAC, respectively. In some embodiments, the Cas9 is from Staphylococcus aureus (saCas9).

A number of engineered variants of the site-specific nucleases have been developed and may be used in certain embodiments. For example, engineered variants of Cas9 and FokI are known in the art. Furthermore, it will be understood that a biologically active fragment or variant can be used. Other variations include the use of hybrid site specific nucleases. For example, in CRISPR RNA-guided FoId nucleases (RFNs) the FokI nuclease domain is fused to the amino-terminal end of a catalytically inactive Cas9 protein (dCas9) protein. RFNs act as dimers and utilize two guide RNAs (Tsai, Q S, et al., Nat Biotechnol. 2014; 32(6): 569-576). Site-specific nucleases that produce a single-stranded DNA break are also of use for genome editing. Such nucleases, sometimes termed "nickases" can be generated by introducing a mutation (e.g., an alanine substitution) at key catalytic residues in one of the two nuclease domains of a site specific nuclease that comprises two nuclease domains (such as ZFNs, TALENs, and Cas proteins). Examples of such mutations include D10A, N863A, and H840A in SpCas9 or at homologous positions in other Cas9 proteins. A nick can stimulate HDR at low efficiency in some cell types. Two nickases, targeted to a pair of sequences that are near each other and on opposite strands can create a single-stranded break on each strand ("double nicking"), effectively generating a DSB, which can optionally be repaired by HDR using a donor DNA template (Ran, F. A. et al. Cell 154, 1380-1389 (2013). In some embodiments, the Cas protein is a SpCas9 variant. In some embodiments, the SpCas9 variant is a R661A/Q695A/Q926A triple variant or a N497A/R661A/Q695A/Q926A quadruple variant. See Kleinstiver et al., "High-fidelity CRISPR-Cas9 nucleases with no detectable genome-wide off-target effects," Nature, Vol. 529, pp. 490-495 (and supplementary materials)(2016); incorporated herein by reference in its entirety. In some embodiments, the Cas protein is C2c1, a class 2 type V-B CRISPR-Cas protein. See Yang et al., "PAM-Dependent Target DNA Recognition and Cleavage by C2c1 CRISPR-Cas Endonuclease," Cell, Vol. 167, pp. 1814-1828 (2016); incorporated herein by reference in its entirety. In some embodiments, the Cas protein is one described in US 20160319260 "Engineered CRISPR-Cas9 nucleases with Altered PAM Specificity" incorporated herein by reference.

The nucleic acid encoding the sequence-targeting nuclease should be sufficiently short to be included in the virus (e.g., AAV). In some embodiments, the sequence-targeting nuclease is Cas9 from Staphylococcus aureus (saCas9).

In some embodiments, the sequence-targeting nuclease has at least about 80%, 85%, 90%, 91%, 92%, 93%, 94%, 95%, 96%, 97%, 98% or 99% polypeptide sequence identity to a naturally occurring sequence-targeting nuclease.

In some embodiments, the sequence targeting nuclease is a Zinc-Finger Nuclease (ZFN), a Transcription activator-like effector nuclease (TALEN), or an RNA-guided nuclease (e.g., Cas9 nuclease).

In some embodiments, the virus further transduces a nucleic acid sequence encoding one or more gRNAs in the population of cells. The gRNA is not limited and may be any gRNA described herein (e.g., a gRNA binding to a genetic region of interest, 2 gRNA that flank a genetic region of interest). In some embodiments, the virus transduces a single gRNA. In some embodiments, the virus transduces two gRNA.

In some embodiments, the method further comprises contacting the subject with a second virus (e.g., AAV) which transduces a nucleic acid sequence encoding one or more gRNAs in the cell population. In some embodiment, the ratio of the first virus to the second virus is about 1:3 to about 1:100, inclusive of intervening ratios. For example, the ratio of the first virus to the second virus may be about 1:5 to about 1:50, or about 1:10, or about 1:20. Although not as preferred, the ratio may be 1:1 or there may be more second virus.

In some embodiments, the second virus encodes for two gRNAs that flank a genetic region of interest, or one gRNA binding to a genetic region of interest. In some embodiments, the methods of the invention further comprise administration to the subject of homologous donor templates to enable therapeutic gene replacement in the cell population. Homologous recombination (HR) mediated repair (also termed homology-directed repair (HDR)) uses homologous donor DNA as a template to repair the break. If the sequence of the donor DNA differs from the genomic sequence, this process leads to the introduction of sequence changes into the genome.

In another embodiment, the method comprises a single AAV for delivery of gRNA and a second, different, Cas9-delivery system. For example, Cas9 (or Cpf1) delivery may be mediated by non-viral constructs, e.g., "naked DNA", "naked plasmid DNA", RNA, and mRNA; coupled with various delivery compositions and nanoparticles, including, e.g., micelles, liposomes, cationic lipid—nucleic acid compositions, poly-glycan compositions and other polymers, lipid and/or cholesterol-based—nucleic acid conjugates, and other constructs such as are described herein. See, e.g., X. Su et al, Mol. Pharmaceutics, 201 1, 8 (3), pp 774-787; web publication: Mar. 21, 2011; WO2013/182683, WO 2010/053572 and WO 2012/170930, both of which are incorporated herein by reference.

In some embodiments, the cell population to be modified is a stem cell population. In some embodiments, the cell population to be modified is a tissue stem cell population, a functional muscle stem cell population, a mesenchymal progenitor cell population, a Sca-1$^+$ mesenchymal progenitor cell, a mesenchymal progenitor cell in skeletal muscle population, a dermal mesenchymal cell population, or a CD140a$^+$ dermal mesenchymal cell population. In some embodiments, the cell population to be modified is not a hematopoietic stem cell population or a hematopoietic progenitor cell population.

In some embodiments, the methods disclosed herein further comprise assessing the fate or function of the cells with genomes modified by the methods disclosed herein. In some embodiments, cell engraftment, self-renewal and/or differentiation functions of the modified cells are assessed. In some embodiments, the myogenic, hematopoietic, fibrogenic, adipogenic, and/or osteogenic ability of the modified cells are assessed. In some embodiments, the morphology, growth rate, viability, metabolism, and/or metastatic potential of a cell.

In some embodiments, the methods and compositions disclosed herein treat or reduce the likelihood of a disease or condition. The methods disclosed herein contemplate treating and/or preventing a variety of disorders (i.e., diseases and conditions) which are associated with expression of a target polynucleotide sequences. It should be appreciated that the methods and compositions described herein can be used to treat or prevent disorders associated with increased expression of a target polynucleotide sequence, decreased expression of a target polynucleotide sequence, or absence of expression of a target polynucleotide sequence in a cell. Increased and decreased expression of a target polynucleotide sequence includes circumstances where the expression levels of the target polynucleotide sequence are increased or decreased, respectively, as well as circumstances in which the function and/or level of activity of an expression product of the target polynucleotide sequence increases or decreases, respectively, compared to normal expression and/or activity levels. Those skilled in the art will appreciate that treating or preventing a disorder associated with increased expression of a target polynucleotide sequence can be assessed by determining whether the levels and/or activity of the target polynucleotide sequence (or an expression product thereof) are decreased in a relevant cell after contacting a cell with a composition described herein. The skilled artisan will also appreciate that treating or preventing (e.g., reducing the likelihood of) a disorder associated with decreased expression of a target polynucleotide sequence can be assessed by determining whether the levels and/or activity of the target polynucleotide sequence (or an expression product thereof) are increased in the relevant cell after contacting a cell with a composition described herein.

In some embodiments, the disorder is a genetic disorder. In some embodiments, the disorder is a monogenic disorder. In some embodiments, the disorder is a multigenic disorder. In some embodiments, the disorder is a disorder associated with one or more SNPs. Exemplary disorders associated with one or more SNPs include a complex disease described in U.S. Pat. No. 7,627,436, Alzheimer's disease as described in PCT International Application Publication No. WO/2009/112882, inflammatory diseases as described in U.S. Patent Application Publication No. 2011/0039918, polycystic ovary syndrome as described in U.S. Patent Application Publication No. 2012/0309642, cardiovascular disease as described in U.S. Pat. No. 7,732,139, Huntington's disease as described in U.S. Patent Application Publication No. 2012/0136039, thromboembolic disease as described in European Patent Application Publication No. EP2535424, neurovascular diseases as described in PCT International Application Publication No. WO/2012/001613, psychosis as described in U.S. Patent Application Publication No. 2010/0292211, multiple sclerosis as described in U.S. Patent Application Publication No. 2011/0319288, schizophrenia, schizoaffective disorder, and bipolar disorder as described in PCT International Application Publication No. WO/2006/023719A2, bipolar disorder and other ailments as described in U.S. Patent Application Publication No. U.S. 2011/0104674, colorectal cancer as described in PCT International Application Publication No. WO/2006/104370A1, a disorder associated with a SNP adjacent to the AKT1 gene locus as described in U.S. Patent Application Publication No. U.S. 2006/0204969, an eating disorder as described in PCT International Application Publication No. WO/2003/012143A1, autoimmune disease as described in U.S. Patent Application Publication No. U.S. 2007/0269827, fibrostenosing disease in patients with Crohn's disease as described in U.S. Pat. No. 7,790,370, and Parkinson's disease as described in U.S. Pat. No. 8,187,811, each of which is incorporated herein by reference in its entirety. Other disorders associated with one or more SNPs which can be treated or prevented according to the methods of the present invention will be apparent to the skilled artisan.

In some embodiments, the disease or condition involves a stem cell or a tissue stem cell. In some embodiments, the disease or condition can be treated with a modified functional muscle stem cell. The modified functional muscle stem cells can be used for treatment of muscle diseases or disorders, such as muscular dystrophies, in a mammal in need of such treatment. Muscular dystrophies include Duchenne muscular dystrophy (DMD) Becker muscular dystrophy (BMD), myotonic dystrophy (also known as Steinert's disease), limb-girdle muscular dystrophies, facioscapulohumeral muscular dystrophy (FSH), congenital muscular dystrophies, oculopharyngeal muscular dystrophy (OPMD), distal muscular dystrophies and Emery-Dreifuss muscular dystrophy.

In some embodiments, the methods and compositions described herein can be used for the treatment or prevention of ischemic diseases (e.g., myocardial infarction, limb ischemia, stroke, transient ischemia, reperfusion injury) neuropathies (e.g., diabetic peripheral neuropathy, toxic neuropathy), liver failure, renal failure, diabetes, bone and joint diseases or any degenerative disease which requires stem cell therapy.

In some embodiments, the methods and compositions described herein can be used for treating neuropathy comprising modifying the genome of a cell in situ having the potential to differentiate into an endothelial cell (e.g., multipotent stem cells, endothelial progenitor cells, mesenchymal stem cells, mononuclear cells, or progenitors or progeny thereof) in a subject in need thereof, wherein the cell enhances angiogenesis in a neural tissue of interest. In some embodiments, the methods and compositions described herein can be used for treating neuropathy comprising modifying the genome of a cell in situ having the potential to differentiate into an endothelial cell (e.g., multipotent stem cells, endothelial progenitor cells, mesenchymal stem cells, mononuclear cells, or progenitors or progeny thereof) in a subject in need thereof, wherein the cell is in the microvasculature of a neural tissue of interest and increases angiogenesis, vascularity, or the biological function of the neural tissue. In yet another embodiment, the method provides a cell with a modified genome in situ having the potential to differentiate into an endothelial cell (e.g., multipotent stem cells, endothelial progenitor cells, mesenchymal stem cells, mononuclear cells, or progenitors or progeny thereof) in a subject in need thereof, wherein the cell augments a humoral response in the neural tissue sufficient to exert a therapeutic effect (e.g., an increase in paracrine factors, neurotrophic factors, angiogenic factors, or an increase in angiogenesis).

In another embodiment, the invention provides methods for treating liver failure, renal failure, or diabetes comprising modifying the genome of a cell in situ having the potential to transdifferentiate into a liver cell, renal cell, or insulin producing cell (e.g., a pancreatic islet cell) to a subject in need thereof, wherein the cell repairs or regenerates the tissue.

In some embodiments, the disease or condition can be treated with a modified mesenchymal progenitor cell in skeletal muscle. In some embodiments, the disease or condition can be treated with a modified dermal mesenchymal cell (CD140a+) in skin tissue. In some embodiments, the disease or condition is lipodystrophy (e.g., congenital generalized lipodystrophy (Beradinelli-Seip syndrome), familial partial lipodystrophy, Marfanoid-progeroid-lipodystrophy syndrome, CANDLE syndrome, acquired partial lipodystrophy (Barraquer-Simons syndrome), centrifugal abdominal lipodystrophy (Lipodystrophia centrifugalis abdominalis infantilis), lipoatrophia annularis (Ferreira-Marques lipoatrophia), or HIV-associated lipodystrophy). In some embodiments, cells with their genomes modified in situ are used for tissue cosmesis, tissue repair, or for the treatment of fat-related disorders.

As used herein, "treat," "treatment," "treating," or "amelioration" when used in reference to a disease, disorder or medical condition, refer to therapeutic treatments for a condition, wherein the object is to reverse, alleviate, ameliorate, inhibit, slow down or stop the progression or severity of a symptom or condition. The term "treating" includes reducing or alleviating at least one adverse effect or symptom of a condition. Treatment is generally "effective" if one or more symptoms or clinical markers are reduced. Alternatively, treatment is "effective" if the progression of a condition is reduced or halted. That is, "treatment" includes not just the improvement of symptoms or markers, but also a cessation or at least slowing of progress or worsening of symptoms that would be expected in the absence of treatment. Beneficial or desired clinical results include, but are not limited to, alleviation of one or more symptom(s), diminishment of extent of the deficit, stabilized (i.e., not worsening) state as compared to that expected in the absence of treatment.

The efficacy of a given treatment for a disorder or disease can be determined by the skilled clinician. However, a treatment is considered "effective treatment," as the term is used herein, if any one or all of the signs or symptoms of a disorder are altered in a beneficial manner, other clinically accepted symptoms are improved or ameliorated, e.g., by at least 10% following treatment with an agent or composition as described herein. Efficacy can also be measured by a failure of an individual to worsen as assessed by hospitalization or need for medical interventions (i.e., progression of the disease is halted). Methods of measuring these indicators are known to those of skill in the art and/or described herein.

Some aspects of the disclosure are directed towards a method for modifying the genome of a population of muscle stem cells in a subject in vivo, comprising contacting the subject with a virus, wherein the virus transduces a nucleic acid sequence encoding a sequence-targeting nuclease into the population of muscle stem cells; and modifying the genome of the population of muscle stem cells with the sequence-targeting nuclease, wherein the virus is administered to the subject via intravenous injection, and wherein the modified muscle stem cells retain myogenic capacity.

The AAV is not limited and may be any described herein. In some embodiments, the virus is AAV8 or Anc80L65. In some embodiments, at least 10%, 15%, 20%, 25%, 30%, 35%, 40%, 45%, 50%, 55%, 60%, 65%, 70%, 75% or more of the population of muscle stem cells is transduced by the virus. In some embodiments, at least 50% of the population of muscle stem cells is transduced by the virus.

The sequence-targeting nuclease is not limited and maybe any sequence-targeting nuclease described herein. In some embodiments, the sequence-targeting nuclease is a Zinc-Finger Nuclease (ZFN), a Transcription activator-like effector nuclease (TALEN), a Cre recombinase, or an RNA-guided nuclease. In some embodiments, the sequence-targeting nuclease is a Cas9 nuclease (e.g., saCas9).

In some embodiments, the virus further transduces a nucleic acid sequence encoding one or more gRNAs in the population of cells. The gRNA is not limited and may be any described herein.

In some embodiments, the method further comprises contacting the subject with a second virus which transduces a nucleic acid sequence encoding one or more gRNAs in the population of cells. The second virus is not limited and may be any described herein.

In some embodiments, the modification comprises the introduction or correction of a mutation. In some embodiments, the modification comprises correction of a mutation via homology-directed repair. In some embodiments, the modification treats, ameliorates or prevents a disease (e.g., a disease described herein).

The subject is not limited and may be any subject described herein. In some embodiments, the subject is human. In some embodiments, the subject is a mouse.

Some aspects of the disclosure are directed towards a method for modifying the genome of a population of mesenchymal progenitor cells in a subject in vivo, comprising contacting the subject with a virus, wherein the virus transduces a nucleic acid sequence encoding a sequence-targeting nuclease into the population of mesenchymal progenitor cells; and modifying the genome of the population of mesenchymal progenitor cells with the sequence-targeting nuclease.

In some embodiments, the mesenchymal progenitor cells are Sca-1$^+$. In some embodiments, the mesenchymal progenitor cells are located in skeletal muscle. In some embodiments, the mesenchymal progenitor cells are located in skeletal muscle and are Sca-1$^+$.

The virus is not limited and may be any described herein. In some embodiments, the virus is AAV8, AAV9 or Anc80L65. In some embodiments, at least 11% of the population of mesenchymal progenitor cells is transduced by the virus. In some embodiments, at least 5%, 10%, 15%, 20%, 25%, 30%, 35%, 40%, 45%, 50%, or more of the population of mesenchymal progenitor cells is transduced by the virus. In some embodiments, at least 20% of the population of mesenchymal progenitor cells is transduced by the virus.

The sequencing-targeting nuclease is not limited and may be any described herein. In some embodiments, the sequence-targeting nuclease is a Zinc-Finger Nuclease (ZFN), a Transcription activator-like effector nuclease (TALEN), a Cre recombinase, or an RNA-guided nuclease (Cas9 nuclease). In some embodiments, the sequence-targeting nuclease is a Cas9 nuclease (saCas9).

In some embodiments, the method further comprises contacting the subject with a second virus which transduces a nucleic acid sequence encoding one or more gRNAs in the population of cells. The second virus is not limited and may be any described herein. In some embodiments, the modification comprises the introduction or correction of a mutation. In some embodiments, the modification comprises correction of a mutation via homology-directed repair. In some embodiments, the modification treats, ameliorates or prevents a disease (e.g., a disease described herein).

In some embodiments, the virus is administered to the subject via local injection or intravenous injection. In some embodiments, the subject is human. The subject is not limited and may be any described herein. In some embodiments, the subject is a mouse.

Some aspects of the disclosure are directed towards a method for modifying the genome of a population of dermal mesenchymal cells in a subject in vivo, comprising contacting the subject with a virus, wherein the virus transduces a nucleic acid sequence encoding a sequence-targeting nuclease into the population of dermal mesenchymal cells; and modifying the genome of the population of dermal mesenchymal cells with the sequence-targeting nuclease.

The virus is not limited and may be any described herein. In some embodiments, the virus is AAV8. In some embodiments, the sequence-targeting nuclease is a Zinc-Finger Nuclease (ZFN), a Transcription activator-like effector nuclease (TALEN), a Cre recombinase, or an RNA-guided nuclease (e.g., Cas9 nuclease). In some embodiments, the sequence-targeting nuclease is saCas9 nuclease.

In some embodiments, the method further comprises contacting the subject with a second virus which transduces a nucleic acid sequence encoding one or more gRNAs in the population of cells. The second virus is not limited and may be any described herein. In some embodiments, the modification comprises the introduction or correction of a mutation.

In some embodiments, the modification comprises correction of a mutation via homology-directed repair. In some embodiments, the modification treats, ameliorates or prevents a disease (e.g., a disease described herein). The subject is not limited and may be any described herein. In some embodiments, the subject is human. In some embodiments, the subject is a mouse.

The terms "decrease," "reduce," "reduced," "reduction," "decrease," and "'inhibit" are all used herein generally to mean a decrease by a statistically significant amount relative to a reference. However, for avoidance of doubt, "reduce," "reduction" or "decrease" or "inhibit" typically means a decrease by at least 10% as compared to a reference level and can include, for example, a decrease by at least about 20%, at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, at least about 90%, at least about 95%, at least about 98%, at least about 99%, up to and including, for example, the complete absence of the given entity or parameter as compared to the reference level, or any decrease between 10-99% as compared to the absence of a given treatment.

The terms "increased," "increase" or "enhance" or "activate" are all used herein to generally mean an increase by a statically significant amount; for the avoidance of any doubt, the terms "increased", "increase" or "enhance" or "activate" means an increase of at least 10% as compared to a reference level, for example an increase of at least about 20%, or at least about 30%, or at least about 40%, or at least about 50%, or at least about 60%, or at least about 70%, or at least about 80%, or at least about 90%, or up to and including a 100% increase or any increase between 10-100% as compared to a reference level, or at least about a 2-fold, or at least about a 3-fold, or at least about a 4-fold, or at least about a 5-fold or at least about a 10-fold increase, or any increase between 2-fold and 10-fold or more as compared to a reference level.

As used herein the term "comprising" or "comprises" is used in reference to compositions, methods, and respective component(s) thereof, that are essential to the method or composition, yet open to the inclusion of unspecified elements, whether essential or not.

The term "consisting of" refers to compositions, methods, and respective components thereof as described herein, which are exclusive of any element not recited in that description of the embodiment.

As used herein the term "consisting essentially of" refers to those elements required for a given embodiment. The term permits the presence of elements that do not materially affect the basic and novel or functional characteristic(s) of that embodiment.

The term "statistically significant" or "significantly" refers to statistical significance and generally means a "p" value greater than 0.05 (calculated by the relevant statistical test). Those skilled in the art will readily appreciate that the relevant statistical test for any particular experiment depends on the type of data being analyzed. Additional definitions are provided in the text of individual sections below.

Definitions of common terms in cell biology and molecular biology can be found in "The Merck Manual of Diagnosis and Therapy", 19th Edition, published by Merck Research Laboratories, 2006 (ISBN 0-911910-19-0); RobertS. Porter et al. (eds.), The Encyclopedia of Molecular Biology, published by Blackwell Science Ltd., 1994 (ISBN 0-632-02182-9); The ELISA guidebook (Methods in molecular biology 149) by Crowther J. R. (2000); Immunology by Werner Luttmann, published by Elsevier, 2006. Definitions of common terms in molecular biology can also be found in Benjamin Lewin, Genes X, published by Jones & Bartlett Publishing, 2009 (ISBN-10: 0763766321); Kendrew et al. (eds.), Molecular Biology and Biotechnology: a Comprehensive Desk Reference, published by VCH Publishers, Inc., 1995 (ISBN 1-56081-569-8) and Cun-ent Protocols in Protein Sciences 2009, Wiley Intersciences, Coligan et al., eds.

Unless otherwise stated, the present invention was performed using standard procedures, as described, for example in Sambrook et al., Molecular Cloning: A Laboratory Manual (3 ed.), Cold Spring Harbor Laboratory Press, Cold Spring Harbor, N.Y., USA (2001) and Davis et al., Basic Methods in Molecular Biology, Elsevier Science Publishing, Inc., New York, USA (1995) which are both incorporated by reference herein in their entireties.

As used herein, the terms "proteins" and "polypeptides" are used interchangeably to designate a series of amino acid residues connected to the other by peptide bonds between the alpha-amino and carboxy groups of adjacent residues. The terms "protein", and "polypeptide" refer to a polymer of protein amino acids, including modified amino acids (e.g., phosphorylated, glycated, glycosylated, etc.) and amino acid analogs, regardless of its size or function. "Protein" and "polypeptide" are often used in reference to relatively large polypeptides, whereas the term "peptide" is often used in reference to small polypeptides, but usage of these terms in the art overlaps. The terms "protein" and "polypeptide" are used interchangeably herein when refining to a gene product and fragments thereof.

Thus, exemplary polypeptides or proteins include gene products, naturally occurring proteins, homologs, orthologs, paralogs, fragments and other equivalents, variants, fragments, and analogs of the foregoing.

The description of embodiments of the disclosure is not intended to be exhaustive or to limit the disclosure to the precise form disclosed. While specific embodiments of, and examples for, the disclosure are described herein for illustrative purposes, various equivalent modifications are possible within the scope of the disclosure, as those skilled in the relevant art will recognize. For example, while method steps or functions are presented in a given order, alternative embodiments may perform functions in a different order, or functions may be performed substantially concurrently. The teachings of the disclosure provided herein can be applied to other procedures or methods as appropriate. The various embodiments described herein can be combined to provide further embodiments. Aspects of the disclosure can be modified, if necessary, to employ the compositions, functions and concepts of the above references and application to provide yet further embodiments of the disclosure. These and other changes can be made to the disclosure in light of the detailed description.

Specific elements of any of the foregoing embodiments can be combined or substituted for elements in other embodiments. Furthermore, while advantages associated with certain embodiments of the disclosure have been described in the context of these embodiments, other embodiments may also exhibit such advantages, and not all embodiments need necessarily exhibit such advantages to fall within the scope of the disclosure.

All patents and other publications identified are expressly incorporated herein by reference for the purpose of describing and disclosing, for example, the methodologies described in such publications that might be used in connection with the present invention. These publications are provided solely for their disclosure prior to the filing date of the present application. Nothing in this regard should be construed as an admission that the inventors are not entitled to antedate such disclosure by virtue of prior invention or prior publication, or for any other reason. All statements as to the date or representation as to the contents of these documents is based on the information available to the applicants and does not constitute any admission as to the correctness of the dates or contents of these documents.

One skilled in the art readily appreciates that the present invention is well adapted to carry out the objects and obtain the ends and advantages mentioned, as well as those inherent therein. The details of the description and the examples herein are representative of certain embodiments, are exemplary, and are not intended as limitations on the scope of the invention. Modifications therein and other uses will occur to those skilled in the art. These modifications are encompassed within the spirit of the invention. It will be readily apparent to a person skilled in the art that varying substitutions and modifications may be made to the invention disclosed herein without departing from the scope and spirit of the invention.

The articles "a" and "an" as used herein in the specification and in the claims, unless clearly indicated to the contrary, should be understood to include the plural referents. Claims or descriptions that include "or" between one or more members of a group are considered satisfied if one, more than one, or all of the group members are present in, employed in, or otherwise relevant to a given product or process unless indicated to the contrary or otherwise evident from the context. The invention includes embodiments in which exactly one member of the group is present in, employed in, or otherwise relevant to a given product or process. The invention also includes embodiments in which more than one, or all of the group members are present in, employed in, or otherwise relevant to a given product or process. Furthermore, it is to be understood that the invention provides all variations, combinations, and permutations in which one or more limitations, elements, clauses, descriptive terms, etc., from one or more of the listed claims is introduced into another claim dependent on the same base claim (or, as relevant, any other claim) unless otherwise indicated or unless it would be evident to one of ordinary skill in the art that a contradiction or inconsistency would arise. It is contemplated that all embodiments described herein are applicable to all different aspects of the invention where appropriate. It is also contemplated that any of the embodiments or aspects can be freely combined with one or more other such embodiments or aspects whenever appropriate. Where elements are presented as lists, e.g., in Markush group or similar format, it is to be understood that each subgroup of the elements is also disclosed, and any element(s) can be removed from the group. It should be understood that, in general, where the invention, or aspects of the invention, is/are referred to as comprising particular elements, features, etc., certain embodiments of the invention or aspects of the invention consist, or consist essentially of, such elements, features, etc. For purposes of simplicity those embodiments have not in every case been specifically set forth in so many words herein. It should also be understood that any embodiment or aspect of the invention can be explicitly excluded from the claims, regardless of whether the specific exclusion is recited in the specification. For example, any one or more active agents, additives, ingredients, optional agents, types of organism, disorders, subjects, or combinations thereof, can be excluded.

Where the claims or description relate to a composition of matter, it is to be understood that methods of making or using the composition of matter according to any of the methods disclosed herein, and methods of using the composition of matter for any of the purposes disclosed herein are aspects of the invention, unless otherwise indicated or unless it would be evident to one of ordinary skill in the art that a contradiction or inconsistency would arise. Where the claims or description relate to a method, e.g., it is to be understood that methods of making compositions useful for performing the method, and products produced according to the method, are aspects of the invention, unless otherwise indicated or unless it would be evident to one of ordinary skill in the art that a contradiction or inconsistency would arise.

Where ranges are given herein, the invention includes embodiments in which the endpoints are included, embodiments in which both endpoints are excluded, and embodiments in which one endpoint is included and the other is excluded. It should be assumed that both endpoints are included unless indicated otherwise. Furthermore, it is to be understood that unless otherwise indicated or otherwise evident from the context and understanding of one of ordinary skill in the art, values that are expressed as ranges can assume any specific value or subrange within the stated ranges in different embodiments of the invention, to the tenth of the unit of the lower limit of the range, unless the context clearly dictates otherwise. It is also understood that where a series of numerical values is stated herein, the invention includes embodiments that relate analogously to any intervening value or range defined by any two values in the series, and that the lowest value may be taken as a minimum and the greatest value may be taken as a maximum. Numerical values, as used herein, include values expressed as percentages. For any embodiment of the invention in which a numerical value is prefaced by "about" or "approximately", the invention includes an embodiment in which the exact value is recited. For any embodiment of the invention in which a numerical value is not prefaced by "about" or "approximately", the invention includes an embodiment in which the value is prefaced by "about" or "approximately".

"Approximately" or "about" generally includes numbers that fall within a range of 1% or in some embodiments within a range of 5% of a number or in some embodiments within a range of 10% of a number in either direction (greater than or less than the number) unless otherwise stated or otherwise evident from the context (except where such number would impermissibly exceed 100% of a possible value). It should be understood that, unless clearly indicated to the contrary, in any methods claimed herein that include more than one act, the order of the acts of the method is not necessarily limited to the order in which the acts of the method are recited, but the invention includes embodiments in which the order is so limited. It should also be understood that unless otherwise indicated or evident from the context, any product or composition described herein may be considered "isolated".

EXAMPLES

Example 1

In vivo delivery of genome modifying enzymes holds significant promise for therapeutic applications and functional genetic screening. In this context, delivery to endogenous tissue stem cells, which provide an enduring source of cell replacement in homeostasis and in response to regenerative cues, is of particular interest. Here, a sensitive fluorescent reporter system, activated by Cre recombinase, was utilized to test the efficiency of genome modification following in vivo transduction by adeno-associated viruses (AAVs) in endogenous tissue stem cells. We combine immunophenotypic analyses with robust in vitro and in vivo assays of stem cell function to reveal effective targeting of tissue-localized skeletal muscle satellite cells, mesenchymal progenitors and hematopoietic stem cells, using multiple AAV serotypes. Genome modification rates achieved through this approach reached up to 65%, and modified cells retained key functional properties. This study establishes a powerful new platform to genetically alter tissue stem cells within their physiological niche while preserving their native stem cell properties and regulatory interactions.

Whether systemic AAV administration can transduce satellite cells in adult animals, and whether this approach might be extended to additional AAV serotypes and distinct tissue stem cells and progenitor populations was investigated as detailed herein. Efficient transduction of adult mouse satellite cells following in vivo systemic delivery of AAV-Cre was found, reaching >60% of the total satellite cell pool and representing a 6-fold increase over our previous study in neonatal mice (Tabebordbar et al., 2016). This transduction capacity is not limited to AAV9, but also extends to additional AAV serotypes, including AAV8 and Anc80L65 (hereafter designated Anc80). Also disclosed herein is the transduction and genome modification of multiple non-myogenic stem and progenitor cells, including mesenchymal progenitors in the skeletal muscle and dermis, as well as hematopoietic stem and progenitor cells in the bone marrow. Subsequent isolation, differentiation, and transplantation studies confirm that the targeted tissue stem cells retain their regenerative functions following in situ AAV transduction and genome modification. Collectively, these studies document efficient in vivo genome modification of distinct lineages of stem and progenitor cells across multiple anatomical niches using AAV delivery in adult mammals. This system enables in vivo gene activation, disruption, and editing strategies in tissue-resident stem cells for therapeutic purposes, as well as approaches to induce or inactivate transgenic or endogenous alleles to uncover novel molecular regulators of stem cell and progenitor cells within their native niches.

Results

The feasibility of in vivo gene modification in skeletal muscle stem cells (satellite cells) by AAV9-mediated delivery of genome modifying enzymes (Tabebordbar et al., 2016) was demonstrated previously. In that study, substantial transduction of satellite cells after intramuscular delivery of AAV9-Cre in adult mice (34-37%) was observed, but adult satellite cell transduction rates following intravenous injection was not measured (Tabebordbar et al., 2016).

Figure 1C:
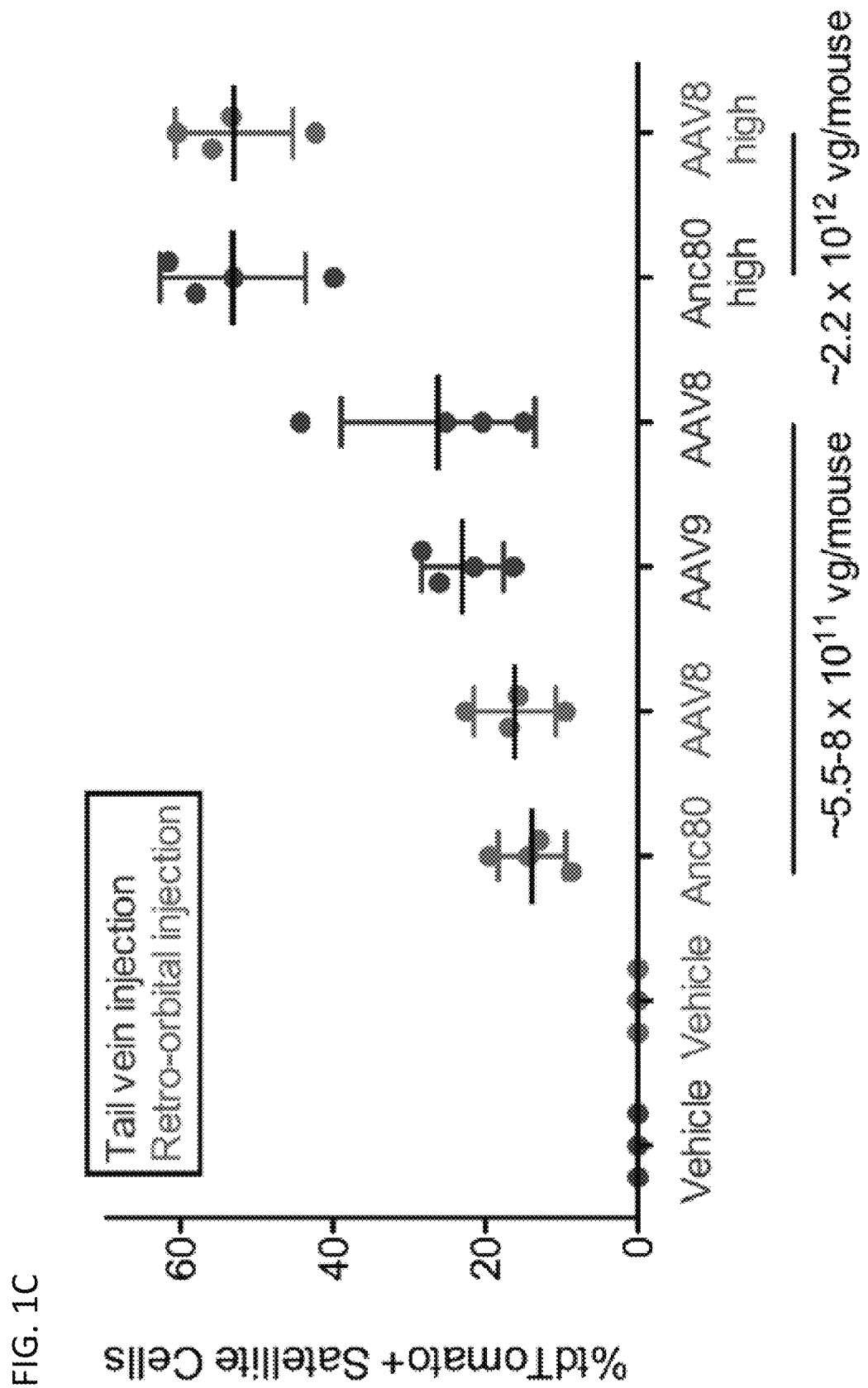
Figure 5A:
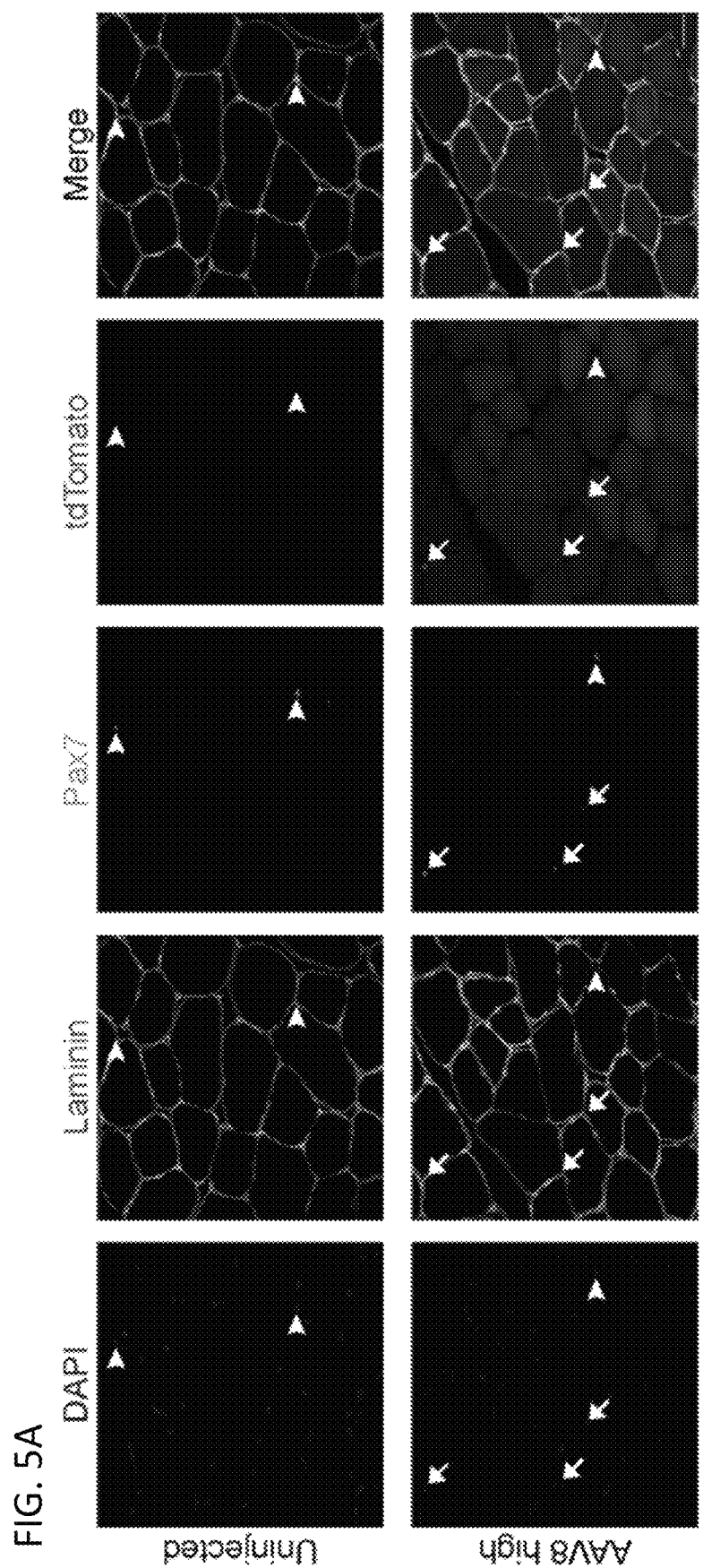
FIGS. 5A-5G show systemic injection of AAV-Cre transduces skeletal muscle satellite cells and mesenchymal progenitors.
Figure 5B:
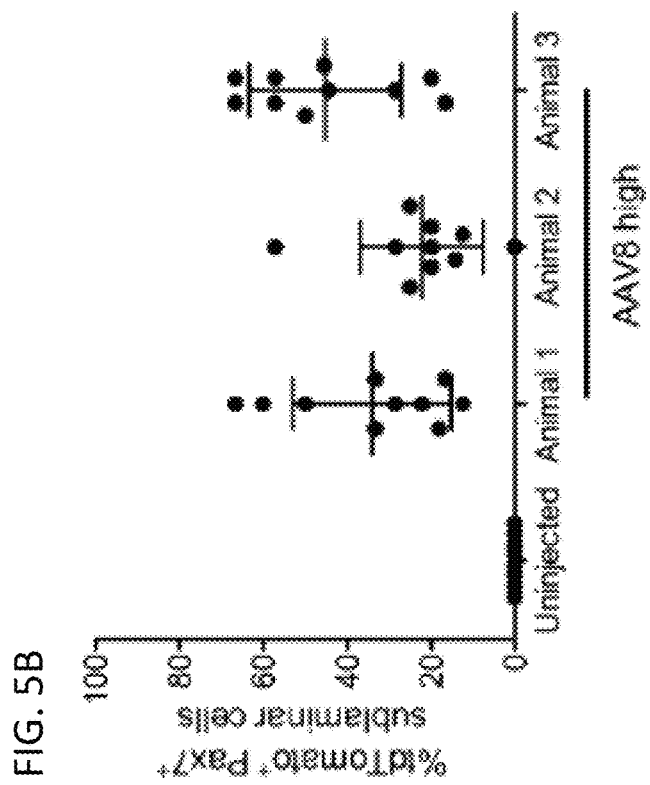
Figure 5C:
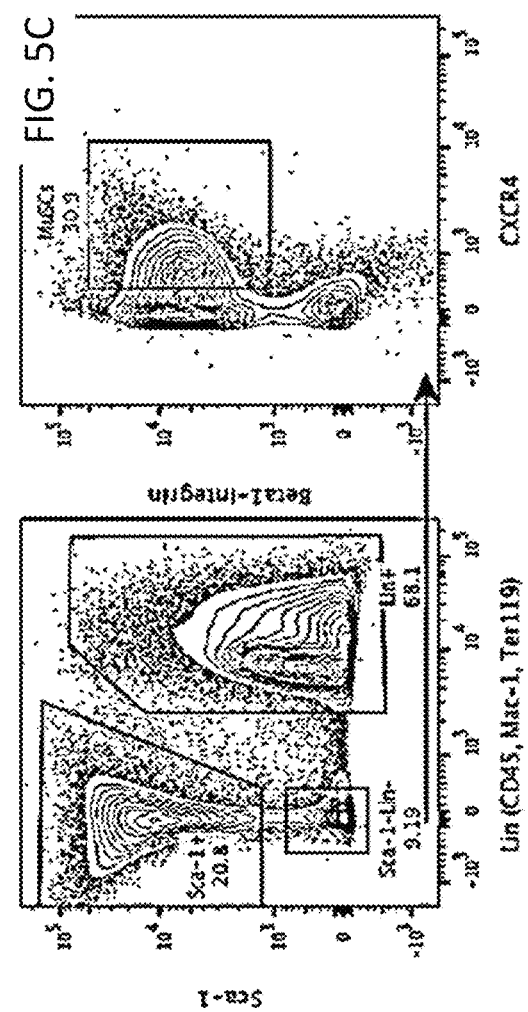

Herein, AAV particles encoding Cre recombinase (AAV-Cre) downstream of a CMV promoter and a chimeric intron packaged with serotypes 8, 9 or Anc80 (Zinn et al., 2015) were produced and injected intravenously into young adult (6 weeks old) Ai9 mice (on an mdx background: mdx; Ai9 mice, FIG. 1A). The Ai9 allele encodes a Rosa26-Lox-Stop-Lox-tdTomato reporter, which enables irreversible labeling of targeted cells with tdTomato fluorescence, detectable with single cell resolution, after Cre-mediated excision of the Stop cassette (Madisen et al., 2010). AAV-Cre particles were injected intravenously by either the tail vein or retro-orbital sinus at two doses ($5.5$-$8 \times 10^{11}$ or $2.2 \times 10^{12}$ viral genomes (vg) per mouse). Tissues were then analyzed 2-3 weeks after injection for the presence of tdTomato fluorescence in three well-defined regenerative adult precursor cell populations—skeletal muscle satellite cells, muscle-resident mesenchymal progenitor cells, and bone marrow-localized hematopoietic stem and progenitor cells—all of which are easily identifiable by extensively validated cell surface marker profiles (Cerletti et al., 2008; Kiel et al., 2005; Maesner et al., 2016; Sherwood et al., 2004).

tdTomato$^+$ muscle satellite cells (defined as CD45$^-$ CD11b (Mac-1)$^-$ Ter119$^-$ Sca-1$^-$ β1-integrin$^+$ CXCR4$^+$ cells; FIG. 5C (Cerletti et al., 2008; Maesner et al., 2016; Sherwood et al., 2004)) were detected at frequencies ranging from 8-62% in all animals injected with AAV-Cre (N=24 mice) irrespective of the anatomical location of intravenous injection (retro-orbital or tail vein), indicating robust and reproducible Cre-dependent recombination following in vivo transduction of these cells by AAV (FIGS. 1B-1C). No tdTomato$^+$ cells were detected in vehicle-injected controls (N=6) (FIGS. 1B-1C). Comparing mice injected with the same serotype of AAV, the percentage of tdTomato$^+$ satellite cells roughly correlated with the dose of AAV injected, and on average, more than half of the total pool of satellite cells was transduced and genetically modified with the higher doses of either AAV8-Cre or Anc80-Cre (FIG. 1C). These findings were validated by immunofluorescence analysis in a subset (N=3) of high dose AAV8-Cre injected animals, confirming the presence of tdTomato$^+$ muscle satellite cells (marked by Pax7 expression and by their localization beneath the basal lamina (Seale et al., 2000)) in 29 out of 30 of sections analyzed from 3 different AAV-Cre-injected mice (FIG. 5A). No tdTomato$^+$ cells were detected in sections from uninjected controls. Quantification of these microscopy data across all three animals indicated an average ~34% of Pax7$^+$ satellite cells that were also tdTomato$^+$ (FIG. 5B), similar to results obtained by flow cytometry (FIG. 1C). Interestingly, substantial variability in the frequency of tdTomato$^+$ Pax7$^+$ muscle satellite cells present in different sections prepared from the same muscle was observed (FIG. 5B), suggesting that AAV transduction, and subsequent genome modification events, may not be distributed evenly throughout the muscle tissue.

Figure 2C:
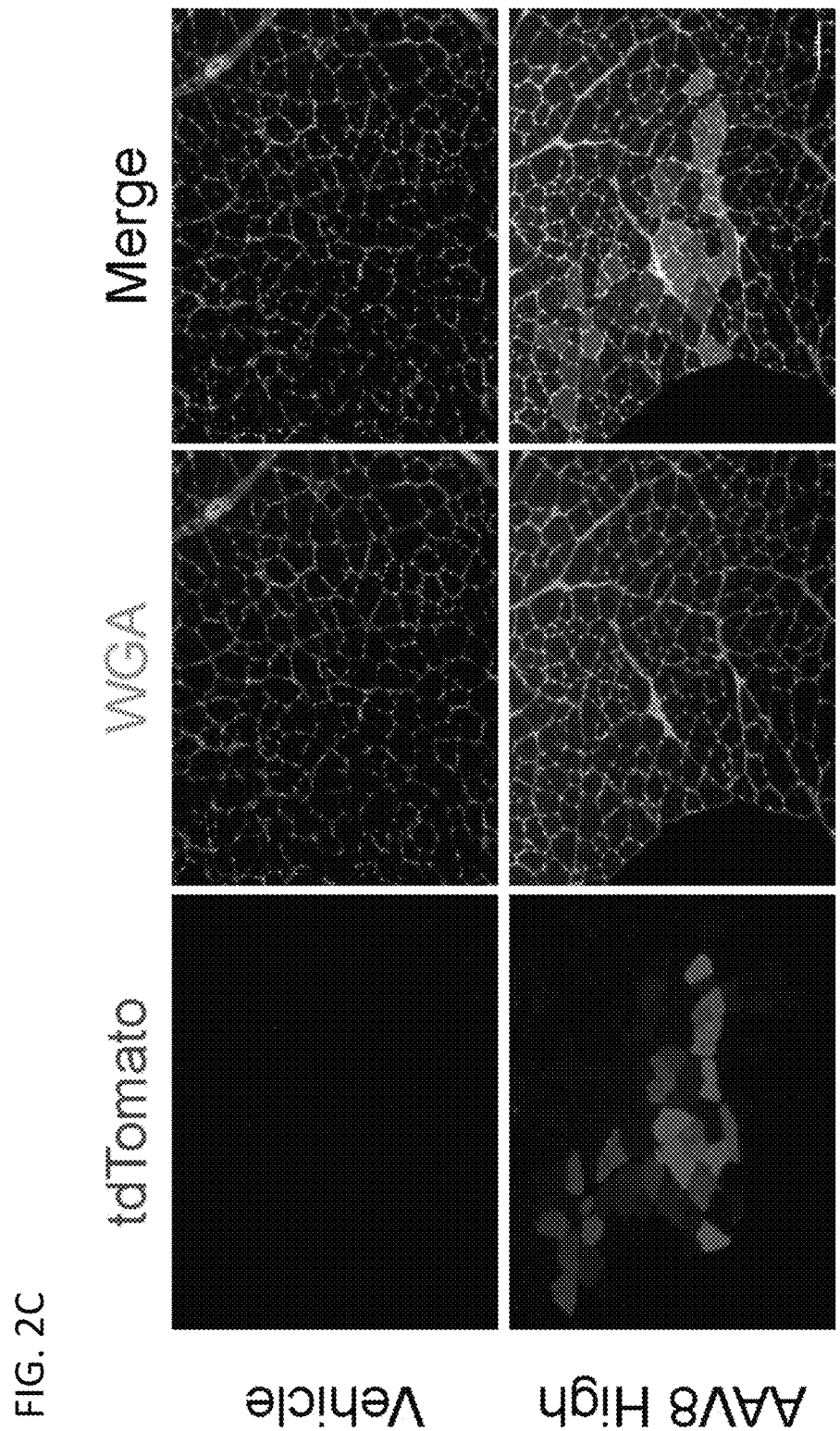
Figure 5D:
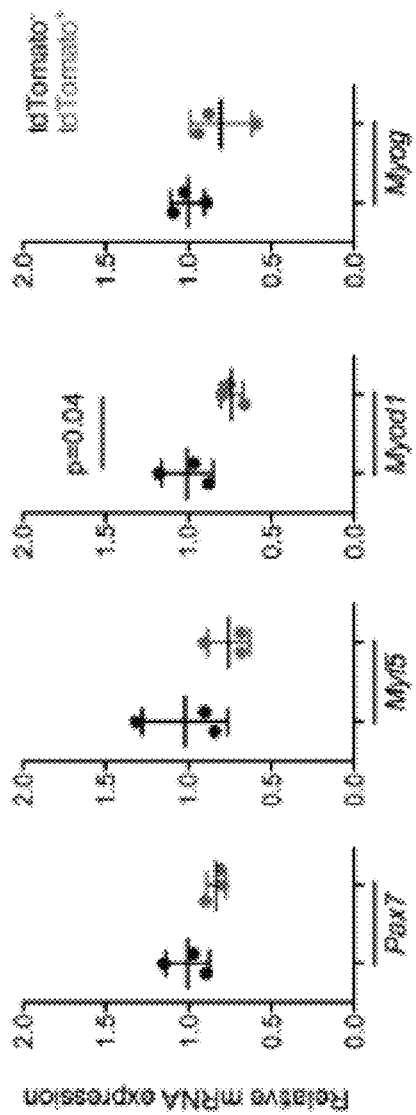

Whether in vivo AAV-transduced and genome-modified satellite cells maintained their myogenic capacity (FIG. 1A) was next investigated. Satellite cells sorted from the muscles of AAV-Cre-injected mice retained their ability to proliferate, differentiate, and fuse to form tdTomato$^+$ myosin heavy chain (MHC)-expressing myotubes when cultured ex vivo (FIG. 2A). The relative intensity of the tdTomato signal in fused myotubes appeared to reflect the transduction efficiencies of the sorted populations (as determined by FACS), with more highly transduced populations generating visibly brighter tdTomato$^+$ myotubes (FIG. 2A). Consistent with the unperturbed proliferation and differentiation properties of AAV-Cre-transduced tdTomato$^+$ satellite cells, relative quantification of myogenic gene expression indicated equivalent levels of Pax7, Myf5, and Myog expression, with a slight (~25%) reduction in Myod1 in tdTomato$^+$ satellite cells as compared to tdTomato⁻ satellite cells (FIG. 5D). Finally, it was confirmed that AAV-transduced muscle satellite cells retain their myogenic stem cell properties using stringent in vivo transplantation assays. Indeed, tdTomato⁺ satellite cells preserved their capacity to engraft, generate tdTomato⁺ muscle fibers (FIG. 2C), and replenish the pool of sub-laminar Pax7⁺ satellite cells (FIG. 2B) following isolation and transplantation into pre-injured recipient muscle. Collectively, these results confirm retention of key myogenic features and satellite cell functions after in vivo AAV transduction of muscle satellite cells in adult animals.

Figure 5E:
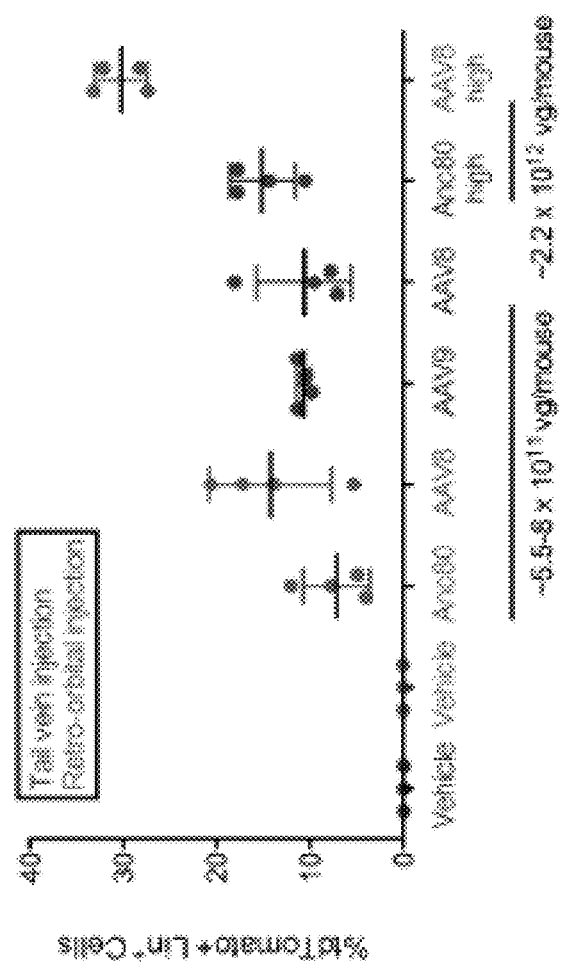
Figure 5F:
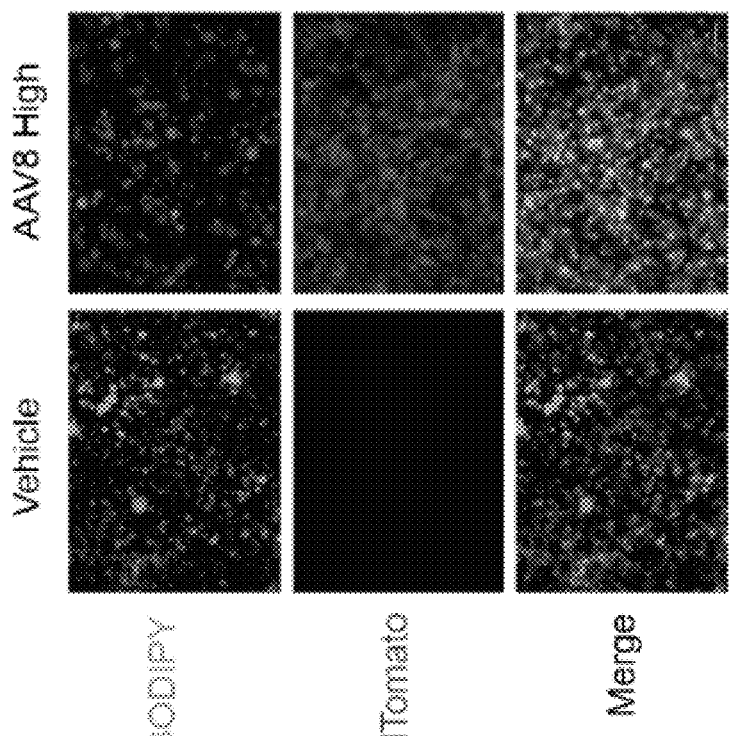
Figure 5G:
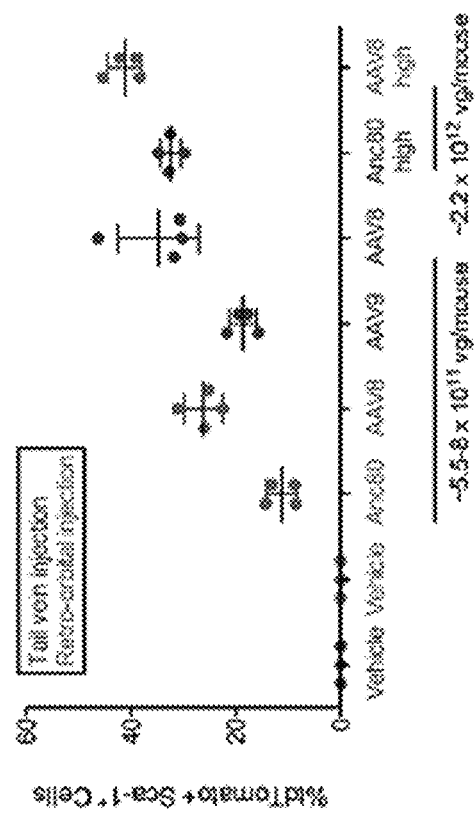

In addition to the satellite cell compartment, tdTomato⁺ cells was also detected in a subset (ranging from 8-46%) of muscle-resident Sca-1⁺ mesenchymal progenitors, which can differentiate to form adipocytes (Hettmer et al., 2011; Schulz et al., 2011; Sherwood et al., 2004; Tan et al., 2011) (FIGS. 5C, 5F-5G), and a subset (ranging from 4-33%) of muscle-infiltrating hematopoietic cells (marked by CD45, Mac-1 and/or Ter119) within the muscles of animals injected with different serotypes of AAV-Cre (FIGS. 5C, 5E). A separate experiment evaluating systemic administration of AAV6, AAV8, or AAV9 encoding Cre recombinase under the control of the CMV promoter similarly showed transduction of muscle satellite cells (ranging from 6-13%) and muscle-localized Sca-1⁺ progenitors (ranging from 5-6%), emphasizing the reproducibility of this in vivo delivery system (Table S1).

lowing systemic AAV delivery, these data demonstrate efficient, dose-dependent, and reproducible transduction and delivery of a genome-modifying enzyme by multiple AAV serotypes into skeletal muscle precursors and mesenchymal progenitors within their native niche.

Figure 3A:
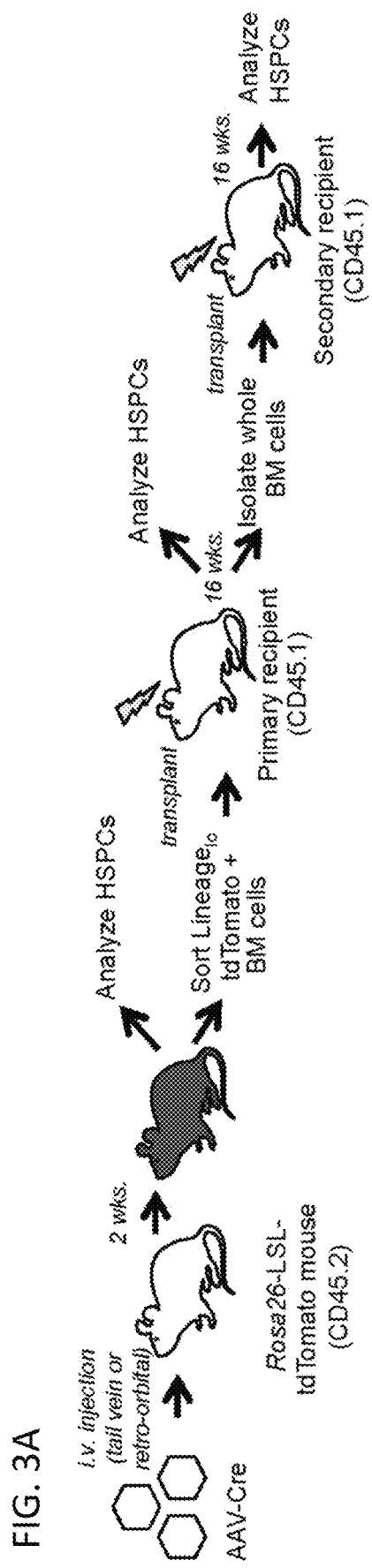

To determine whether additional stem cell populations in other anatomical niches might be similarly targeted by systemic AAV administration, bone marrow cells harvested from mice injected intravenously with AAV8, AAV9 or Anc80 encoding Cre recombinase (FIG. 3A) was also analyzed. Detectable tdTomato expression was observed within immunophenotypically identified hematopoietic stem cells (HSCs; defined as Lin⁻Sca-1⁺c-kit⁺CD48⁻CD150⁺) (FIGS. 3B-3C; ranging from 3-38%). These results were reproducible using intravenous delivery through either the tail vein or retro-orbital sinus (FIG. 3C), and in a separate experiment in which was injected CMV-driven Cre using AAV6, AAV8, or AAV9-Cre (Table S1). Similar to the results with skeletal muscle satellite cells, bone marrow HSCs were transduced and modified by multiple AAV serotypes with efficiencies that roughly correlated with viral titer (FIG. 3C).

In addition to HSCs, the targeting of more committed hematopoietic precursors in the bone marrow by systemically delivered AAV-Cre was investigated. tdTomato fluorescence was detected in multiple subsets of bone marrow progenitors, including Common Myeloid Progenitors (CMPs; Lin⁻Sca-1⁻c-Kit⁺CD34⁺FcγR$^{low}$, ranging from

TABLE S1

Frequency of tdTomato⁺ stem and progenitor cells in muscle and blood following systemic injections of AAV-Cre. See also FIGS. 1-4.

| | Muscle cells | | Hematopoietic cells | | | |
|---|---|---|---|---|---|---|
| Condition | % tdTomato⁺ Satellite cells Mean ± SD | % tdTomato⁺ Sca-1⁺ cells Mean ± SD | % tdTomato⁺ HSCs Mean ± SD | % tdTomato⁺ EryA cells Mean ± SD | % tdTomato⁺ EryB cells Mean ± SD | % tdTomato⁺ EryC cells Mean ± SD |
| Vehicle (N = 3) | 0.61 ± 0.695 | 0.47 ± 0.373 | 1.327 ± 0.400 | 1.237 ± 0.225 | 0.189 ± 0.129 | 0.002 ± 0.250 |
| AAV6-Cre ($4 \times 10^{12}$ vg) (N = 5) | 6.61 ± 0.847 | 5.25 ± 0.85 | 5.044 ± 1.111 | 4.514 ± 0.691 | 1.032 ± 0.403 | 0.250 ± 0.144 |
| AAV8-Cre ($4 \times 10^{12}$ vg) (N = 5) | 12.8 ± 1.991 | 6.16 ± 0.8 | 6.620 ± 2.236 | 7.772 ± 0.799 | 1.762 ± 0.124 | 0.432 ± 0.111 |
| AAV9-Cre ($4 \times 10^{12}$ vg) (N = 5) | 7.35 ± 1.669 | 5.41 ± 0.872 | 4.268 ± 0.712 | 5.842 ± 1.238 | 1.322 ± 0.238 | 0408 ± 0.122 |

Figure 6A:
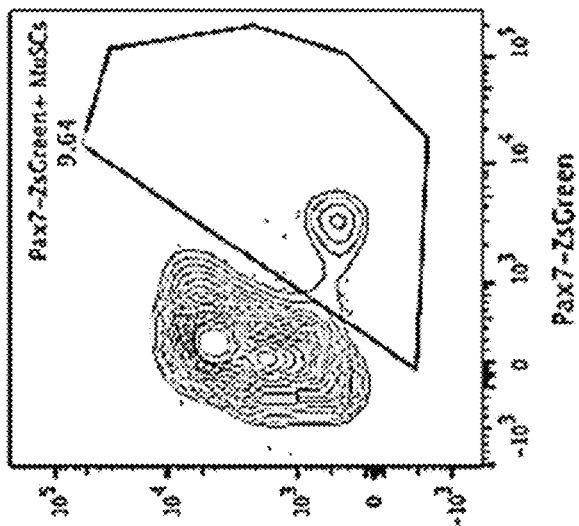
FIGS. 6A-6D show local injection of AAV-Cre enables delivery to skeletal muscle satellite cells.
Figure 6B:
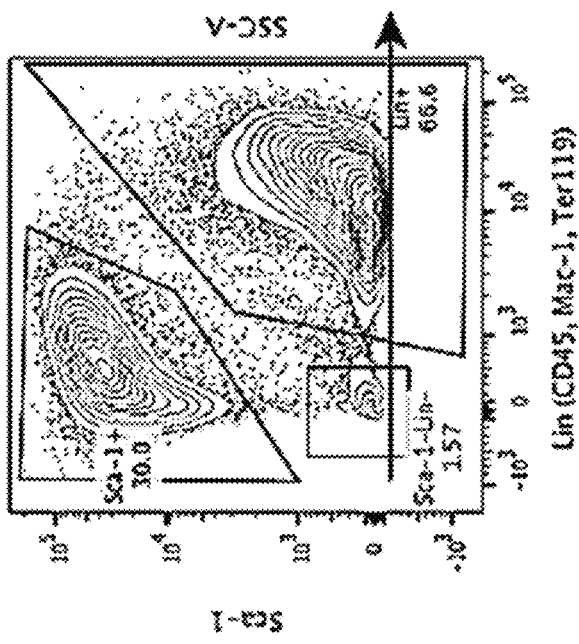
Figure 6C:
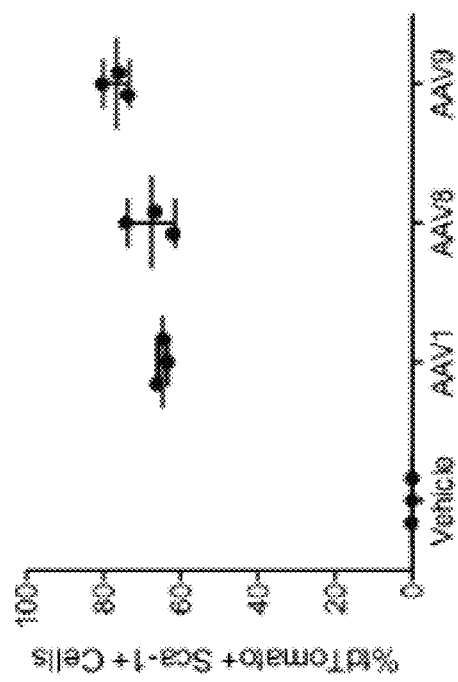
Figure 6D:
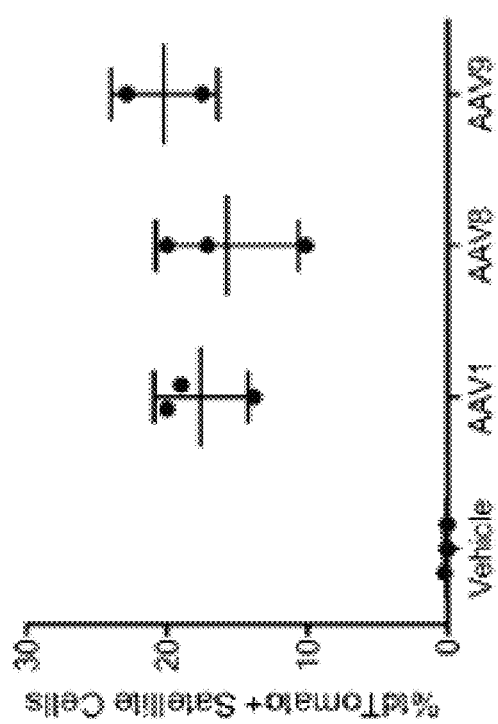
Figures 7A, 7B:
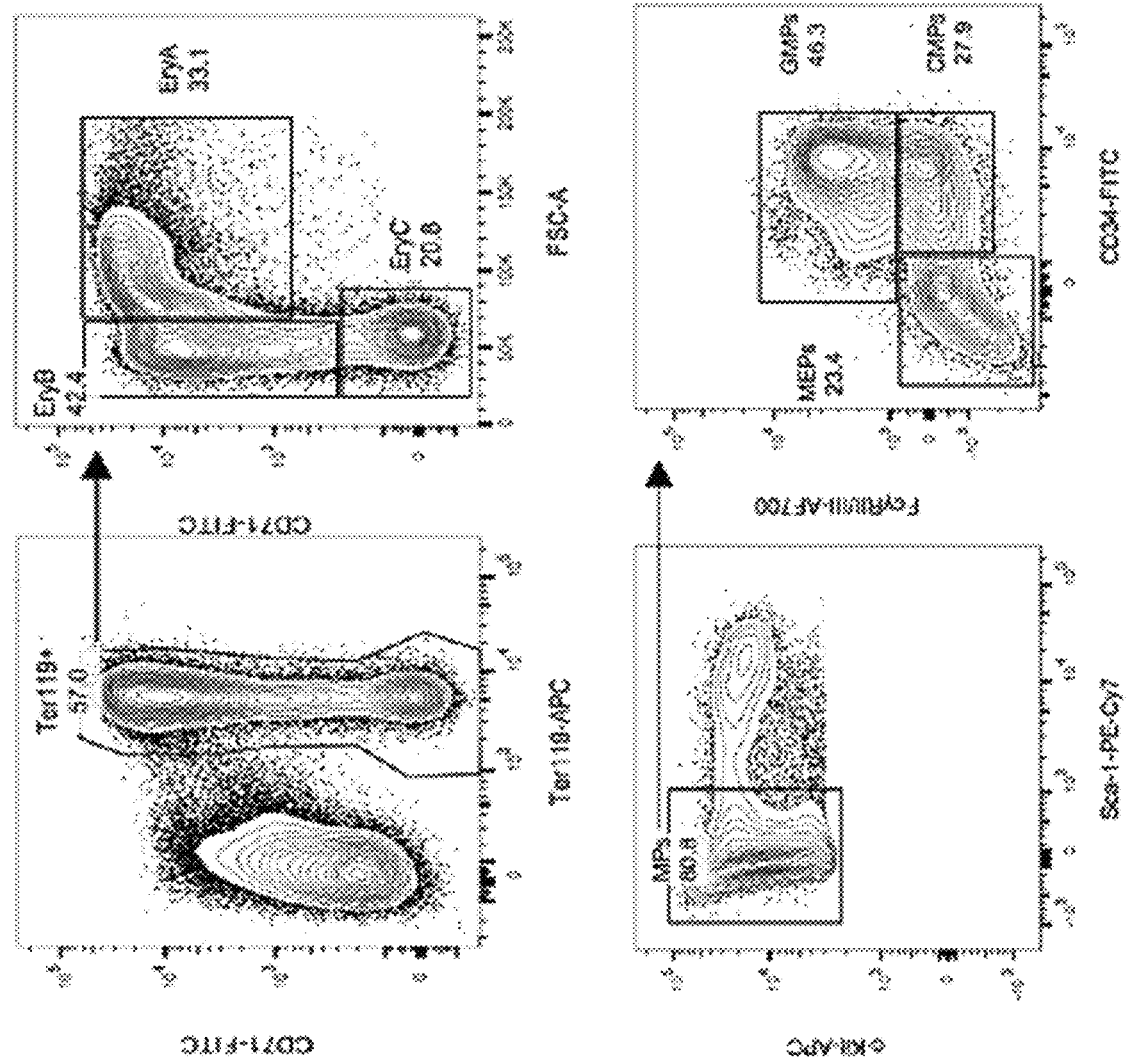
FIGS. 7A-7H show systemic injection of AAV-Cre transduces hematopoietic progenitor cells.
Figure 7C:
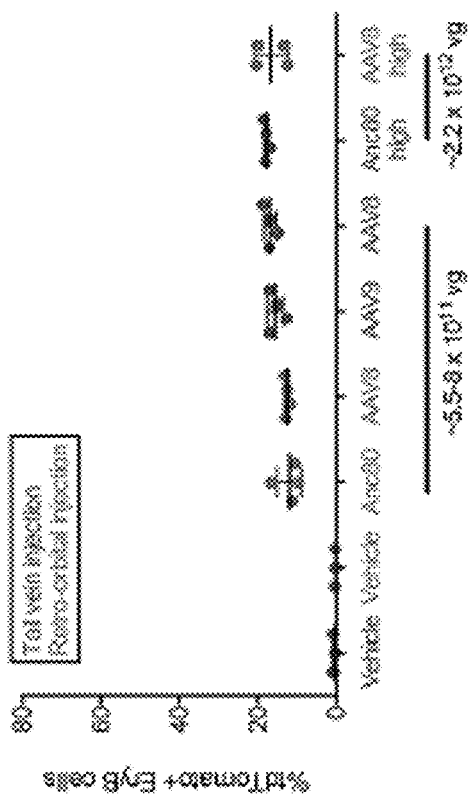
Figure 7D:
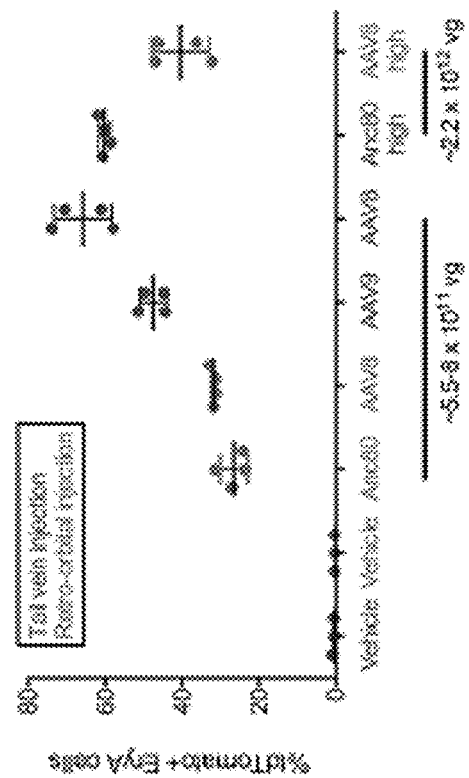
Figure 7E:
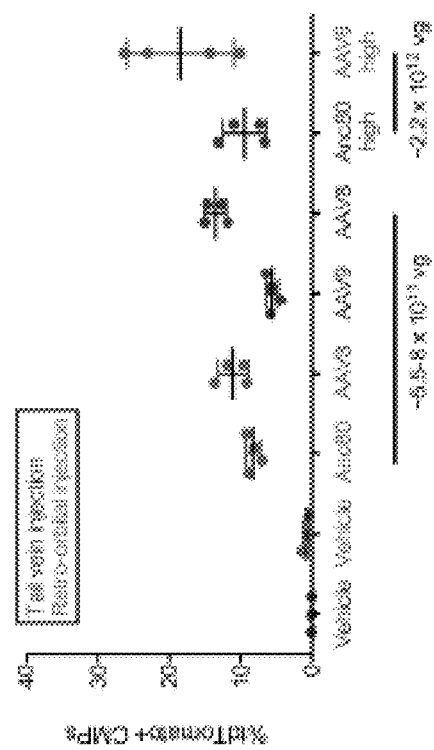
Figure 7F:
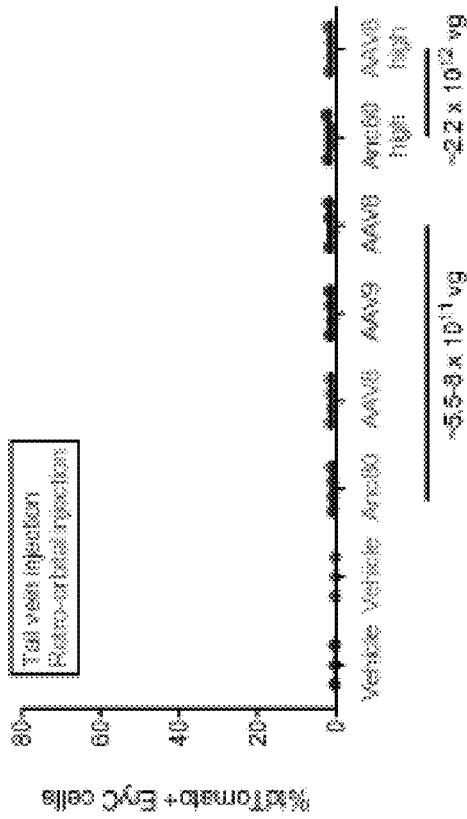
Figure 7G:
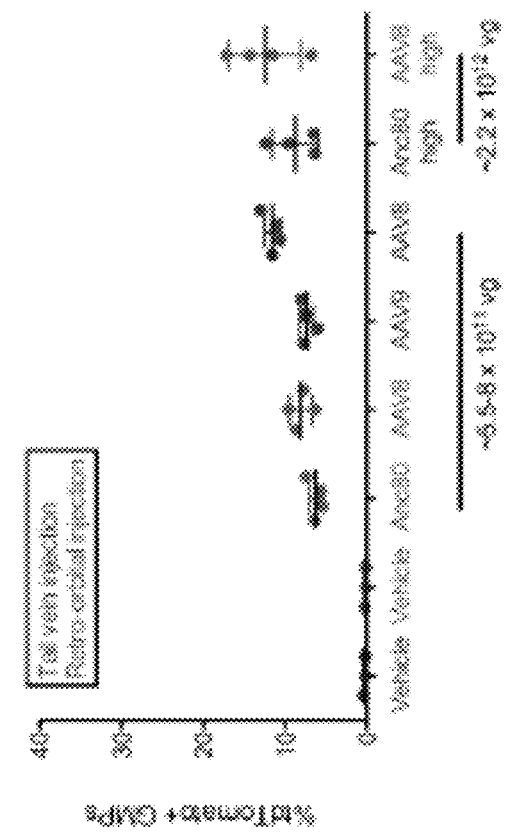
Figure 7H:
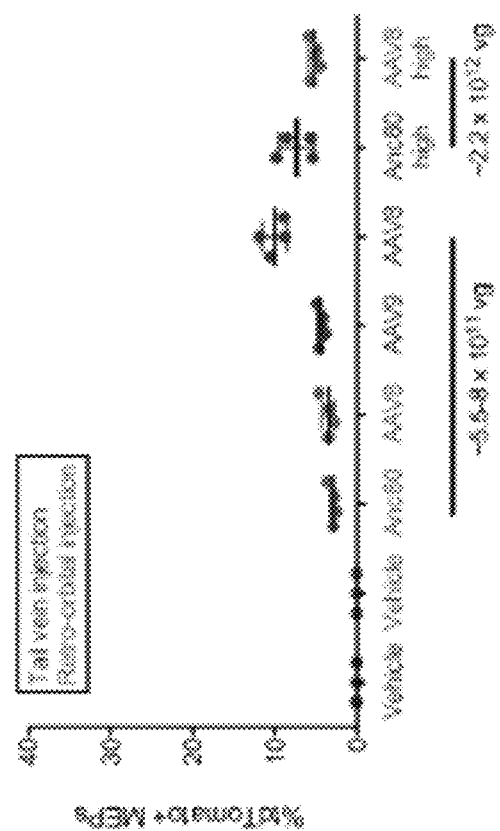

Finally, local delivery methods to target muscle progenitors using AAV-Cre were assessed. For these studies, mdx; Ai9 animals carrying a Pax7-ZsGreen allele to transgenically mark muscle satellite cells were used (FIG. 6A) (Arpke et al., 2013; Bosnakovski et al., 2008; Maesner et al., 2016). $6 \times 10^{11}$ vg/mouse of AAV-Cre using serotypes 1, 8 or 9 was delivered via direct intramuscular injection and, similar to the results with systemic delivery, analysis of skeletal muscles three weeks after local injection of AAV-Cre revealed tdTomato expression in a substantial fraction of hematopoietic lineage cells (FIG. 6B; ranging from 33-62%), Sca-1⁺ mesenchymal progenitors (FIG. 6C; ranging from 62-80%), and satellite cells (FIG. 6D; ranging from 10-23%). While this genetic approach to mark muscle satellite cells using a Pax7 reporter allele in mdx muscle has been applied previously (Filareto et al., 2015; Tabebordbar et al., 2016), it cannot be ruled out that the Pax7-ZsGreen allele may also mark some myoblast cells in the mdx mouse. Nonetheless, taken together with the results obtained fol- 4-26%), Granulocyte Monocyte Progenitors (GMPs; Lin⁻Sca-1⁻c-Kit⁺CD34⁺FcγR⁺, ranging from 5-17%), and Megakaryocyte Erythroid Progenitors (MEPs; Lin⁻Sca-1⁻c-Kit⁺CD34⁻ FcγR⁻, ranging from 2.5-12%) (FIGS. 7B, 7F-7H). tdTomato⁺ cells were also detected among lineage-committed erythroid precursors, including EryA cells (basophilic erythroblasts; Ter119⁺CD71⁺FSC$^{high}$, ranging from 23-74%), EryB cells (late basophilic and polychromatic erythroblasts; Ter119⁺ECD71$^{30}$FSC$^{low}$, ranging from 9-20%, and a small fraction of EryC cells (orthochromatic erythroblasts and reticulocytes; Ter119⁺ECD71⁻ FSC$^{low}$, ranging from 0.8-2.5%) (FIGS. 7A, 7C-7E). Detection of tdTomato⁺ lineage-restricted hematopoietic progenitors suggests that these cells were either directly transduced by AAV-Cre, or that they arose from a more upstream precursor cell within the 14 days after AAV injection.

Figure 3D:
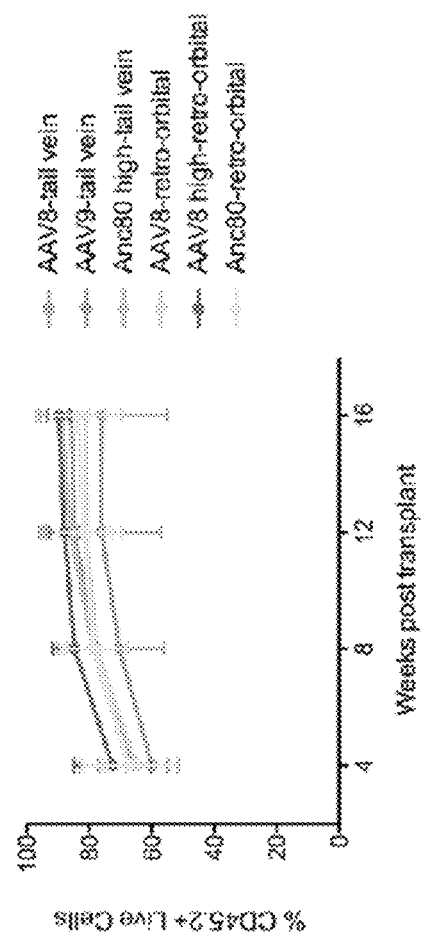
Figure 3E:
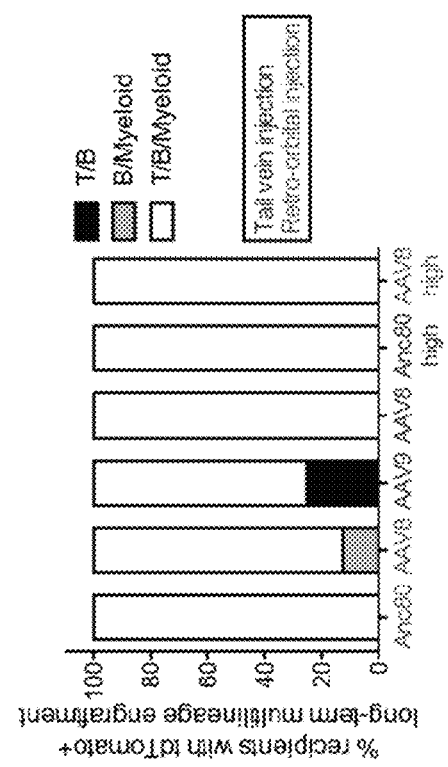
Figure 3G:
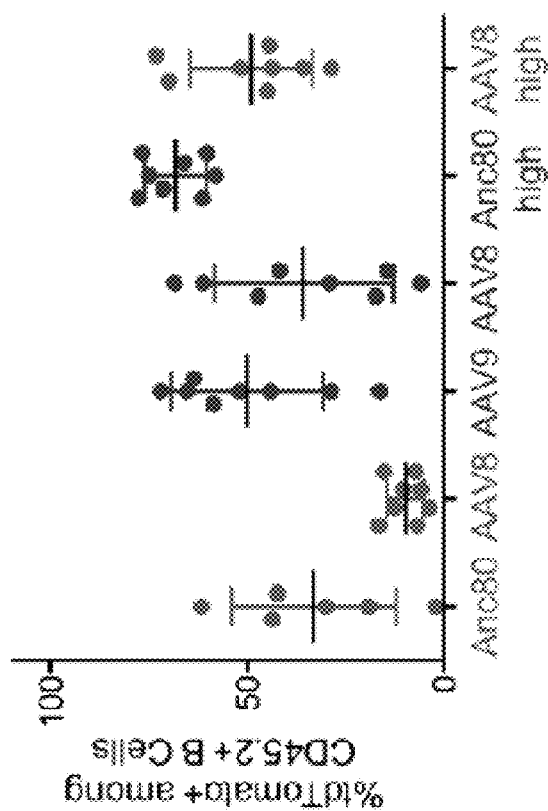
Figure 3F:
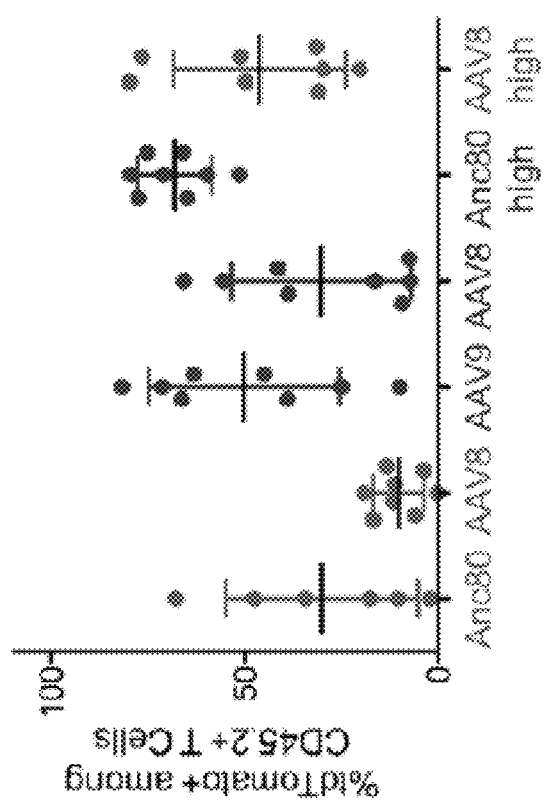
Figure 3I:
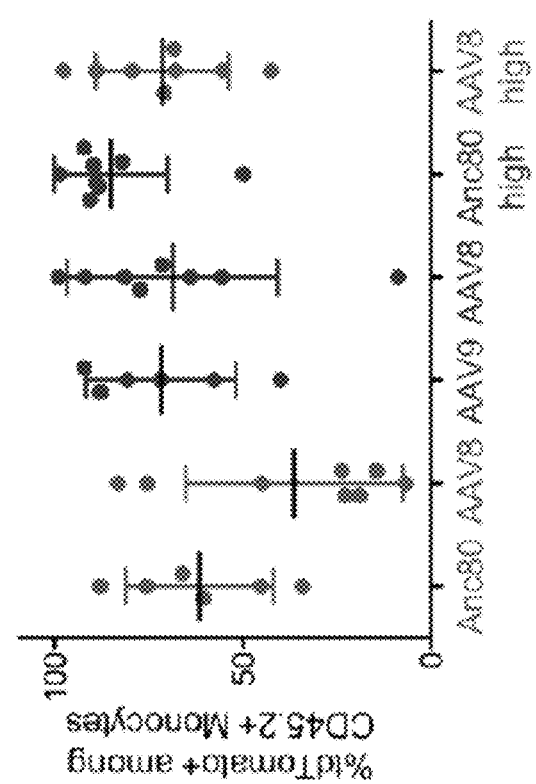
Figure 3H:
Figure 3J:
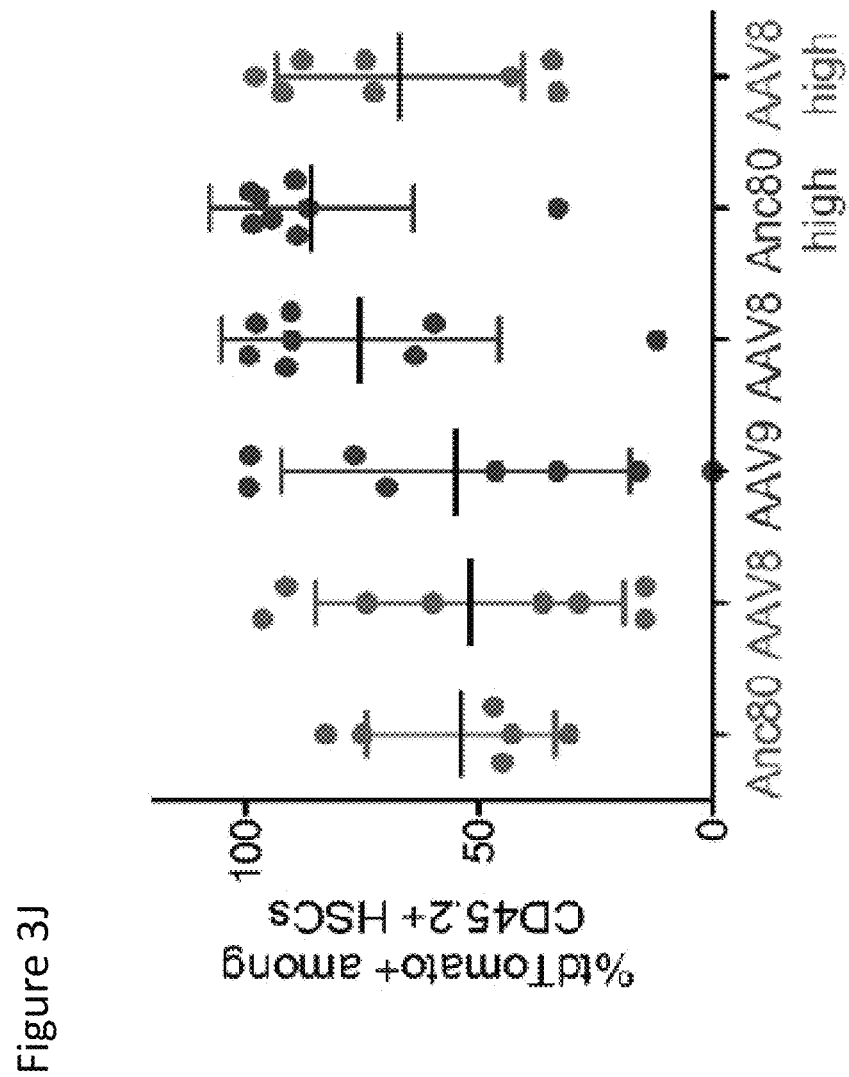

To determine whether the in vivo transduced tdTomato⁺ HSCs detected by immunophenotyping retained stem cell engraftment, self-renewal, and differentiation potential, rigorous primary and secondary transplantation assays to evaluate the long-term reconstituting function of HSCs transduced by AAV-Cre were utilized. Briefly, Lin$^{low}$ tdTomato$^+$ bone marrow cells were isolated by FACS from AAV-Cre injected Ai9 mice expressing the CD45.2 allotype and transplanted into lethally irradiated congenic CD45.1$^+$ recipients (FIG. 3A). Monthly assessments of peripheral blood chimerism revealed high levels of donor (CD45.2$^+$) cell engraftment among all primary transplant recipients (FIG. 3D). In addition, all recipients exhibited enduring contributions of tdTomato$^+$ CD45.2$^+$ donor-derived peripheral blood cells in multiple hematopoietic lineages at 16 weeks post-transplant (FIGS. 3E-I). Analysis of tdTomato expression in the bone marrow further revealed the presence of donor-derived CD45.2$^+$ tdTomato$^+$ HSCs in 45 out of 46 recipient mice analyzed (FIG. 3J). The detection of tdTomato$^-$ CD45.2$^+$ donor-derived peripheral blood cells and HSCs in the transplanted recipients likely reflects performance of single, rather than double, sorts in order to maximize cell yield over cell purity (FIGS. 3F-J).

Figure 4B:
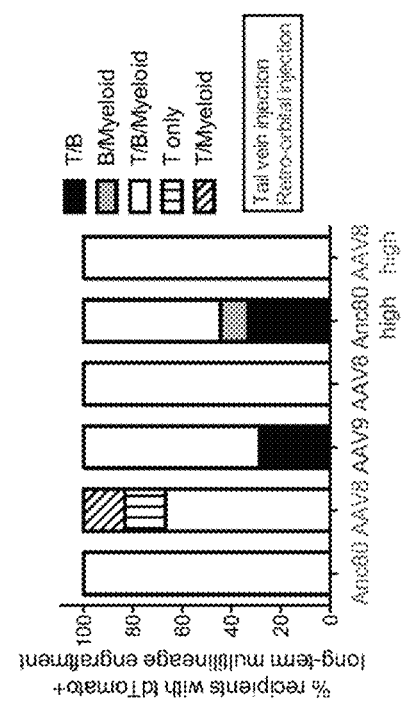
Figure 4A:
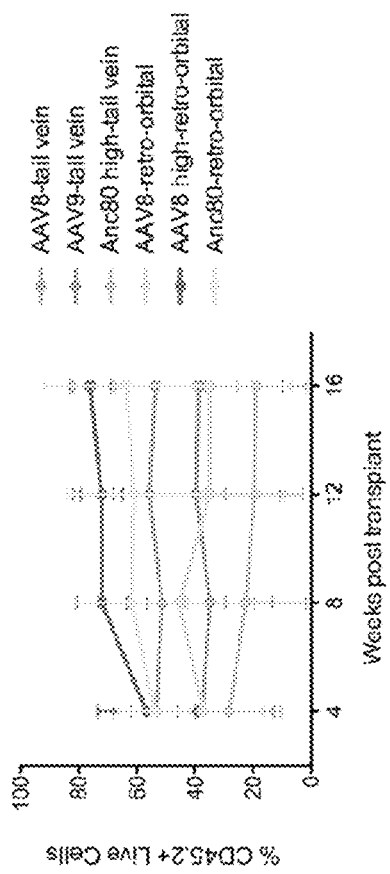
Figure 4C:
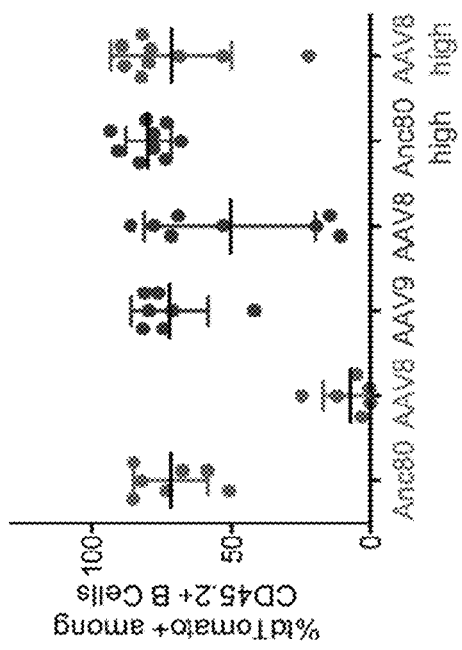
Figure 4D:
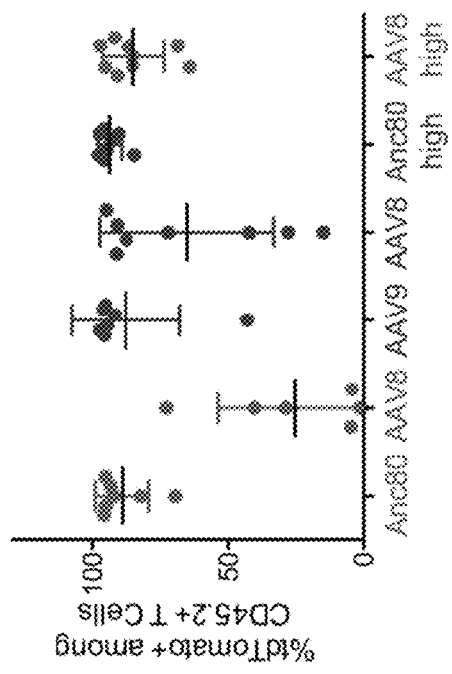
Figure 4G:
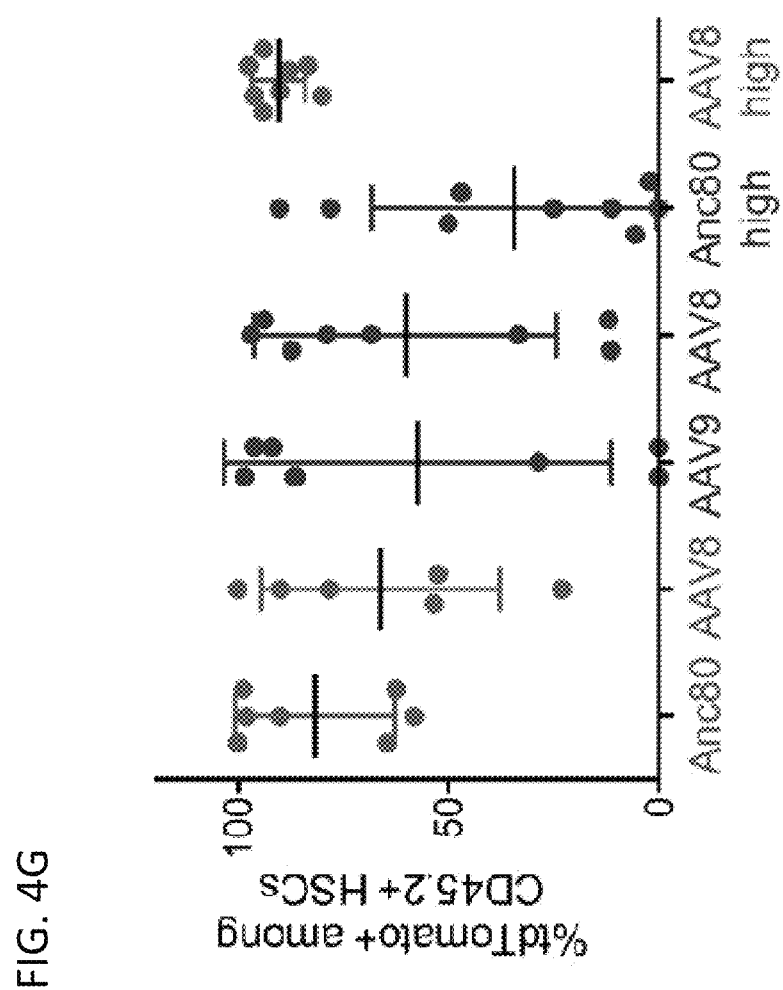
Figure 8A:
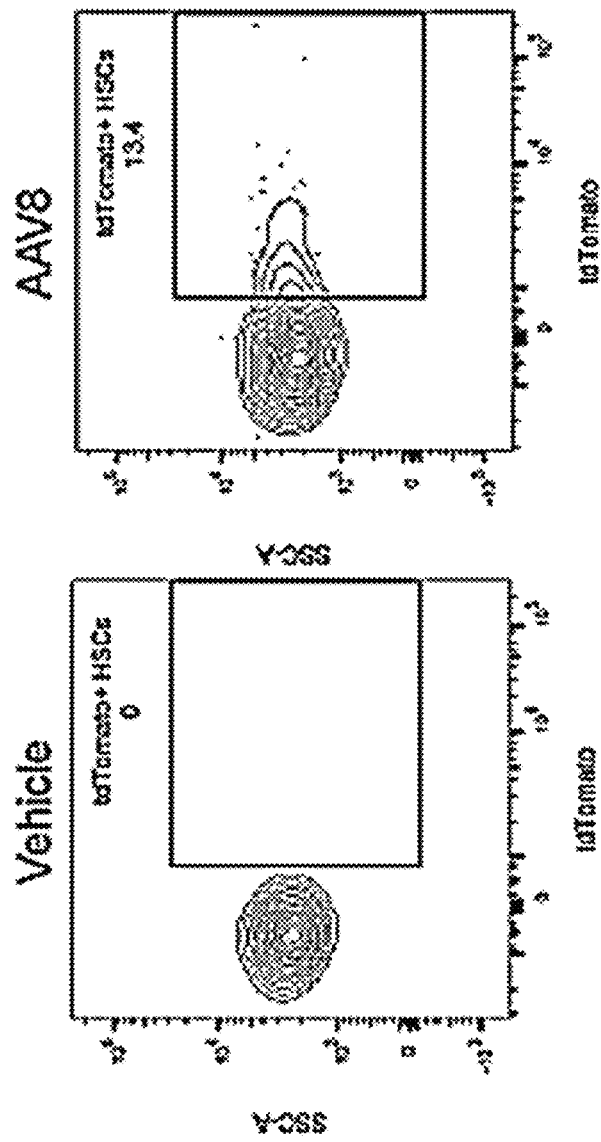
FIGS. 8A-8F show local injection of AAV-Cre enables delivery to hematopoietic stem cells.
Figure 8B:
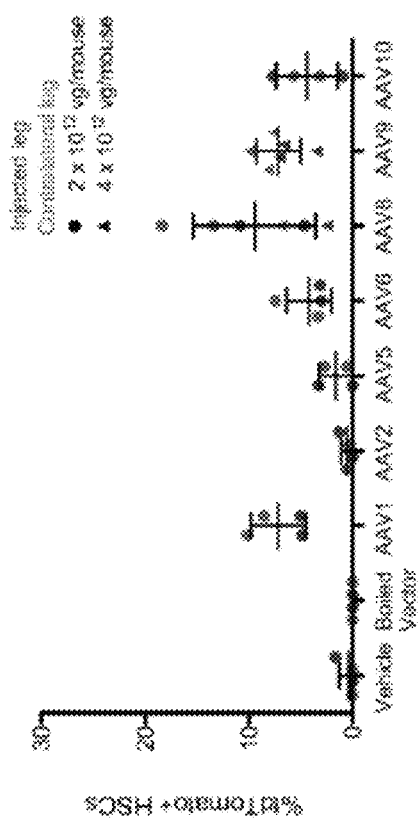
Figure 8C:
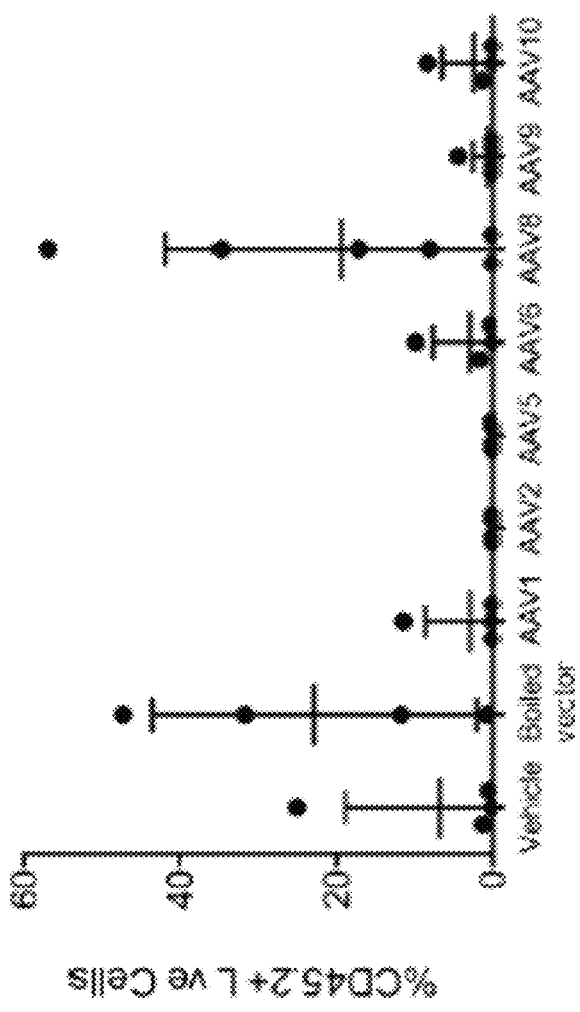
Figure 8D:
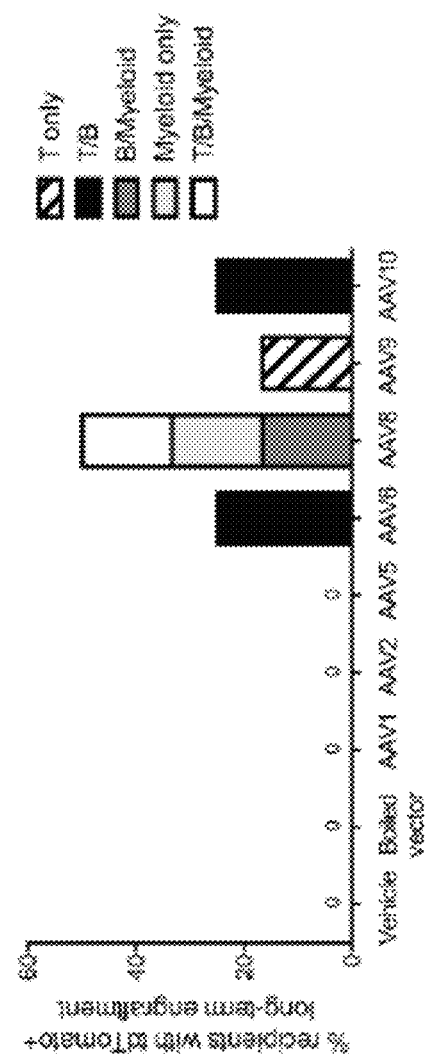
Figure 8E:
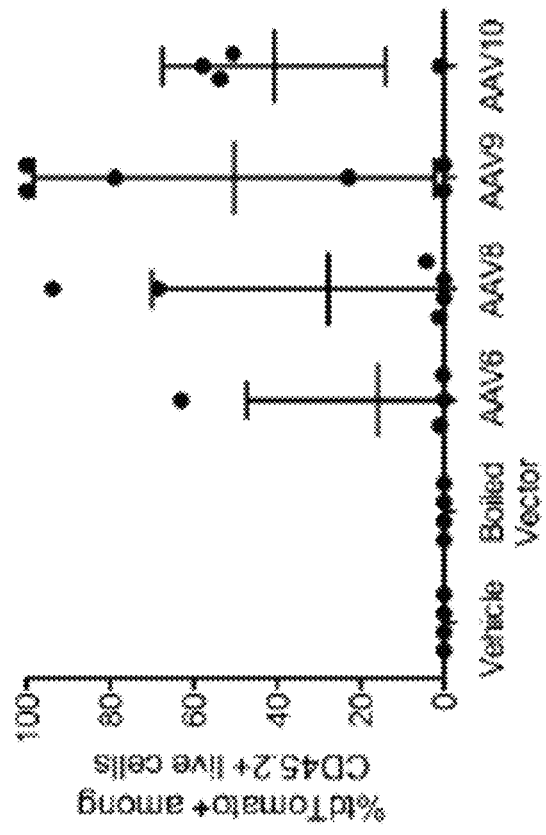
Figure 8F:
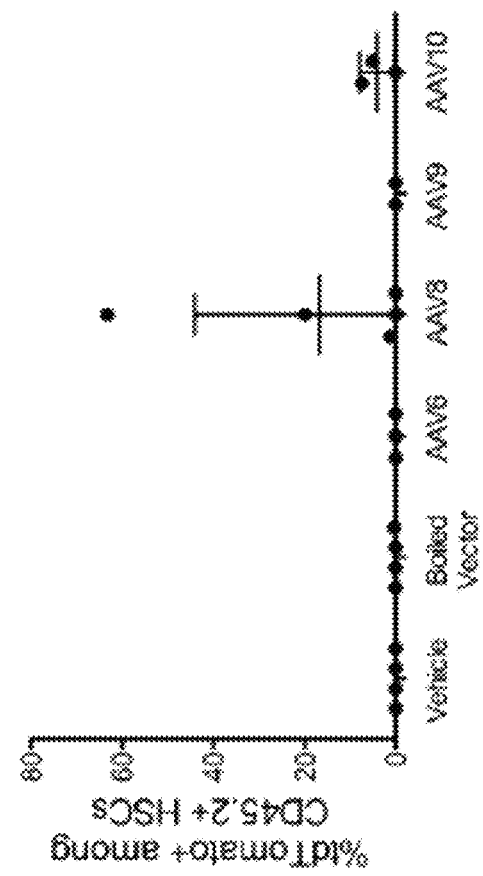

Secondary transplantation of bone marrow cells from a subset of previously engrafted primary recipient mice (FIG. 3A) was next performed. Analysis of donor chimerism levels within secondary recipients revealed a range of approximately 20-80% among peripheral blood cells (FIG. 4A). Of these secondary recipients, a majority showed multilineage engraftment by tdTomato$^+$ donor cells at 16 weeks post-transplant (FIGS. 4B-4F). Moreover, tdTomato$^+$ donor-derived HSCs were detected in the bone marrow of secondary recipients 4-5 months post-transplant (FIG. 4G), providing functional evidence that AAV-Cre indeed transduced long-term reconstituting HSCs within the initial injected animals, rather than long-lived oligolineage progenitors (Busch et al., 2015; Sawai et al., 2016; Sun et al., 2014). Transduction of HSCs following local injection of AAV serotypes 1, 2, 5, 6, 8, 9, 10 and Anc80, with immunophenotypically—(FIGS. 8A-8B; Table S2) and functionally—(FIGS. 8C-8F) defined tdTomato$^+$ HSCs detected in the bone marrow in multiple AAV-injected animals was also evaluated.

TABLE S2

Frequency of tdTomato$^+$ hematopoietic progenitor cells from local injections of AAV-Cre. Data were calculated by pooling the frequency of tdTomato$^+$ cells from the injected femurs and the contralateral femurs. See also FIG. 3.

| Condition | % tdTomato$^+$ MPs Mean ± SD | % tdTomato$^+$ EryA cells Mean ± SD | % tdTomato$^+$ EryB cells Mean ± SD | % tdTomato$^+$ EryC cells Mean ± SD |
|---|---|---|---|---|
| Vehicle (N = 4) | 0.057 ± 0.040 | 1.425 ± 0.269 | 0.116 ± 0.039 | 0.005 ± 0.006 |
| Boiled Vector ($2 \times 10^{12}$ vg) (N = 4) | 0.039 ± 0.036 | 2.423 ± 0.449 | 0.112 ± 0.049 | 0.010 ± 0.012 |
| AAV1-Cre ($2 \times 10^{12}$ vg) (N = 4) | 19.398 ± 11.113 | 50.775 ± 13.007 | 16.350 ± 4.474 | 0.588 ± 0.168 |
| AAV2-Cre ($2 \times 10^{12}$ vg) (N = 4) | 0.702 ± 0.554 | 6.823 ± 3.820 | 0.818 ± 0.455 | 0.059 ± 0.049 |
| AAV5-Cre ($2 \times 10^{12}$ vg) (N = 4) | 1.013 ± 0.632 | 10.433 ± 3.097 | 1.853 ± 0.982 | 0.108 ± 0.068 |
| AAV6-Cre ($2 \times 10^{12}$ vg) (N = 4) | 28.670 ± 17.084 | 40.400 ± 14.073 | 7.778 ± 3.348 | 0.520 ± 0.192 |
| AAV8-Cre ($2 \times 10^{12}$ vg) (N = 4) | 40.825 ± 16.354 | 65.550 ± 21.579 | 18.078 ± 7.133 | 2.240 ± 1.280 |
| AAV8-Cre ($4 \times 10^{12}$ vg) (N = 2) | 14.130 ± 6.322 | 62.950 ± 9.970 | 20.150 ± 5.728 | 0.750 ± 0.255 |
| AAV9-Cre ($2 \times 10^{12}$ vg) (N = 4) | 30.000 ± 6.961 | 55.250 ± 7.703 | 11.173 ± 1.757 | 1.100 ± 0.446 |
| AAV9-Cre ($4 \times 10^{12}$ vg) (N = 2) | 26.600 ± 13.859 | 62.150 ± 17.607 | 18.550 ± 8.839 | 0.940 ± 0 |
| AAV10-Cre ($2 \times 10^{12}$ vg) (N = 4) | 26.310 ± 15.177 | 47.825 ± 22.849 | 10.278 ± 6.552 | 1.185 ± 0.998 |

Together, these data provide strong evidence that local or systemic injection of any of a number of AAV serotypes encoding a sequence-specific DNA modifying enzyme can allow for transduction of multiple subsets of endogenous bone marrow stem and progenitor cells, including the most primitive, long-term reconstituting HSCs. This strategy enables irreversible genomic modification, sustained through multiple rounds of hematopoietic regeneration, as assayed in transplantation assays, of long-term reconstituting HSCs residing within their native niche.

Figure 9A:
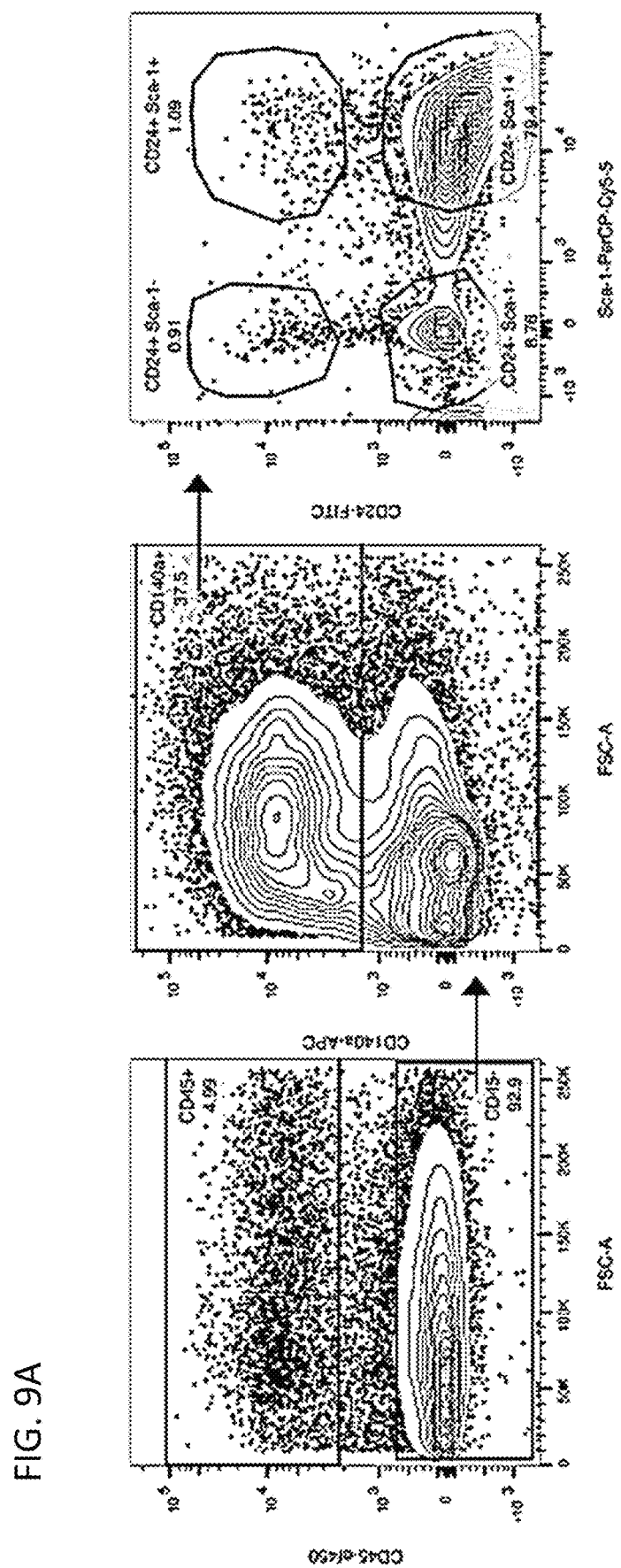
FIGS. 9A-9H show systemic injection of AAV-Cre enables transduction of skin-resident hematopoietic cells, fibroblasts, and mesenchymal precursors.
Figure 9B:
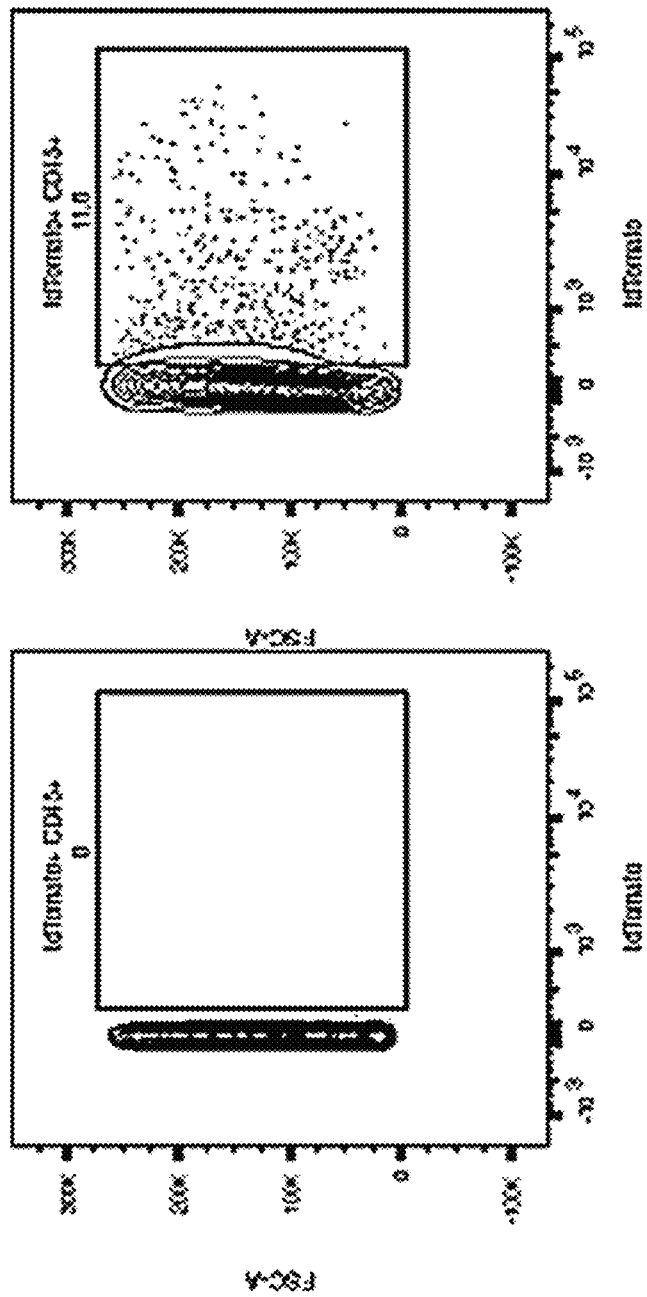
Figure 9C:
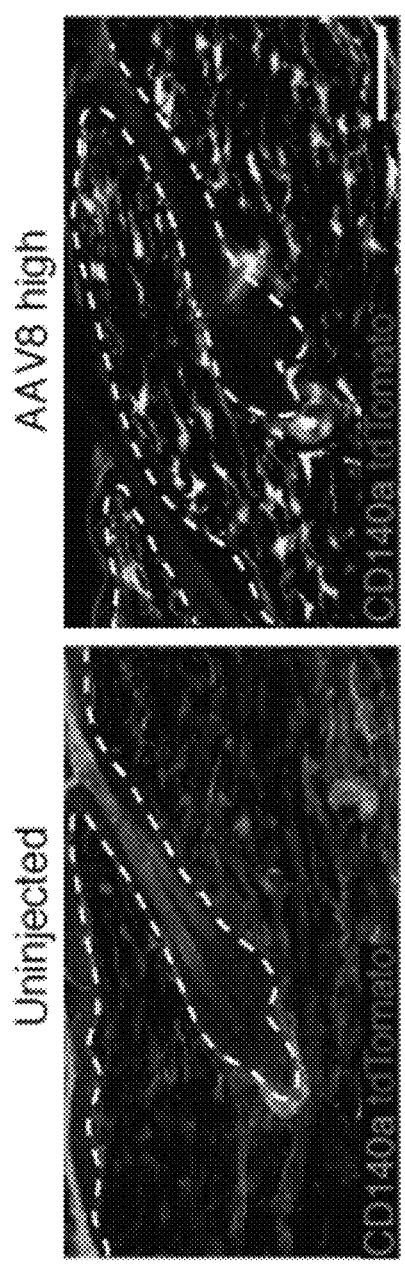
Figure 9D:
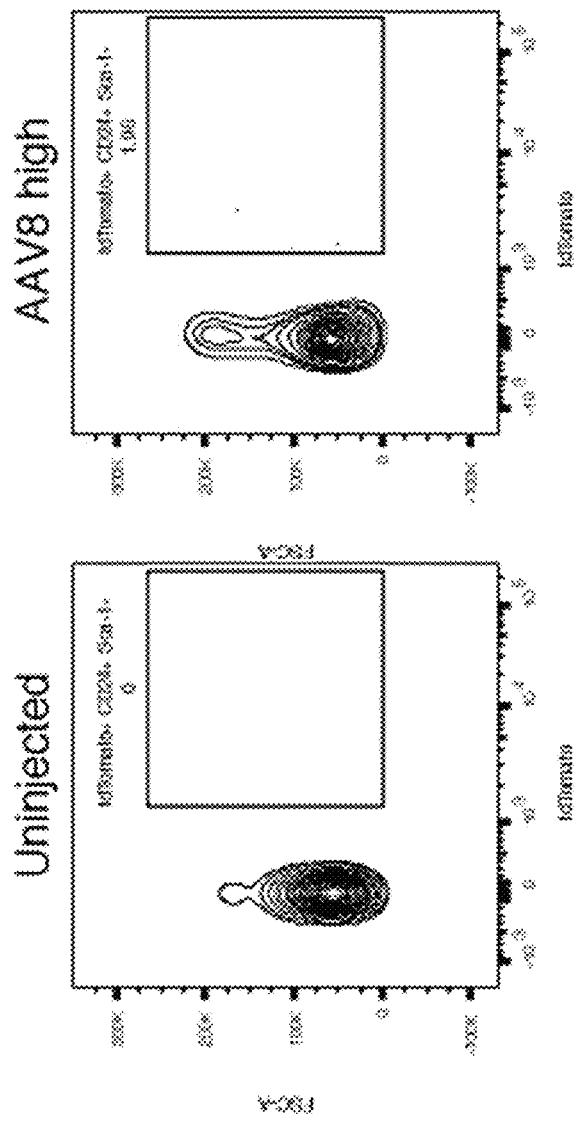
Figure 9E:
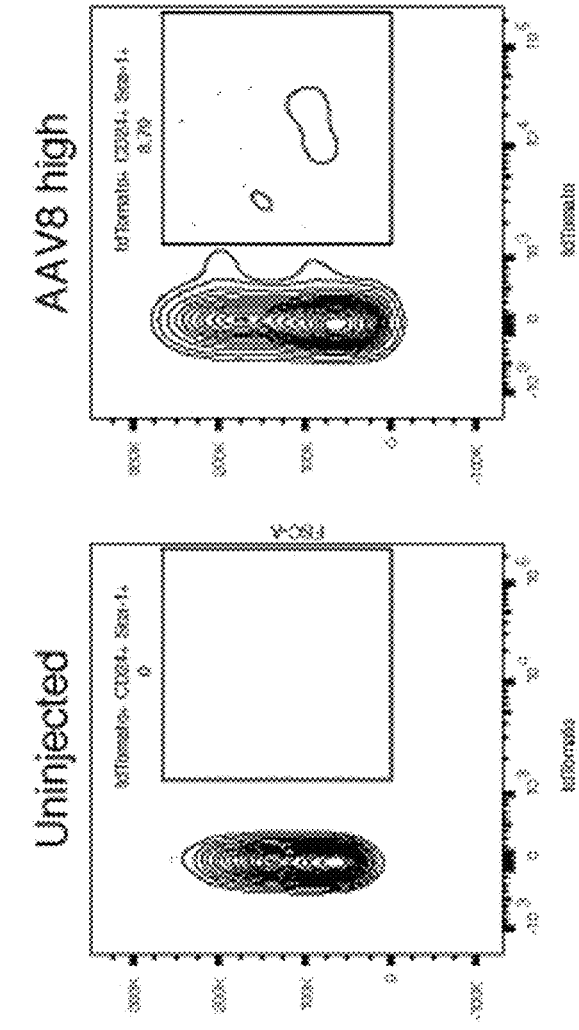
Figures 9F, 9G:
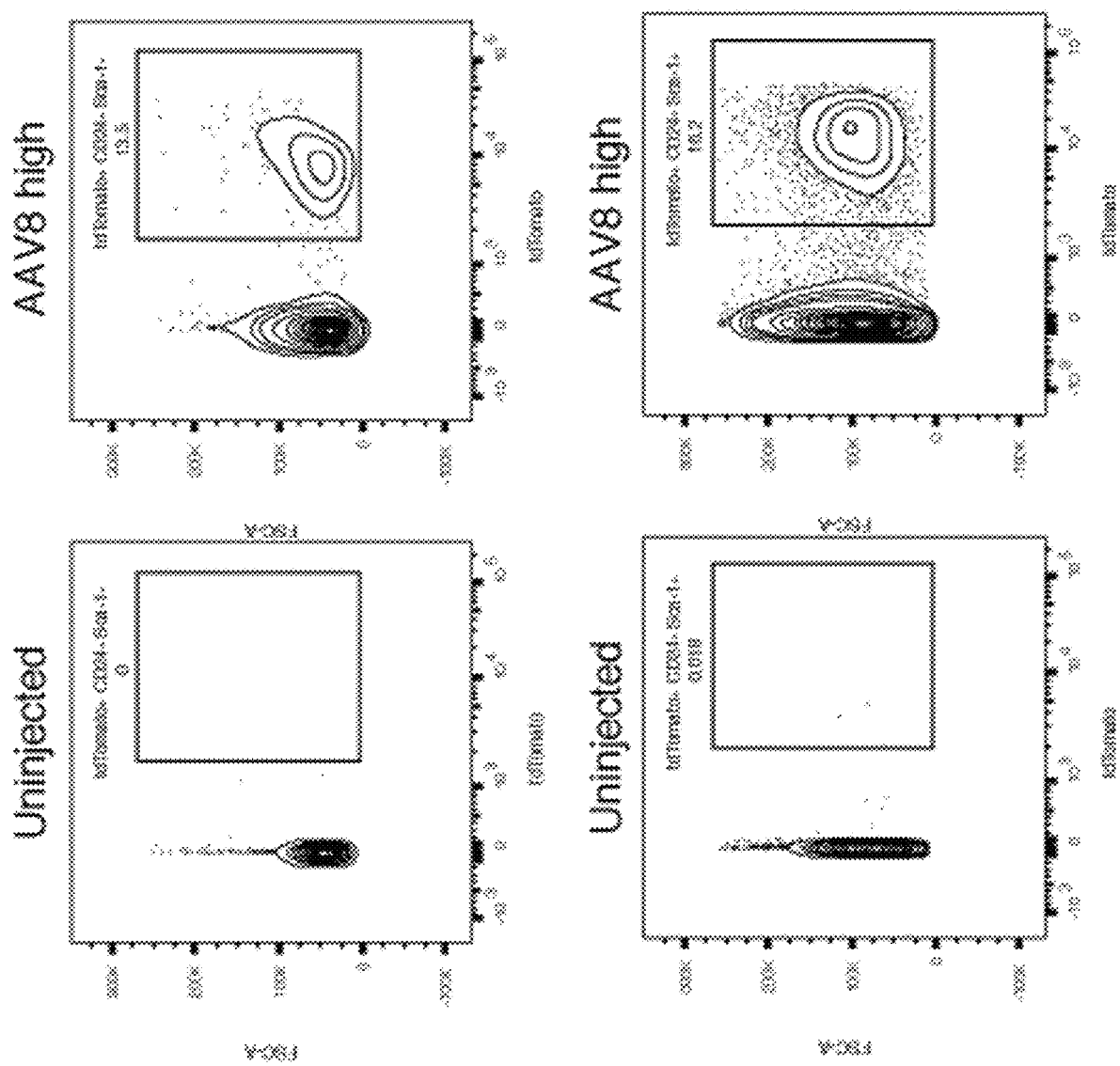
Figure 9H:
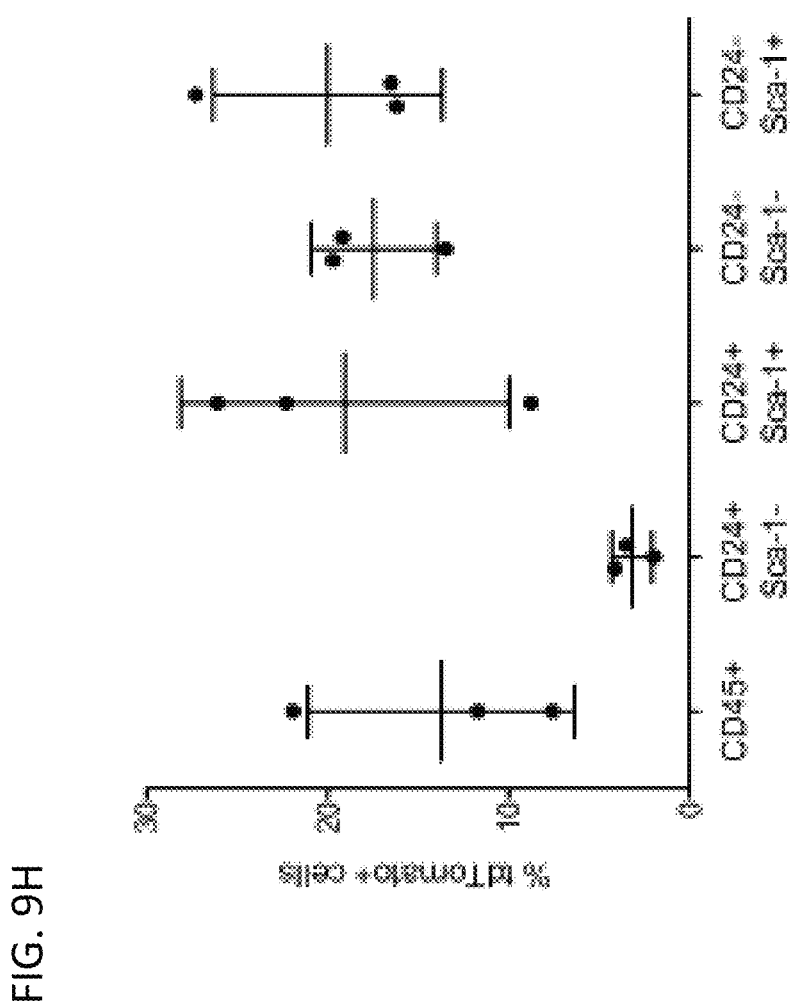

Lastly, to extend the analysis beyond skeletal muscle and hematopoietic tissues, skin tissue from a subset of animals injected with high dose AAV8-Cre was collected and evaluated whether systemic delivery of AAV might also transduce discrete precursor cell populations within this well-defined anatomical compartment. tdTomato fluorescence within hematopoietic cells localized in the skin (CD45$^+$; ranging from 7-22%; FIGS. 9A-9B, 9H) was observed, as expected from the bone marrow analyses, and also in dermal fibroblasts (FIG. 9C) marked by CD140a expression (also known as Pdgfra) (Collins et al., 2011). Using flow cytometry, evaluated tdTomato expression was further evaluated within four populations of CD45⁻CD140a⁺ dermal fibroblasts, distinguishable by combinatorial expression of CD24 and Sca-1 (FIG. 9A) (Zhang et al., 2016). TdTomato fluorescence was detected in each of these dermal subsets, including adipocyte precursors (CD24⁺Sca-1⁺; ranging from 8-26%; FIGS. 9E, 9H), dermal papilla cells (CD24⁻Sca-1⁻; ranging from 13-20%; FIGS. 9F, 9H), and two populations of dermal fibroblasts (CD24⁺Sca-1⁻; ranging from 2-4%, and CD24⁻Sca-1⁺; ranging from 16-27% FIGS. 9D, 9G, and 9H). Thus, systemically administered AAVs target multiple immunophenotypically distinct cell populations in mammalian skin, including precursors of dermal adipose and connective tissue that support epidermal homeostasis and regeneration (reviewed in Driskell et al., 2014). In concert with the analyses of skeletal muscle and bone marrow cell populations presented above, these data demonstrate the broad utility of systemic AAV administration to accomplish direct genome modification in multiple different adult cell lineages and within anatomically distinct tissue compartments.

Discussion

In this study, efficient delivery of DNA modifying enzymes by AAVs to enable permanent genome modifications within tissue stem cell populations in vivo was documented. This highly programmable approach demonstrates effectiveness in four different lineages of stem/progenitor cells (myogenic, hematopoietic, fibro/adipogenic, and osteogenic) in three distinct anatomical niches (skeletal muscle, skin, and bone marrow), and is highly likely to be generalizable to other DNA modifying enzymes, including CRISPR/Cas-based systems (Tabebordbar et al., 2016), and additional stem/progenitor populations in other organ systems and species.

A distinct advantage of this approach is that it allows for manipulation of stem cell genomes in situ without requiring cell isolation, culture or subsequent transplantation, thereby preserving native regulatory interactions and extant stem cell properties. This system also mitigates challenges and toxicities associated with ex vivo stem cell modification and subsequent transplantation, such as the failure of in vitro conditions to maintain robust stem cell function, the necessary use of ablative conditioning, and the unavoidable risk of graft failure (Morgan et al., 2017). It is anticipated that the opportunity to directly transduce endogenous tissue stem cells with DNA modifying enzymes will be of direct and specific relevance for currently ongoing academic and commercial efforts aimed at therapeutic gene editing in stem cells, all of which have, to this point, considered it necessary to purify stem cells for ex vivo modification and re-infusion (Morgan et al., 2017).

A key finding of this work is that AAVs can efficiently transduce multiple adult tissue stem and progenitor cell types in vivo. These results contrast to some degree with previous reports concluding that AAVs do not effectively transduce skeletal muscle satellite cells in adult animals following local or systemic administration (Arnett et al., 2014; Chamberlain and Chamberlain, 2017; Chang et al., 2016). In one of these prior studies (Arnett et al., 2014), systemic administration of AAV6 encoding CMV-driven eGFP into four-week old mice did not result in detectable Pax7⁺/eGFP⁺ satellite cells four weeks after injection. Meanwhile, intramuscular administration of AAV6 or AAV9 encoding CMV-eGFP into eight-week old mice resulted in no detectable Pax7⁺/eGFP⁺ satellite cells two weeks post injection, while similar administration of AAV8-CMV-eGFP resulted in a minority (<5%) of the satellite cell compartment expressing eGFP (Arnett et al, 2014). One potential explanation for these discrepancies could be that this study utilized a more sensitive Cre/lox-driven system to robustly drive tdTomato fluorescence from the mouse genome in the AAV-transduced cells and their progeny, as opposed to monitoring expression of the introduced eGFP protein encoded by the AAV genome, which may exhibit transient expression. Ultimately, these results demonstrate that AAVs are capable of transducing satellite cells at efficiencies required for therapeutic gene editing. Of note, this approach in which cells are permanently modified following AAV transduction also allowed detection of delivery of AAV cargo to non-myogenic stem and progenitor cells, including bone marrow localized HSCs. While the detection in recent years of naturally occurring Glade F AAV variants in healthy human CD34+ hematopoietic cells (termed AAVHSC (Smith et al., 2014)) suggests the existence of AAVs that can transduce such cells, this report demonstrates efficient in vivo transduction of these cells by recombinant AAV vectors and confirms the preservation of HSC function post-transduction using immunophenotyping and transplantation assays. Still, it will be important in future studies to investigate whether AAV transduction in any way influences global gene expression levels within stem cell populations and whether AAVs preferentially transduce certain subsets of tissue stem cells over others.

In addition to targeting muscle satellite cells and HSCs, these finding that AAVs transduce mesenchymal progenitor cells in vivo have important potential applications for this cell population. Mesenchymal progenitors are well established regulators of myogenesis (Joe et al., 2010), and represent a major source of fibrosis and adipose deposition in aging and muscle disease (Joe et al., 2010; Lounev et al., 2009; Uezumi et al., 2014; Uezumi et al., 2010). Thus, these cells are potential targets for anti-fibrotic interventions or for manipulations that will promote their pro-myogenic activities. In addition, as very little is currently known about the mechanisms that govern the actions of these cells, including regulators of their proliferation, differentiation, or role in trophic support for muscle, it is anticipated that targeting this population of cells could be useful for revealing such mechanisms and for advancing our understanding of muscle maintenance and regeneration. This in turn could lead to therapeutic interventions that mitigate the detrimental impacts of these cells and promote their pro-myogenic activity. Given the large number of studies that have utilized Cre models to manipulate gene expression in these cells for such purposes (Heredia et al., 2013; Kopinke et al., 2017; Lees-Shepard et al., 2018; Roberts et al., 2013), it is anticipated that this system will provide an alternative and in some cases more facile system for gene manipulation.

The in vivo AAV system described here overcomes critical technological and practical limitations associated with current experimental systems for interrogating stem cell function. In particular, commonly employed transgenic and gene knockout-based models frequently require complex breeding schemes to introduce multiple alleles, necessitating significant investment of both time and resources. Such approaches become even more challenging when assessing gene targeting effects in aged animals, in non-standard genetic backgrounds, or in combinatorial fashion. In contrast, AAV-mediated delivery of programmable DNA modifying enzymes can be applied across a range of animal ages and strains and to a variety of individual and multiplexed genetic loci. In addition, the AAV-Cre strategy utilized here provides an alternative and complementary approach to tamoxifen-inducible Cre-(CreER) dependent gene activation/inactivation strategies that additionally enables researchers to bypass the potentially confounding effects of hormone administration (Patel et al., 2017). This technology is therefore likely to have important applications in accelerating the pace at which gene functions and interactions can be interrogated in vivo and in tissue progenitors. The results shown herein also indicate that multiple AAV serotypes exhibit tropism for tissue stem and progenitor cells, establishing a foundation for the future development of more specific and selective systems, including identification of AAV capsid variants that transduce particular stem cell populations and of naturally occurring or synthetic gene regulatory elements that restrict expression of AAV-encoded genes to only these cell types. Ultimately, this system may be adapted to enable rapid and direct in vivo screening of candidate and unknown gene targets suspected to specifically influence stem cell phenotypes.

STAR Methods

KEY RESOURCES TABLE

| REAGENT or RESOURCE | SOURCE | IDENTIFIER |
|---|---|---|
| Antibodies | | |
| Armenian Hamster Anti-Mouse CD3e eFluor ® 450 | Thermo Fisher Scientific | Cat #48-0031-80; RRID: AB_10733280 |
| Rat Anti-Human/Mouse CD45R (B220) eFluor ® 450 | Thermo Fisher Scientific | Cat #48-0452-80; RRID: AB_1548763 |
| Rat Anti-Mouse TER-119 eFluor® 450 | Thermo Fisher Scientific | Cat #48-5921-80; RRID: AB_1518809 |
| Rat Anti-Mouse Ly-6G/Ly-6C (Gr-1) eFluor® 450 | Thermo Fisher Scientific | Cat #48-5931-82; RRID: AB_1548788 |
| Rat Anti-Mouse/Human CD11b APC/Cy7 | Biolegend | Cat #101226; RRID: AB_830642 |
| Rat Anti-Mouse Ly-6A/E (Sca-1) PE/Cy7 | Biolegend | Cat #108114; RRID: AB_493596 |
| Rat Anti-Mouse CD117 APC | BD Biosciences | Cat #553356; RRID: AB_398536 |
| Armenian Hamster Anti-Mouse CD48 FITC | Biolegend | Cat #103404; RRID: AB_313019 |
| Rat Anti-Mouse CD150 (SLAM) Brilliant Violet S10 ™ | Biolegend | Cat #115929; RRID: AB_2562189 |
| Rat anti-Mouse CD16/CD32 (Mouse BD Block ™) | BD Biosciences FC | Cat #553142; RRID: AB_394657 |
| Rat Anti-Mouse CD3 antibody PE/Cy7 | Biolegend | Cat #100220; RRID: AB_1732057 |
| Rat Anti-Human/Mouse CD45R (B220) FITC | Thermo Fisher Scientific | Cat #11-0452-85; RRID: AB_465055 |
| Rat Anti-Mouse Ly-6G/Ly-6C (Gr-1) Biotin | Biolegend | Cat #108404; RRID: AB_313369 |

-continued

KEY RESOURCES TABLE

| REAGENT or RESOURCE | SOURCE | IDENTIFIER |
|---|---|---|
| Mouse Anti-Mouse CD45.1 Pacific Blue | Biolegend | Cat #110722; RRID: AB_492866 |
| Mouse Anti-Mouse CD45.2 APC | Biolegend | Cat #109814; RRID: AB_389211 |
| Rat Anti-Mouse Lineage Cocktail Pacific Blue | Biolegend | Cat #133310; RRID: AB_11150779 |
| Mouse Anti-Mouse CD45.2 Alexa Fluor® 700 | Biolegend | Cat #109822; RRID: AB_493731 |
| Rat Anti-Mouse TER-119 APC | Biolegend | Cat #116212; RRID: AB_313713 |
| Rat Anti-Mouse CD71 FITC | BD Biosciences | Cat #553266; RRID: AB_394743 |
| Armenian Hamster Anti-Mouse CD3e Biotin | Biolegend | Cat #100304; RRID: AB_312669 |
| Rat Anti-Human/Mouse CD45R (B220) Biotin | Thermo Fisher Scientific | Cat #13-0452-82; RRID: AB_466449 |
| Rat Anti-Mouse CD19 Biotin | Biolegend | Cat #115504; RRID: AB_313639 |
| Rat Anti-Mouse TER-119 Biotin | Biolegend | Cat #116204; RRID: AB_313705 |
| Rat Anti-Mouse Ly-6G/Ly-6C (Gr-1) Biotin | Biolegend | Cat #108404; RRID: AB_313369 |
| eBioscience™ Streptavidin eFluor™ 450 | Thermo Fisher Scientific | Cat #48-4317-82; RRID: AB_10359737 |
| Rat Anti-Mouse CD34 FITC | Thermo Fisher Scientific | Cat #11-0341-85; RRID: AB_465022 |
| Rat Anti-Mouse CD16/CD32 Alexa Fluor® 700 | Thermo Fisher Scientific | Cat #56-0161-82; RRID: AB_493994 |
| Rat Anti-Mouse/Human CD11b APC | Biolegend | Cat #101212; RRID: AB_312795 |
| Rat Anti-Mouse Ly-6G Pacific Blue™ | Biolegend | Cat #127612; RRID: AB_2251161 |
| Rat Anti-Mouse Ly-6A/E (Sca-1) APC | Biolegend | Cat #108112; RRID: AB_313349 |
| Rat Anti-Mouse CD45 APC-Cy7 | BD Biosciences | Cat #557659; RRID: AB_396774 |
| Rat Anti-Mouse CD11b APC-Cy7 | BD Biosciences | Cat #557657; RRID: AB_396772 |
| Rat Anti-Mouse Ter-119 APC-Cy7 | Biolegend | Cat #116223; RRID: AB_2137788 |

-continued

KEY RESOURCES TABLE

| REAGENT or RESOURCE | SOURCE | IDENTIFIER |
|---|---|---|
| Rat Anti-Mouse Ly-6A/E (Sca-1) APC | Thermo Fisher Scientific | Cat #17-5981-82; RRID: AB_469487 |
| Hamster Anti- Mouse/Rat CD29 (β1-integrin) FITC | Biolegend | Cat #102206; RRID: AB_312883 |
| Rat Anti-Mouse CD184 (CXCR4) Biotin | BD Biosciences | Cat #551968; RRID: AB_394307 |
| Anti-myosin (Skeletal, Fast) antibody | Sigma-Aldrich | Cat #M4276; RRID: AB_477190 |
| Anti-Myosin (Skeletal, Slow) antibody | Sigma-Aldrich | Cat #M8421; RRID: AB_477248 |
| Mouse anti-Pax7 antibody | Developmental Studies Hybridoma Bank | Cat #AB_528428; RRID: AB_528428 |
| Rabbit anti-Laminin antibody | Millipore Sigma | Cat #AB2034; RRID: AB_91209 |
| Goat anti-mouse IgG1, Alexa Fluor 488 | Thermo Fisher Scientific | Cat #A-21121; RRID: AB_2535764 |
| Goat anti-rabbit IgG (H + L), Alexa Fluor 647 | Thermo Fisher Scientific | Cat #A-21244; RRID: AB_2535812 |
| Mouse on Mouse (M.O.M.™) Basic Kit | Vector Laboratories | Cat #BMK-2202; RRID: AB_2336833 |
| Streptavidin-PE- Cy7 | BD Biosciences | Cat #557598; RRID: AB_10049577 |
| Anti-Myosin (Skeletal, slow) | Sigma-Aldrich | Cat #M8421; RRID: AB_477248 |
| Anti-Myosin (Skeletal, fast) | Sigma-Aldrich | Cat #M4276; RRID: AB_477190 |
| CD45-eFluor450 | Thermo Fisher Scientific | Cat #48-0451-82; RRID: AB_1518806 |
| CD140a (PDGFRa)-biotin | Thermo Fisher Scientific | Cat #13-1401-82; RRID: AB_466607 |
| CD24-FITC | Thermo Fisher Scientific | Cat #11-0242-82; RRID: AB_464988 |
| Sca-1-PerCPCy5.5 | Thermo Fisher Scientific | Cat #45-5981-82; RRID: AB_914372 |
| Goat anti-mouse CD140a (PDGFRa) | R&D systems | Cat #AF1062-SP; RRID: AB_2236897 |
| Rabbit anti-RFP | Rockland | Cat #600-401-379; RRID: AB_2209751 |
| Alexa Fluor 488 Affinipure Donkey anti-goat IgG | Jackson Immunoresearch | Cat #705-545-147; RRID: AB_2336933 |
| Cy™ 3 Affinipure Donkey anti-rabbit IgG | Jackson Immunoresearch | Cat #711-165-152; RRID: AB_2307443 |
| 4',6-diamino-2-phenylindole (DAPI) | Thermo Fisher Scientific | Cat #D1306; RRID: AB_2629482 |
| SYTOX™ Blue Dead Cell Stain, for flow | Thermo Fisher Scientific | Cat #S34857 |

KEY RESOURCES TABLE

| REAGENT or RESOURCE | SOURCE | IDENTIFIER |
| --- | --- | --- |
| cytometry | | |
| 7-AAD | BD Biosciences | Cat #559925 |
| Streptavidin, Pacific Orange conjugate | Thermo Fisher Scientific | Cat #S32365 |
| Anti-APC Microbeads | Miltenyi Biotec | Cat #120-001-265 |
| Wheat Germ Agglutinin, Alexa Fluor 488 Conjugate | Thermo Fisher Scientific | Cat #W11261 |
| Propidium Iodide | Sigma | Cat #P4170-25MG |
| Calcein Blue, AM | Thermo Fisher Scientific | Cat #C1429 |
| eBioscience ™ Streptavidin-APC | Thermo Fisher Scientific | Cat #17-4317-82 |
| Bacterial Strains | | |
| ElectroMAX ™ Stbl4 ™ Competent Cells | Thermo Fisher Scientific | Cat #11635018 |
| Chemicals, Peptides, and Recombinant Proteins | | |
| HBSS, calcium, magnesium, no phenol red | Thermo Fisher Scientific | Cat #14025-134 |
| FBS (for cell culture) | GE Healthcare (Hyclone) | Cat #SH30071.03 |
| FBS (for staining media) | Sigma Aldrich | Cat #F6178-500 mL |
| Dulbecco's Phosphate-Buffered Saline (DPBS), no calcium, no magnesium | Thermo Fisher Scientific | Cat #14190-250 |
| Collagen I Rat Protein | Thermo Fisher Scientific | Cat #A1048301 |
| Natural Mouse Laminin, 1 mg | Thermo Fisher Scientific | Cat #23017015 |
| FGF-Basic, recombinant | Sigma | Cat #F0291 |
| DMEM, high glucose | Thermo Fisher Scientific | Cat #11965118 |
| Ham's F10 Nutrient Mix, 500 ml bottle | Thermo Fisher Scientific | Cat #11550043 |
| Donor Horse Serum | Atlanta Biologicals | Cat #S12150 |
| Penicillin-Streptomycin | Thermo Fisher Scientific | Cat #15140122 |
| GlutaMAX Supplement | Thermo Fisher Scientific | Cat #35050061 |

-continued

KEY RESOURCES TABLE

| REAGENT or RESOURCE | SOURCE | IDENTIFIER |
|---|---|---|
| Dexamethasone | Sigma | Cat #D1756 |
| Insulin solution from bovine pancreas | Sigma | Cat #I0516 |
| Rosiglitazone | Cayman Chemical | Cat #71740 |
| 3-isobutyl-1-methylxanthine | Sigma | Cat #I5879 |
| Paraformaldehyde, 32% solution | VWR | Cat #100496-496 |
| Triton X-100 | Sigma | Cat #T9284 |
| Triton X-100 | Fisher Scientific | Cat #BP151 |
| Normal Goat Serum, Jackson Immuno | VWR | Cat #102643-594 |
| Donkey Serum | Sigma | Cat #D9663 |
| Bovine Serum Albumin (BSA) | Sigma | Cat #A9647 |
| Bovine Serum Albumin (BSA) | Sigma | Cat #A7030 |
| Gelatin from cold water fish skin | Sigma | Cat #G7765 |
| Tween 20 | Sigma | Cat #P1379 |
| BODIPY ™ 493/503 | Thermo Fisher Scientific | Cat #D3922 |
| Hoechst 33342, Trihydrochloride, Trihydrate | Thermo Fisher Scientific | Cat #H1399 |
| Cardiotoxin gamma from Naja pallida | Latoxin | Cat #L8102 |
| EDTA (0.5M), pH 8.0 | Thermo Fisher Scientific | Cat #AM9261 |
| Dextran | Millipore Sigma | Cat #31392 |
| ACK Lysing Buffer | Thermo Fisher Scientific | Cat #A1049201 |
| Iodixanol | Axis-Shield PoC AS | Cat #AXS-1114542-5 |
| Trizol LS | Thermo Fisher Scientific | Cat #1029610 |
| Isopentane (2-Methylbutane) | Millipore Sigma | Cat #M32631 |
| Paraformaldehyde (PFA), 32% solution, EM grade | VWR | Cat #100496-496 |

KEY RESOURCES TABLE -continued

| REAGENT or RESOURCE | SOURCE | IDENTIFIER |
|---|---|---|
| Vectashield HardSet Antifade Mounting Medium with DAPI | Vector Laboratories | Cat #H-1200 |

Critical Commercial Assays

| | | |
|---|---|---|
| SuperScript IV VILO Master Mix with ezDNase Enzyme | Thermo Fisher Scientific | Cat #11766050 |
| Pax7 TaqMan assay | Thermo Fisher Scientific | Mm01354484_m1 |
| Myf5 TaqMan assay | Thermo Fisher Scientific | Mm00435125_m1 |
| Myod1 TaqMan assay | Thermo Fisher Scientific | Mm00440387_m1 |
| Myog TaqMan assay | Thermo Fisher Scientific | Mm00446194_m1 |
| Gapdh TaqMan assay | Thermo Fisher Scientific | Mm99999915_g1 |
| TaqMan Fast Advanced Master Mix | Thermo Fisher Scientific | Cat #4444557 |

Experimental Models: Cell Lines

| | | |
|---|---|---|
| HEK293 | ATCC | Cat #CRL-1573; RRID: CVCL_0045 |

Experimental Models: Organisms/Strains

| | | |
|---|---|---|
| Mouse: C57BL/10ScSn-Dmd$^{mdx}$/J | The Jackson Laboratory | JAX: 001801; RRID: IMSR_JAX: 001801 |
| Mouse: B6; 12956-Gt(ROSA)26Sortm 9(CAG-tdTomato)Hze/J | The Jackson Laboratory | JAX: 007905; RRID: IMSR_JAX: 007905 |
| Mouse: B6.Cg-Tg(Pax7-ZsGreen)1Kyba/J | The Jackson Laboratory | JAX: 029549; RRID: IMSR_JAX: 029549 |
| Mouse: B6.SJL-Ptprc$^a$ Pepc$^b$/BoyJ | The Jackson Laboratory | JAX: 002014; RRID: IMSR_JAX: 002014 |
| Mouse: C57BL/6J | The Jackson Laboratory | JAX: 000664; RRID: IMSR_JAX: 000664 |

Oligonucleotides

Pax7_zsGreen_F; CTGCATGTACCA CGAGTCCA (SEQ ID NO: 1)

Pax7_zsGreen_R; GTCAGGTGCCAC TTCTGGTT (SEQ ID NO: 2)

KEY RESOURCES TABLE -continued

| REAGENT or RESOURCE | SOURCE | IDENTIFIER |
|---|---|---|
| tdTomato_WT_F; AAGGGAGCTGCAGTGGAGTA (SEQ ID NO: 3) | | |
| tdTomato_WT_R; CCGAAAATCTGTGGGAAGTC (SEQ ID NO: 4) | | |
| tdTomato_Knock-in_F; CTGTTCCTGTACGGCATGG (SEQ ID NO: 5) | | |
| tdTomato_Knock-in_R; GGCATTAAAGCAGCGTATCC (SEQ ID NO: 6) | | |
| Recombinant DNA | | |
| Package plasmid (pAAV2/Anc80 L65AAP) | Addgene | Cat #92307 |
| Transgene plasmid (pAAV Cre) | GTVC | In house production |
| pAAV-Cre control plasmid | Cell Biolabs | AAV-401 |
| Helper plasmid (ΔF6) | GTVC | In house production |
| Package plasmid (pKAAV2/8, pKAAV2/9) | GTVC | In house production |
| Software and Algorithms | | |
| BD FACSDiva ™ Software v8.0.2 | BD Biosciences | http://www.bdbiosciences.com/us/instruments/research/software/flow-cytometry-acquisition/bd-facsdiva-software/m/111112/overview; RRID: SCR_001456 |
| FlowJo v10. 1r5 | FlowJo | https://www.flowjo.com/solutions/flowjo; RRID: SCR_008520 |
| Other | | |
| Covidien Monoject Softpack Insulin Syringe, 1/2 mL, 28G x 1/2" | Covidien | 1188528012 |
| Equisul-SDT ® (Sulfadiazine Trimethoprim) | Aurora Pharmaceutical | Cat #28002 |
| Irradiated PicoLab Mouse Diet 205058 | LabDiet, St. Louis, MO | Cat #0007689 |
| Irradiated LabDiet Prolab Isopro RMH 3000 5P75 | LabDiet, St. Louis, MO | Cat #0006972 |
| Tissue-Tek ® O.C.T. Compound, Sakura ® Finetek | VWR | 25608-930 |

Experimental Model and Subject Details

Mice

Mice were housed at the animal facility at the Harvard University/Faculty of Arts and Sciences Biological Research Infrastructure, which is accredited by the Association for Assessment and Accreditation of Laboratory Animal Care (AALAC). All procedures were performed under protocols approved by the Institutional Animal Care and Use Committee (IACUC). Mice were housed in standard ventilated racks at a maximum density of 5 mice per cage. Room temperature was maintained at 22° C.±1° C. with 30-70% humidity. Mice were kept on a 12-hour light/dark cycle and provided food and water ad libitum. Breeder mice were kept on irradiated PicoLab Mouse Diet 20 5058 (LabDiet, St. Louis, MO), and non-breeder mice were kept on irradiated LabDiet Prolab Isopro RMH 3000 5P75 (LabDiet, St. Louis, MO). Cages were filled with ¼ inch Anderson's Bed o Cob bedding (The Andersons, Inc., Maumee, OH) and each contained one nestiet (2×2" compressed cotton square, Ancare, Bellmore, NY) and one red mouse hut (certified polycarbonate; 3¾" wide×1⅞" tall×3" long, BioSery, Flemington, NJ). Cage changes were performed at least every 14 days, and more frequently if necessary. Animal health surveillance was performed quarterly by PCR testing of index animals and through swabs from rack plenums.

C57BL/10ScSn-Dmd$^{mdx}$/J (mdx; C57BL/10ScSnJ background), B6; 129S6-Gt(ROSA)26Sortm9(CAG-tdTomato) Hzea (Ai9; B6/129S6 background), B6.SJL-Ptprc$^a$ Pepc$^b$/BoyJ (CD45.1; C57BL/6J background), B6.Cg-Tg(Pax7-ZsGreen)1Kybaa (Pax7-ZsGreen; C57BL/6J background) and C57BL/6J mouse strains were used for this study. To generate mdx; Ai9 homozygous mice, mdx mice were bred to Ai9 homozygous mice. mdx; Ai9 mice were bred with Pax7-Zsgreen mice to generate mdx;Ai9;Pax7-Zsgreen animals. The Pax7-zsGreen allele has been extensively validated in multiple studies to mark skeletal muscle satellite cells by flow cytometry (Arpke et al., 2013; Bosnakovski et al., 2008; Maesner et al., 2016). Animals were randomly assigned to experimental and control groups. All mice used for experiments were immunocompetent.

Figures 10A, 10B:
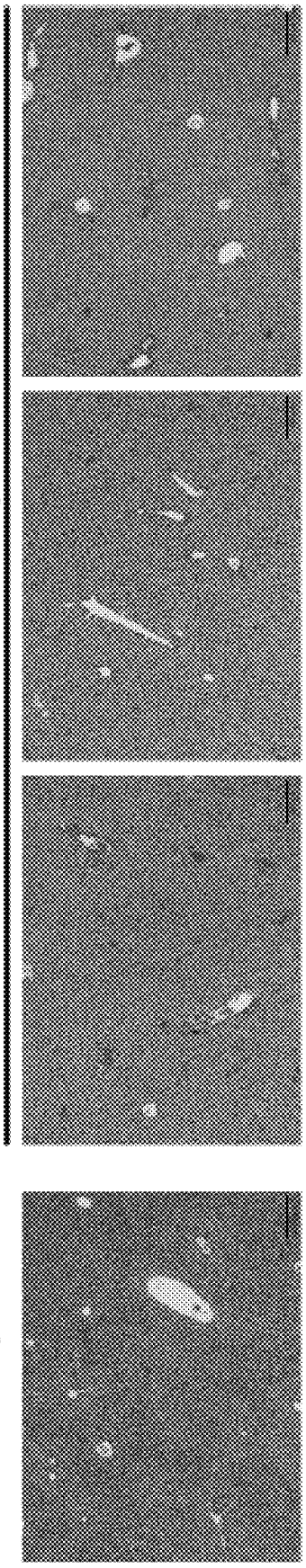
FIGS. 10A-10B show systemic AAV administration does not induce overt liver histopathology.

For intrafemoral injection experiments, 6-9-month-old male and female Ai9 homozygous animals were injected with AAV-Cre or vehicle. 6 weeks post injection, mice were euthanized and hematopoietic cells were isolated for flow cytometry analysis and FACS. For systemic injection experiments, 6-week-old male mdx; Ai9 homozygous mice were injected with AAV-Cre or vehicle via tail vein or retroorbital injection. 2 weeks post injection, mice were harvested and liver, skeletal muscle and hematopoietic cells were collected for analysis. Histopathological assessment of hematoxylin & eosin stained sections of liver tissue from a subset of AAV-Cre and control injected animals, performed in a blinded fashion by a skilled mouse pathologist (R. Bronson), did not reveal signs of tissue pathology (FIG. 10B).

For hematopoietic cell transplantation experiments, bone marrow cells from homozygous CD45.1 mice were collected and depleted for Sca-1 to use for helper marrow. Homozygous CD45.1 mice were used as recipients for primary and secondary hematopoietic stem and progenitor cell (HSPC) transplants. Following HSPC transplantation, recipient animals were kept on antibiotic water containing 0.67 mg/mL Sulfadiazine Trimethoprim for 4 weeks post-transplant.

Method Details

AAV Selection and Production

Multiple AAV serotypes were used, with a particular emphasis on serotypes with broad biodistribution (Zincarelli et al., 2008). For the intrafemoral injection experiments, we evaluated a panel of 7 AAV serotypes (1, 2, 5, 6, 8, 9 and 10) and identified those that targeted HSCs with the greatest efficiency. A smaller panel of 3 AAV serotypes (1, 8, 9) was used for the intramuscular injection experiments. We did not move forward with AAV1 for the systemic injection experiments because it is known to induce a greater inflammatory response than the other AAV serotypes (Lu and Song, 2009), which may limit its usefulness in preclinical testing or in disease modeling applications. The selection of AAV serotypes used for the systemic injection experiments was based on our previous work showing that AAV9 effectively transduces muscle satellite cells in vivo (Tabebordbar et al., 2016). For our preliminary analyses (Table S1), we administered AAV9 via tail vein injection along with two additional serotypes: AAV6 and AAV8, both of which have been shown to target skeletal muscle following in vivo delivery (Blankinship et al., 2004; Wang et al., 2005). Building off of these results, we next performed systemic tail vein administration of AAV8 and AAV9, and also included Anc80L65, an ancestral AAV with robust tropism for skeletal muscle and other organs (Zinn et al., 2015), to express Cre recombinase downstream of CMV promoter and a chimeric intron. For systemic retro-orbital AAV administration, we focused particularly on Anc80 and AAV8, both of which exhibited higher targeting efficiency for blood and muscle stem cells in the tail vein injection experiments. Furthermore, we included two doses of AAV8 to assess if injecting a higher concentration of AAV resulted in a greater transduction efficiency.

For systemic injection experiments using AAV8, AAV9 and Anc80L65, AAV production was performed by the Gene Transfer Vector Core (GTVC) at the Grousbeck Gene Therapy Center at the Schepens Eye Research Institute and Massachusetts Eye and Ear Infirmary (SER/MEEI) as described previously (Lock et al., 2010; Zinn et al., 2015). For intrafemoral injection experiments using AAV serotypes 1, 2, 5, 6, 8, 9 and 10, AAVs were produced at the University of Pennsylvania Penn Vector Core. For the systemic injection experiment using AAV6, AAV8, and AAV9, AAV production was done by the UMASS medical school vector core.

Muscle Stem Cell Isolation and In Vitro Differentiation

Muscle stem cell isolation from mdx;Ai9 mice systemically injected with AAV-Cre was performed as previously described (Cerletti et al., 2008; Sherwood et al., 2004). Briefly, tibialis anterior (TA), gastrocnemius, triceps, quadriceps and abdominal muscles were digested with collagenase and dispase and myofiber-associated cells were isolated by centrifugation. The cells were stained with an antibody mix (APC-Cy7 anti-CD45 (1:200), APC-Cy7 anti-CD11b (1:200), APC-Cy7 anti-TER119 (1:200), APC anti-Sca-1 (1:200), FITC anti-CD29 (β1-integrin) (1:100), Biotin anti-CD184 (CXCR4) (1:100)) for 30 min on ice, followed by a secondary staining with Streptavidin-PE-Cy7 (1:100) for 15 minutes on ice. Propidium iodide (PI) and calcein blue were used to discriminate dead and livecells, respectively. CD45$^-$ CD11b (Mac-1)$^-$ Ter119$^-$ Sca-1$^-$ β1-integrin$^+$ CXCR4$^+$ cells were isolated by FACS as muscle satellite cells; Sca-1$^+$, CD45$^-$ CD11b$^-$ Ter119$^-$ cells were isolated as mesenchymal progenitors; Lineage (CD45, CD11b, Ter119)$^+$ cells were gated as Lin$^+$ blood cells for analysis. For in vitro expansion of satellite cells isolated from AAV-transduced muscles, satellite cells were seeded on collagen/laminin-coated plates in F10 containing 20% donor horse serum, 1% penicillin-streptomycin, and 1% glutamax. 5 ng/ml bFGF was added to the medium daily. Media was refreshed every other day. After 5 days, satellite cells were harvested, cell numbers were counted and cells were re-plated in multiple wells of a 96 well plate for differentiation. The next day, media was changed to DMEM containing 2% donor horse serum, 1% penicillin-streptomycin. Myotubes were fixed with 4% paraformaldehyde after 60 or 72 hours in differentiation media.

Muscle stem cell isolation from AAV-Cre injected TA muscles of mdx;Pax7-ZsGreen$^{+/-}$; Ai9 mice was performed as previously described (Tabebordbar et al., 2016). Briefly, individual TA muscles were separately minced using scissors followed by two digestion steps in collagenase and dispase. Muscles were triturated in between and after the digestion steps. The homogenate was centrifuged, re-suspended, and filtered before another round of centrifugation and resuspension. Cells were stained with an antibody mix of APC anti-Sca-1 (1:200), APC-Cy7 anti-CD45 (1:200), APC-Cy7 anti-CD11b (Mac-1) (1:200), and APC-Cy7 anti-Ter119 (1:200). Propidium iodide (PI) and calcein blue were used to discriminate dead and live cells, respectively. CD45$^-$ CD11b (Mac-1)$^-$ Ter119$^-$ Sca-1$^-$ Pax7-ZsGreen$^+$ cells were isolated as muscle satellite cells. This transgenic line has been used previously in multiple studies for the identification and isolation of muscle satellite cells, with extensive validation studies performed by multiple groups (Arpke et al., 2013; Bosnakovski et al., 2008; Maesner et al., 2016), including a study from our lab which specifically addressed the issue of satellite cell identification by flow cytometry (Maesner et al., 2016).

Muscle Sca-1$^+$ Progenitor Isolation and Adipogenic Differentiation

Sca-1$^+$ progenitor (Sca-1$^+$, CD45$^-$ CD11b (Mac-1)$^-$ Ter119$^-$) isolation from mdx;Ai9 mice systemically injected with AAV-Cre was performed as previously described (Hettmer et al., 2011; Schulz et al., 2011; Tan et al., 2011). Briefly, freshly sorted Sca-1$^+$ cells were plated in collagen/laminin-coated 96 well plates and expanded for 8 days in growth medium (F10 containing 20% donor horse serum, 1% penicillin-streptomycin, and 1% glutamax) and provided with 5 ng of bFGF daily with fresh media changes every other day. After 8 days in growth medium, cells were switched to Adipogenic Induction Media (DMEM containing 10% PBS, 1% penicillin/streptomycin, 1 mM Dexamethasone, 100 nM Insulin, 1 mM Rosiglitazone and 0.5 mM 3-isobutyl-1-methylxanthine) for 2 days and then switched to Adipogenic Differentiation Media (DMEM containing 10% EBS, 1% penicillin/streptomycin and 100 nM Insulin) for an additional 8 days. Media was changed every other day, and cells were stained with BODIPY™ 493/503 as per manufacturer's instructions.

Muscle Satellite Cell Transplantation

One day before transplantation, 25 µL of 10 µM Cardiotoxin gamma from Naja pallida was injected to the tibialis anterior (TA) muscles of anesthetized 7-8 week-old male mdx recipient mice. Up to 50,000 single-sorted tdTomato$^+$ satellite cells or vehicle (staining media) alone was injected into the pre-injured tibialis anterior (TA) muscles. The injected TA muscles were harvested 3 weeks post-transplantation for cryosectioning and fluorescence detection.

Immunofluorescence

For myosin heavy chain (MHC) staining of in vitro differentiated myotubes, myotubes were permeabilized using 0.5% Triton X-100 for 15 minutes at room temperature, washed 2×5 min with DPBS, and blocked with 5% Normal Goat Serum, 2% BSA, 2% protein concentrate (from M.O.M.™ Basic Kit), and 0.1% tween-20 for 1 hour at room temperature. Cells were washed 2×5 min with DPBS, incubated with anti-skeletal myosin type II (fast-twitch) (1:200) and anti-skeletal myosin type I (slow-twitch) (1:100) at 4° C. overnight, washed 3×5 min with DPBS, and incubated with goat anti-mouse IgG Alexa-488 conjugate secondary antibody (1:250). After washing for 3×5 min with DPBS, cells were stained with 10 mg/ml Hoechst.

For staining of skeletal muscle tissue, tibialis anterior (TA) muscles were dissected and immediately fixed in 1% PFA for one hour at room temperature, washed with DPBS, and cryopreserved in 30% sucrose at 4° C. overnight. Tissues were then embedded in O.C.T. compound, cryopreserved in super-cooled isopentane, and sectioned using a Leica CM1860 cryostat (Leica Biosystems). Sections were post-fixed in 2% PFA for 5 minutes, incubated in 0.1 M glycine buffer for 5 minutes, and permeabilized in 0.3% Triton X-100/DPBS for 20 minutes. Sections were blocked with 10% M.O.M. IgG blocking reagent, and further blocked with 1% M.O.M. IgG blocking reagent, 3% BSA, 8% M.O.M protein concentrate, and 5% Normal Goat Serum. Primary antibody staining was performed using anti-Pax7 (15 µg/mL) and Rabbit anti-laminin (1:200) at 4° C. overnight. The following day, sections were washed and stained with goat anti-mouse IgG1 Alexa Fluor 488 (1:250) and goat anti-rabbit IgG H+L Alexa Fluor 647 (1:250). Slides were mounted with Vectashield HardSet Antifade Mounting Medium containing DAPI, and images were captured using a Zeiss LSM 880 inverted confocal microscope. For quantification of Pax7$^+$ tdTomato$^+$ sublaminar cells by immunofluorescence analysis, 60-80 Pax7$^+$ sublaminar cells were quantified per animal among 10 0.181 mm$^2$ fields.

For staining of skin tissue, dorsal skin samples were fixed for 15 minutes using 4% PFA at room temperature, washed extensively with PBS, immersed in 30% sucrose overnight at 4° C. and embedded in O.C.T (Sakura Finetek). 30 µM sections were blocked for 1-2 hours (5% Donkey serum, 1% BSA, 2% Cold water fish gelatin in 0.3% Triton in PBS), incubated with anti-CD140a (1:200) and anti-RFP (1:1000) antibodies overnight at 4° C., and incubated for 2-4 hours at room temperature with Donkey anti-goat IgG Alexa 488 (1:400) or Donkey anti-rabbit Cy3 (1:400) secondary antibodies. DAPI was used for counterstaining.

RNA Isolation, cDNA Synthesis and Real-Time PCR

Satellite cells were sorted directly into Trizol LS and stored at −80 □ C. Total RNA was isolated according to manufacturer's instructions. cDNA was synthesized using the SuperScript IV VILO Master Mix with ezDNase Enzyme kit. Quantitative PCR was performed on a QuantStudio 6 Flex Real-Time PCR system. The following TaqMan assays were used to evaluate relative gene expression: Pax? Mm01354484_m1), Myf5 (Mm00435125_m1), Myod1 (Mm00440387_m1), Myog (Mm00446194_m1) and Gapdh (Mm99999915_g1).

HSPC Isolation and Flow Cytometry Analysis/FACS

Bone marrow cells were flushed from all 4 long bones (2 femurs and 2 tibias) with a 21-gauge needle into staining media (HBSS containing 2% FBS), resuspended, and filtered through a 40 µm cell strainer. Cells were pelleted and subjected to ACK lysis for 5 minutes on ice (except when analyzing erythroid precursor cells), re-filtered through a 40 µm strainer, and washed with staining media.

To identify HSCs from AAV-injected mice, cells were stained with the following antibodies for 45 minutes on ice: CD3-ef450 or CD3-biotin (1:100), B220-ef450 or B220- biotin (1:200), Ter119-ef40 or Ter119-biotin (1:100), Gr-1-ef450 or Gr-1-biotin (1:400), CD11b-APCCy7 (1:200), c-Kit-APC (1:200), Sca-1-PECy7 (1:200), CD48-FITC (1:200), and CD150-BV510 (1:50). When biotinylated antibodies were used, cells were washed and incubated with Streptavidin-ef450 (1:200) for 30 minutes on ice.

To identify HSCs from transplanted mice, cells were stained with the following antibodies for 45 minutes on ice: Lineage Cocktail-Pacific Blue (1:20), c-Kit-APC (1:200), Sca-1-PECy7 (1:200), CD48-FITC (1:200), CD150-BV510 (1:50), and CD45.2-AF700 (1:100).

To identify myeloid progenitors from AAV-injected mice, cells were stained with the following antibodies for 60 minutes on ice: CD3-ef450 or CD3-biotin (1:100), B220-ef450 or B220-biotin (1:200), Ter119-ef40 or Ter119-biotin (1:100), Gr-1-ef450 or Gr-1-biotin (1:400), CD11b-APCCy7 (1:200), c-Kit-APC (1:200), Sca-1-PECy7 (1:200), CD34-FITC (1:25) and CD16/CD32-AF700 (1:100). For biotinylated antibodies, cells were washed and incubated with Streptavidin-ef450 (1:200) for 30 minutes on ice.

To identify erythroid precursor cells from AAV-injected mice, cells were stained with the following antibodies for 30 minutes on ice: CD71-FITC (1:200) and Ter119-APC (1:200). For all HSPC staining panels, cells were washed after antibody/streptavidin incubation and resuspended in staining media, and Sytox Blue (1:1,000) was added immediately prior to FACS to mark dead cells. Cells were analyzed on a BD LSR II flow cytometer and sorting was performed on a BD FACS Aria II. Data analysis was performed using BD FACS Diva and FlowJo software.

HSPC Transplantation

For each animal, $Lin^{low}$ tdTomato$^+$ live bone marrow cells were singly sorted from bone marrow into staining media containing 10% FBS. As CD11b (Mac-1) expression has been reported to increase on HSCs in certain contexts of inflammation or stress (Randall and Weissman, 1997), we did not sort tdTomato$^+$ bone marrow cells used for transplantation on the basis of CD11b expression, in case this marker might be altered in its expression following AAV administration. Cells from each donor animal were combined with 6×10$^5$ Sca-1-depleted radioprotective CD45.1 helper bone marrow cells and injected intravenously into two lethally irradiated (950 rads, split dose) CD45.1 recipient animals (3×10$^5$ helper marrow cells per recipient). Cells were injected with a 28-gauge insulin syringe into the retroorbital sinus.

Sca-1 depletion was performed by staining ACK-lysed CD45.1 bone marrow cells with Sca-1-APC (1:200) for 10 minutes on ice, washing and incubating with anti-APC microbeads for 20 minutes on ice. Cells were washed and depleted using the AutoMACS Separator (Depletes program). Depletion efficiency was confirmed by flow cytometry analysis. 7-AAD (1:20) was used as a viability dye and was added to cells immediately prior to analysis.

Peripheral Blood Collection and Flow Cytometry Analysis

Donor chimerism and tdTomato analysis was performed from peripheral blood samples of primary and secondary transplant recipients at 4, 8, 12 and 16 weeks post-transplant. Peripheral blood was collected via the tail vein into a 1.5 mL tube containing 100 µL of PBS/10 mM EDTA and stored on ice. 1 mL of 2% Dextran/PBS was added to the samples, mixed and incubated at 37° C. for 30 minutes to sediment red blood cells. The remaining cells were washed and subjected to ACK lysis for 5 minutes on ice. Cells were washed, filtered through a 40 µm cell strainer, and resuspended in HBSS/2% FBS/10 mM EDTA containing anti-CD16/CD32 (1:50) for 5 minutes on ice. Cells were stained with the following antibodies for 30 minutes on ice: CD3-PECy7 (1:65), B220-FITC (1:100), CD11b-APC-Cy7 (1:200), Gr-1-Biotin (1:400), CD45.1-Pacific Blue (1:100) and CD45.2-APC (1:100). Cells were washed and stained with Streptavidin-Pacific Orange (1:500) for 30 minutes on ice. Cells were washed, resuspended in HBSS/2% FBS/10 mM EDTA, and 7-AAD (1:20) was added immediately prior to analysis. Cells were analyzed on a BD LSR II flow cytometer, and data analysis was performed using BD FACS Diva and FlowJo software.

Liver Histology

Liver tissue was harvested and fixed in 4% paraformaldehyde for approximately 24 hours, then transferred to 70% ethanol. Samples were submitted to the Rodent Histopathology Core at the Dana-Farber/Harvard Cancer Center, embedded in paraffin, sectioned and stained with hematoxylin and eosin. Slides were analyzed and scored for histopathology by a Rodent Histopathologist in a blinded manner.

Skin Cell Isolation and Flow Cytometry Analysis

Mouse back skin was dissected. Dissected skin (dermis facing down) was incubated in 0.25% Collagenase in HBSS for 40-60 minutes at 37° C. The dermis was then scraped using a surgical scalpel. Collected cells were centrifuged for 8 minutes at 350×g at 4° C. Single cell suspensions were obtained by incubation with trypsin-EDTA at 37° C. for 10 minutes and filtering through 70 µM and 40 µM filters. Single cell suspensions were then centrifuged for 8 minutes at 350×g at 4° C., re-suspended in 5% FBS in PBS and stained for 30 minutes. The following antibodies were used: CD45-ef450 (1:250), CD140a-biotin (1:250), Streptavidin-APC (1:500), CD24-FITC (1:200), and Sca-1-PerCPCy5.5 (1:1000). DAPI was used to exclude dead cells. Blood-lineage cells were gated as CD45$^+$. Dermal fibroblasts were gated as CD45$^-$ CD140a+, then further divided based on CD24 and Sca-1 expression. Cells were analyzed on a BD FACS Aria II, and data analysis was performed using BD FACS Diva and FlowJo software.

Quantification and Statistical Analysis

GraphPad Prism software was used to perform statistical analyses. For the real-time PCR analysis, paired t-test was used to calculate statistical significance between the two groups. Repeated measures ANOVA was used for longitudinal analyses of donor chimerism.

Results with a p-value <0.05 were considered statistically significant. Information on replicates is reported in the figure legends.

REFERENCES

Amoasii, L., Hildyard, J. C. W., Li, H., Sanchez-Ortiz, E., Mireault, A., Caballero, D., Harron, R., Stathopoulou, T. R., Massey, C., Shelton, J. M., et al. (2018). Gene editing restores dystrophin expression in a canine model of Duchenne muscular dystrophy. Science 362, 86-91.

Arnett, A. L., Konieczny, P., Ramos, J. N., Hall, J., Odom, G., Yablonka-Reuveni, Z., Chamberlain, J. R., and Chamberlain, J. S. (2014). Adeno-associated viral (AAV) vectors do not efficiently target muscle satellite cells. Mol Ther Methods Clin Dev 1.

Arpke, R. W., Darabi, R., Mader, T. L., Zhang, Y., Toyama, A., Lonetree, C. L., Nash, N., Lowe, D. A., Perlingeiro, R. C., and Kyba, M. (2013). A new immuno-, dystrophin-deficient model, the NSG-mdx(4Cv) mouse, provides evidence for functional improvement following allogeneic satellite cell transplantation. Stem Cells 31, 1611-1620.

Bengtsson, N. E., Hall, J. K., Odom, G. L., Phelps, M. P., Andrus, C. R., Hawkins, R. D., Hauschka, S. D., Chamberlain, J. R., and Chamberlain, J. S. (2017). Muscle-specific CRISPR/Cas9 dystrophin gene editing ameliorates pathophysiology in a mouse model for Duchenne muscular dystrophy. Nat Commun 8, 14454.

Blankinship, M. J., Gregorevic, P., Allen, J. M., Harper, S. Q., Harper, H., Halbert, C. L., Miller, A. D., Miller, D. A., and Chamberlain, J. S. (2004). Efficient transduction of skeletal muscle using vectors based on adeno-associated virus serotype 6. Mol Ther 10, 671-678.

Bosnakovski, D., Xu, Z., Li, W., Thet, S., Cleaver, O., Perlingeiro, R. C., and Kyba, M. (2008). Prospective isolation of skeletal muscle stem cells with a Pax7 reporter. Stem Cells 26, 3194-3204.

Busch, K., Klapproth, K., Barile, M., Flossdorf, M., Holland-Letz, T., Schlenner, S. M., Reth, M., Höfer, T., and Rodewald, H. R. (2015). Fundamental properties of unperturbed haematopoiesis from stem cells in vivo. Nature 518, 542-546.

Cerletti, M., Jurga, S., Witczak, C. A., Hirshman, M. F., Shadrach, J. L., Goodyear, L. J., and Wagers, A. J. (2008). Highly efficient, functional engraftment of skeletal muscle stem cells in dystrophic muscles. Cell 134, 37-47.

Chamberlain, J. R., and Chamberlain, J. S. (2017). Progress toward Gene Therapy for Duchenne Muscular Dystrophy. Mol Ther 25, 1125-1131.

Chang, N. C., Chevalier, F. P., and Rudnicki, M. A. (2016). Satellite Cells in Muscular Dystrophy—Lost in Polarity. Trends Mol Med 22, 479-496.

Colella, P., Ronzitti, G., and Mingozzi, F. (2018). Emerging Issues in AAV-Mediated. Mol Ther Methods Clin Dev 8, 87-104.

Collins, C. A., Kretzschmar, K., and Watt, F. M. (2011). Reprogramming adult dermis to a neonatal state through epidermal activation of β-catenin. Development 138, 5189-5199.

Driskell, R. R., Jahoda, C. A., Chuong, C. M., Watt, F. M., and Horsley, V. (2014). Defining dermal adipose tissue. Exp Dermatol 23, 629-631.

Filareto, A., Rinaldi, F., Arpke, R. W., Darabi, R., Belanto, J. J., Toso, E. A., Miller, A. Z., Ervasti, J. M., McIvor, R. S., Kyba, M., et al. (2015). Pax3-induced expansion enables the genetic correction of dystrophic satellite cells. Skelet Muscle 5, 36.

Heredia, J. E., Mukundan, L., Chen, F. M., Mueller, A. A., Deo, R. C., Locksley, R. M., Rando, T. A., and Chawla, A. (2013). Type 2 innate signals stimulate fibro/adipogenic progenitors to facilitate muscle regeneration. Cell 153, 376-388.

Hettmer, S., Liu, J., Miller, C. M., Lindsay, M. C., Sparks, C. A., Guertin, D. A., Bronson, R. T., Langenau, D. M., and Wagers, A. J. (2011). Sarcomas induced in discrete subsets of prospectively isolated skeletal muscle cells. Proc Natl Acad Sci USA 108, 20002-20007.

Hinderer, C., Katz, N., Buza, E. L., Dyer, C., Goode, T., Bell, P., Richman, L. K., and Wilson, J. M. (2018). Severe Toxicity in Nonhuman Primates and Piglets Following High-Dose Intravenous Administration of an Adeno-Associated Virus Vector Expressing Human SMN. Hum Gene Ther 29, 285-298.

Joe, A. W., Yi, L., Natarajan, A., Le Grand, F., So, L., Wang, J., Rudnicki, M. A., and Rossi, F. M. (2010). Muscle injury activates resident fibro/adipogenic progenitors that facilitate myogenesis. Nat Cell Biol 12, 153-163.

Kiel, M. J., Yilmaz, O. H., Iwashita, T., Terhorst, C., and Morrison, S. J. (2005). SLAM family receptors distinguish hematopoietic stem and progenitor cells and reveal endothelial niches for stem cells. Cell 121, 1109-1121.

Kopinke, D., Roberson, E. C., and Reiter, J. F. (2017). Ciliary Hedgehog Signaling Restricts Injury-Induced Adipogenesis. Cell 170, 340-351.e312.

Lees-Shepard, J. B., Yamamoto, M., Biswas, A. A., Stoessel, S. J., Nicholas, S. E., Cogswell, C. A., Devarakonda, P. M., Schneider, M. J., Cummins, S. M., Legendre, N. P., et al. (2018). Activin-dependent signaling in fibro/adipogenic progenitors causes fibrodysplasia ossificans progressiva. Nat Commun 9, 471.

Lock, M., Alvira, M., Vandenberghe, L. H., Samanta, A., Toelen, J., Debyser, Z., and Wilson, J. M. (2010). Rapid, simple, and versatile manufacturing of recombinant adeno-associated viral vectors at scale. Hum Gene Ther 21, 1259-1271.

Long, C., Amoasii, L., Mireault, A. A., McAnally, J. R., Li, H., Sanchez-Ortiz, E., Bhattacharyya, S., Shelton, J. M., Bassel-Duby, R., and Olson, E. N. (2016). Postnatal genome editing partially restores dystrophin expression in a mouse model of muscular dystrophy. Science 351, 400-403.

Lounev, V. Y., Ramachandran, R., Wosczyna, M. N., Yamamoto, M., Maidment, A. D., Shore, E. M., Glaser, D. L., Goldhamer, D. J., and Kaplan, F. S. (2009). Identification of progenitor cells that contribute to heterotopic skeletogenesis. J Bone Joint Surg Am 91, 652-663.

Lu, Y., and Song, S. (2009). Distinct immune responses to transgene products from rAAV1 and rAAV8 vectors. Proc Natl Acad Sci USA 106, 17158-17162.

Madisen, L., Zwingman, T. A., Sunkin, S. M., Oh, S. W., Zariwala, H. A., Gu, H., Ng, L. L., Palmiter, R. D., Hawrylycz, M. J., Jones, A. R., et al. (2010). A robust and high-throughput Cre reporting and characterization system for the whole mouse brain. Nat Neurosci 13, 133-140.

Maesner, C. C., Almada, A. E., and Wagers, A. J. (2016). Established cell surface markers efficiently isolate highly overlapping populations of skeletal muscle satellite cells by fluorescence-activated cell sorting. Skeletal muscle 6, 35.

Mendell, J. R., Al-Zaidy, S., Shell, R., Arnold, W. D., Rodino-Klapac, L. R., Prior, T. W., Lowes, L., Alfano, L., Berry, K., Church, K., et al. (2017). Single-Dose Gene-Replacement Therapy for Spinal Muscular Atrophy. N Engl J Med 377, 1713-1722.

Mingozzi, F., and High, K. A. (2011). Therapeutic in vivo gene transfer for genetic disease using AAV: progress and challenges. Nat Rev Genet 12, 341-355.

Morgan, R. A., Gray, D., Lomova, A., and Kohn, D. B. (2017). Hematopoietic Stem Cell Gene Therapy: Progress and Lessons Learned. Cell Stem Cell 21, 574-590.

Nelson, C. E., Hakim, C. H., Ousterout, D. G., Thakore, P. I., Moreb, E. A., Castellanos Rivera, R. M., Madhavan, S., Pan, X., Ran, F. A., Yan, W. X., et al. (2016). In vivo genome editing improves muscle function in a mouse model of Duchenne muscular dystrophy. Science 351, 403-407.

Patel, S. H., O'Hara, L., Atanassova, N., Smith, S. E., Curley, M. K., Rebourcet, D., Darbey, A. L., Gannon, A. L., Sharpe, R. M., and Smith, L. B. (2017). Low-dose tamoxifen treatment in juvenile males has long-term adverse effects on the reproductive system: implications for inducible transgenics. Sci Rep 7, 8991.

Randall, T. D., and Weissman, I. L. (1997). Phenotypic and functional changes induced at the clonal level in hematopoietic stem cells after 5-fluorouracil treatment. Blood 89, 3596-3606.

Roberts, E. W., Deonarine, A., Jones, J. O., Denton, A. E., Feig, C., Lyons, S. K., Espeli, M., Kraman, M., McKenna, B., Wells, R. J., et al. (2013). Depletion of stromal cells expressing fibroblast activation protein-α from skeletal muscle and bone marrow results in cachexia and anemia. J Exp Med 210, 1137-1151.

Sawai, C. M., Babovic, S., Upadhaya, S., Knapp, D. J. H. F., Lavin, Y., Lau, C. M., Goloborodko, A., Feng, J., Fujisaki, J., Ding, L., et al. (2016). Hematopoietic Stem Cells Are the Major Source of Multilineage Hematopoiesis in Adult Animals Immunity 45, 597-609.

Schulz, T. J., Huang, T. L., Tran, T. T., Zhang, H., Townsend, K. L., Shadrach, J. L., Cerletti, M., McDougall, L. E., Giorgadze, N., Tchkonia, T., et al. (2011). Identification of inducible brown adipocyte progenitors residing in skeletal muscle and white fat. Proc Natl Acad Sci USA 108, 143-148.

Seale, P., Sabourin, L. A., Girgis-Gabardo, A., Mansouri, A., Gruss, P., and Rudnicki, M. A. (2000). Pax7 is required for the specification of myogenic satellite cells. Cell 102, 777-786.

Sherwood, R. I., Christensen, J. L., Conboy, I. M., Conboy, M. J., Rando, T. A., Weissman, I. L., and Wagers, A. J. (2004). Isolation of adult mouse myogenic progenitors: functional heterogeneity of cells within and engrafting skeletal muscle. Cell 119, 543-554.

Smith, L. J., Ul-Hasan, T., Carvaines, S. K., Van Vliet, K., Yang, E., Wong, K. K., Agbandje-McKenna, M., and Chatterjee, S. (2014). Gene transfer properties and structural modeling of human stem cell-derived AAV. Mol Ther 22, 1625-1634.

Sun, J., Ramos, A., Chapman, B., Johnnidis, J. B., Le, L., Ho, Y. J., Klein, A., Hofmann, O., and Camargo, F. D. (2014). Clonal dynamics of native haematopoiesis. Nature 514, 322-327.

Tabebordbar, M., Zhu, K., Cheng, J. K. W., Chew, W. L., Widrick, J. J., Yan, W. X., Maesner, C., Wu, E. Y., Xiao, R., Ran, F. A., et al. (2016). In vivo gene editing in dystrophic mouse muscle and muscle stem cells. Science 351, 407-411.

Tan, K. Y., Eminli, S., Hettmer, S., Hochedlinger, K., and Wagers, A. J. (2011). Efficient generation of iPS cells from skeletal muscle stem cells. PLoS One 6, e26406.

Uezumi, A., Fukada, S., Yamamoto, N., Ikemoto-Uezumi, M., Nakatani, M., Morita, M., Yamaguchi, A., Yamada, H., Nishino, I., Hamada, Y., et al. (2014). Identification and characterization of PDGFRα+ mesenchymal progenitors in human skeletal muscle. Cell Death Dis 5, e1186.

Uezumi, A., Fukada, S., Yamamoto, N., Takeda, S., and Tsuchida, K. (2010). Mesenchymal progenitors distinct from satellite cells contribute to ectopic fat cell formation in skeletal muscle. Nat Cell Biol 12, 143-152.

Wagers, A. J. (2012). The stem cell niche in regenerative medicine. Cell Stem Cell 10, 362-369.

Wang, Z., Zhu, T., Qiao, C., Zhou, L., Wang, B., Zhang, J., Chen, C., Li, J., and Xiao, X. (2005). Adeno-associated virus serotype 8 efficiently delivers genes to muscle and heart. Nat Biotechnol 23, 321-328.

Yang, Y., Wang, L., Bell, P., McMenamin, D., He, Z., White, J., Yu, H., Xu, C., Morizono, H., Musunuru, K., et al. (2016). A dual AAV system enables the Cas9-mediated correction of a metabolic liver disease in newborn mice. Nat Biotechnol 34, 334-338.

Zhang, B., Tsai, P. C., Gonzalez-Celeiro, M., Chung, O., Boumard, B., Perdigoto, C. N., Ezhkova, E., and Hsu, Y. C. (2016). Hair follicles' transit-amplifying cells govern concurrent dermal adipocyte production through Sonic Hedgehog. Genes Dev 30, 2325-2338.

Zincarelli, C., Soltys, S., Rengo, G., and Rabinowitz, J. E. (2008). Analysis of AAV serotypes 1-9 mediated gene expression and tropism in mice after systemic injection. Mol Ther 16, 1073-1080.

Zinn, E., Pacouret, S., Khaychuk, V., Turunen, H. T., Carvalho, L. S., Andres-Mateos, E., Shah, S., Shelke, R., Maurer, A. C., Plovie, E., et al. (2015). In Silico Reconstruction of the Viral Evolutionary Lineage Yields a Potent Gene Therapy Vector. Cell Rep 12, 1056-1068.

Example 2

AAVs carrying Staphylococcus aureus Cas9 (saCas9)+a gRNA targeting Dnmt3a or a control locus (Jak2), were injected into 2 month old C57BL/6 mice. Four months later, liver and bone marrow were harvested from one mouse in each treatment group. Hematopoietic stem cells (HSCs) and multipotent progenitors (MPPs) were FACS isolated from the bone marrow. Further, genomic DNA at the Dnmt3a locus was amplified from each of these cell populations/organs (liver, bone marrow, HSCs, and MPPs) and sequenced.

RESULTS

Figure 11A:
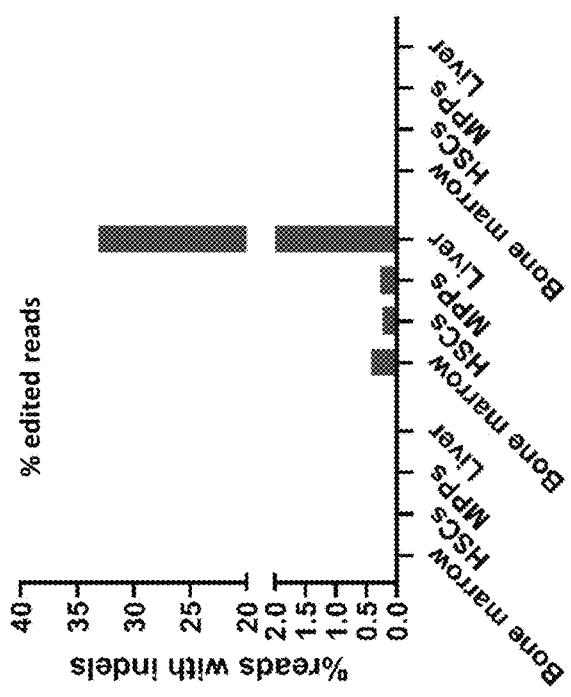
Figure 11B:
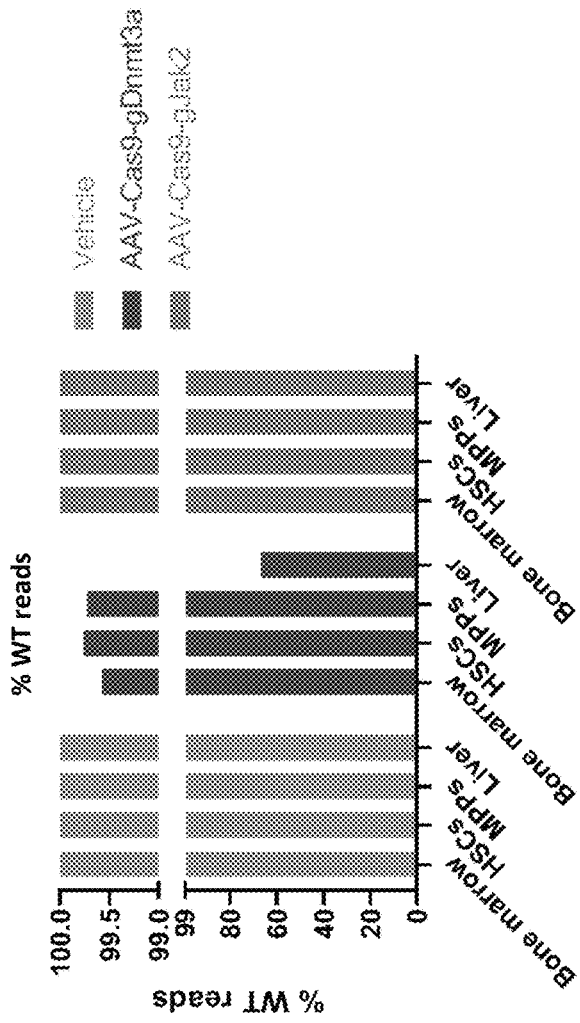
Figure 11D:
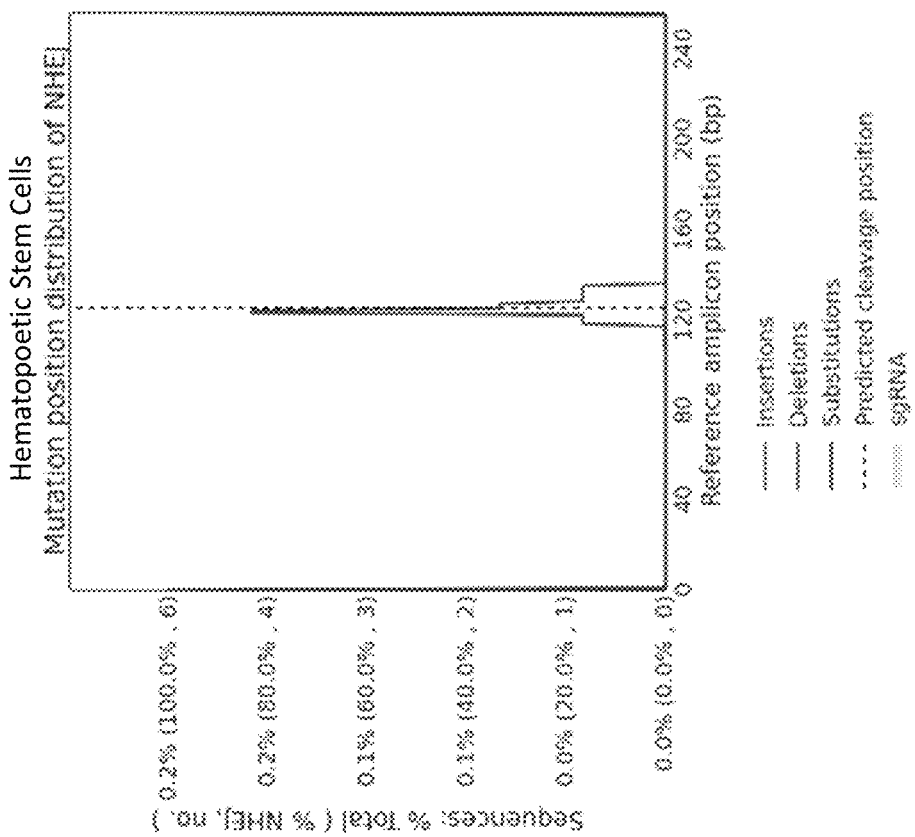
Figure 11C:
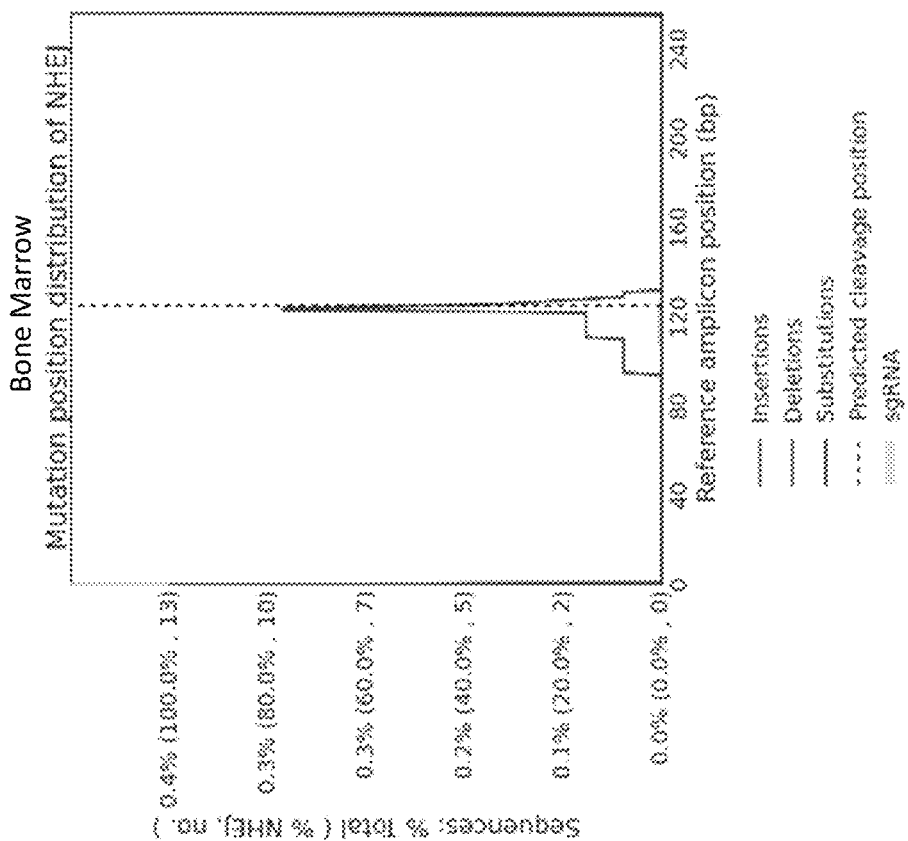
Figure 11E:
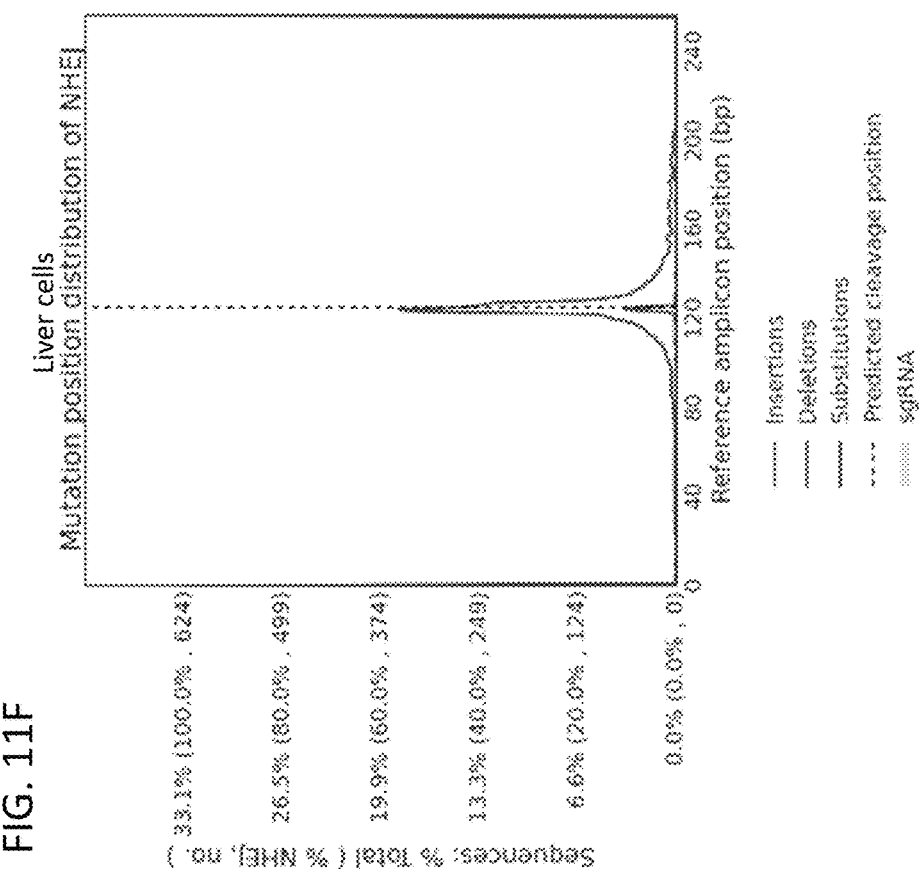
Figure 11F:
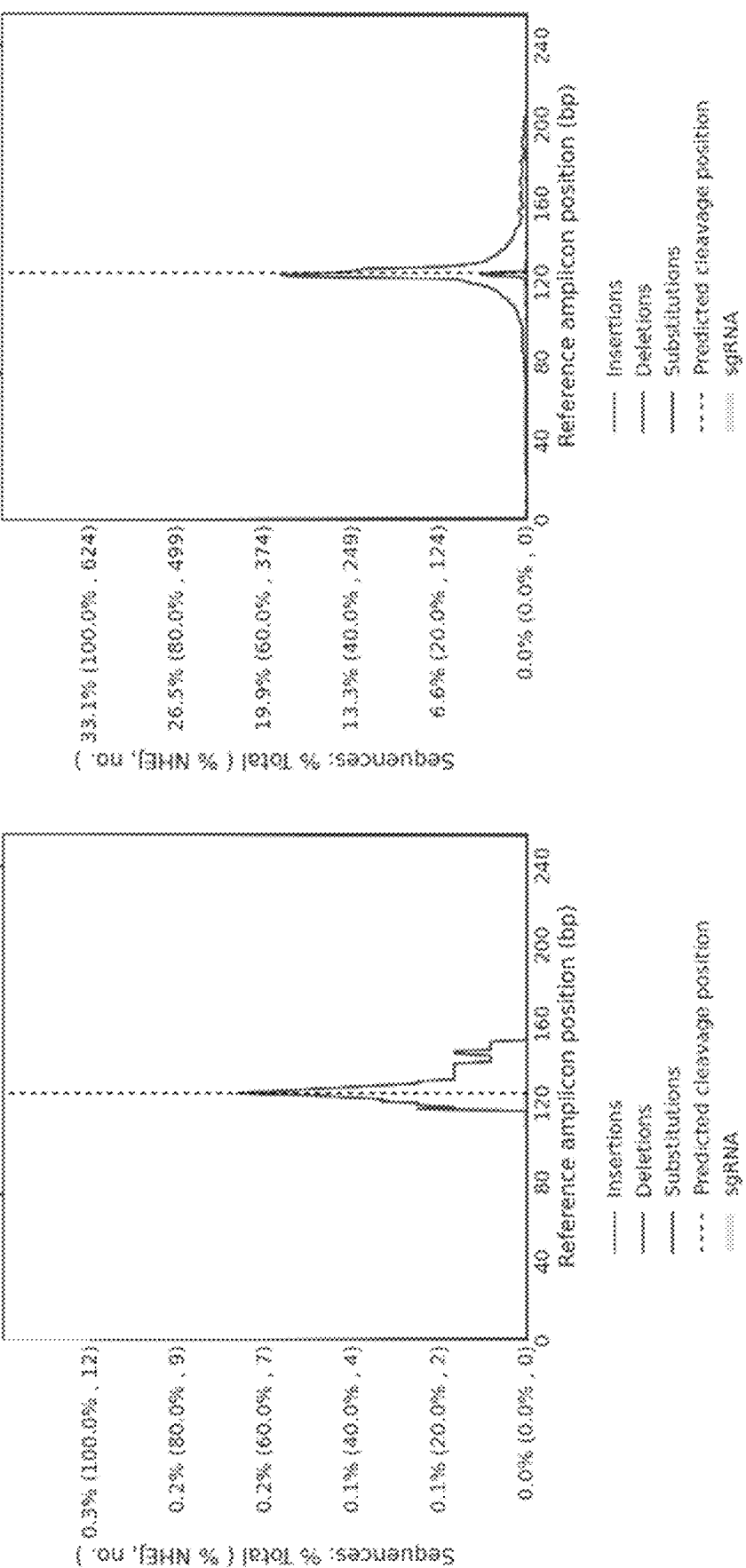

FIG. 11A shows the percent of edited reads, i.e., the % of sequencing reads that contain indels in the amplified Dnmt3a sequence, which contains the gRNA targeted site. FIG. 11B shows the percent of % WT reads, i.e., the % of sequencing reads that map to the wild-type Dnmt3a sequence. As shown in FIG. 11A, Dnmt3a targeting gRNAs introduce ~30% editing of Dnmt3a locus in the liver. Indels are also detected in about 0.5% of reads in the bone marrow and HSC and MPP populations. These indels show characteristic Cas9-induced indel peaks around cut site (FIGS. 11C-11F). gRNA targeting Jak2 does not induce Dnmt3a editing, indicating specificity of the approach.

What is claimed is:

1. A method for modifying the genome of a population of muscle stem cells of a subject via homology-directed repair, comprising
   a) contacting the subject with a first adeno-associated virus (AAV), wherein the first AAV transduces a nucleic acid sequence encoding a sequence-targeting nuclease into the population of muscle stem cells; and
   b) modifying the genome of the population of muscle stem cells with the sequence-targeting nuclease, wherein the AAV is administered to the subject via intravenous injection, wherein the modified muscle stem cells retain myogenic capacity, wherein the sequence-targeting nuclease is a Zinc-Finger Nuclease (ZFN), a Transcription activator-like effector nuclease (TALEN), a Cre recombinase, or an RNA-guided nuclease, wherein at least 40% of the population of muscle stem cells is transduced by the first AAV, and wherein the first AAV is AAV serotype AAV8 or Anc80L65.

2. The method of claim 1, wherein at least 50% of the population of muscle stem cells is transduced by the virus.

3. The method of claim 1, wherein the sequence-targeting nuclease is a Cas9 nuclease.

4. The method of claim 1, further comprising contacting the subject with a second virus which transduces a nucleic acid sequence encoding one or more gRNAs in the population of cells.

* * * * *

SEQUENCE LISTING

```
<160> NUMBER OF SEQ ID NOS: 6

<210> SEQ ID NO 1
<211> LENGTH: 20
<212> TYPE: DNA
<213> ORGANISM: Artificial Sequence
<220> FEATURE:
<223> OTHER INFORMATION: Primer

<400> SEQUENCE: 1
ctgcatgtac cacgagtcca                                              20
```

<210> SEQ ID NO 2
<211> LENGTH: 20
<212> TYPE: DNA
<213> ORGANISM: Artificial Sequence
<220> FEATURE:
<223> OTHER INFORMATION: Primer

<400> SEQUENCE: 2
gtcaggtgcc acttctggtt                    20

<210> SEQ ID NO 3
<211> LENGTH: 20
<212> TYPE: DNA
<213> ORGANISM: Artificial Sequence
<220> FEATURE:
<223> OTHER INFORMATION: Primer

<400> SEQUENCE: 3
aagggagctg cagtggagta                    20

<210> SEQ ID NO 4
<211> LENGTH: 20
<212> TYPE: DNA
<213> ORGANISM: Artificial Sequence
<220> FEATURE:
<223> OTHER INFORMATION: Primer

<400> SEQUENCE: 4
ccgaaaatct gtgggaagtc                    20

<210> SEQ ID NO 5
<211> LENGTH: 19
<212> TYPE: DNA
<213> ORGANISM: Artificial Sequence
<220> FEATURE:
<223> OTHER INFORMATION: Primer

<400> SEQUENCE: 5
ctgttcctgt acggcatgg                     19

<210> SEQ ID NO 6
<211> LENGTH: 20
<212> TYPE: DNA
<213> ORGANISM: Artificial Sequence
<220> FEATURE:
<223> OTHER INFORMATION: Primer

<400> SEQUENCE: 6
ggcattaaag cagcgtatcc                    20